US012737699B1

(12) United States Patent
Walder

(10) Patent No.: US 12,737,699 B1
(45) Date of Patent: Sep. 15, 2026

(54) AUTOMATED RESOURCE POOL CHARACTERISTIC IMPROVEMENT SYSTEM

(71) Applicant: Business Finance.com, Inc., Carlsbad, CA (US)

(72) Inventor: Dan Randall Walder, Encinitas, CA (US)

(73) Assignee: Business Finance.com, Inc., Carlsbad, CA (US)

( * ) Notice: Subject to any disclaimer, the term of this patent is extended or adjusted under 35 U.S.C. 154(b) by 348 days.

(21) Appl. No.: 18/183,874

(22) Filed: Mar. 14, 2023

Related U.S. Application Data

(60) Provisional application No. 63/269,381, filed on Mar. 15, 2022.

(51) Int. Cl.
*G06Q 10/06* (2023.01)
*G06Q 10/0631* (2023.01)

(52) U.S. Cl.
CPC .............................. *G06Q 10/06312* (2013.01)

(58) Field of Classification Search
None
See application file for complete search history.

(56) References Cited

U.S. PATENT DOCUMENTS

| | | | |
|---|---|---|---|
| 7,310,618 B2 | 12/2007 | Libman | |
| 7,729,983 B1 | 6/2010 | Ellis | |
| 7,860,781 B1 | 12/2010 | Bodi et al. | |
| 8,452,681 B2 | 5/2013 | Clements | |
| 8,452,684 B1 * | 5/2013 | Ryan | G06Q 40/06 705/30 |
| 8,489,500 B2 | 7/2013 | de Jonge et al. | |
| 8,510,199 B1 | 8/2013 | Erlanger | |
| 8,606,695 B1 | 12/2013 | Arora et al. | |
| 8,700,522 B2 | 4/2014 | Moore et al. | |
| 8,972,331 B2 | 3/2015 | Onsjö et al. | |
| 8,983,867 B2 | 3/2015 | Stibel et al. | |
| 8,996,481 B2 | 3/2015 | Lawrence et al. | |

(Continued)

OTHER PUBLICATIONS

Chinchalkar et al., "Comparing loan-level and pool-level mortgage portforlio analysis", Moody's Research Labs, dated 2010, https://www.moodys.com/sites/products/ProductAttachments/MRL%20WP%202010%2011%201.pdf, pp. 1-32.

(Continued)

*Primary Examiner* — Arif Ullah
(74) *Attorney, Agent, or Firm* — Knobbe, Martens, Olson & Bear, LLP

(57) ABSTRACT

Features are disclosed for identifying an operation for an object of a pool of objects to improve a pool characteristic of the object pool. For example, a system can identify an operation or task for a particular business loan of a pool of business loans to improve a rating of the pool of business loans. The system can monitor data associated with each of the objects to automatically identify particular objects. For example, the system can identify particular objects to be improved or particular objects to be removed from the pool of objects. The system can identify particular operations to improve the pool characteristic of the pool of objects and cause performance of the operations without modifying private data of the object pool by which the objects can be defined.

23 Claims, 11 Drawing Sheets

(56) References Cited

U.S. PATENT DOCUMENTS

| | | | | |
|---|---|---|---|---|
| 10,127,610 | B1 | 11/2018 | Cassidy et al. | |
| 10,783,578 | B1 | 9/2020 | Callahan | |
| 2003/0163414 | A1 | 8/2003 | O'Brien et al. | |
| 2005/0278249 | A1 | 12/2005 | Jones et al. | |
| 2009/0192946 | A1 | 7/2009 | Buckmaster | |
| 2011/0106692 | A1* | 5/2011 | Moore .................. | G06Q 40/02 705/38 |
| 2012/0246060 | A1* | 9/2012 | Conyack, Jr. .......... | G06Q 40/02 705/38 |
| 2015/0058197 | A1 | 2/2015 | Shenkar et al. | |

OTHER PUBLICATIONS

Sirignano et al., "Risk Analysis for Large Pools of Loans", Financial Crises eJournal, dated 2015, https://jasirign.github.io/pdf/SGMM12b.pdf, pp. 1-37.

* cited by examiner

600A

General
Credit
Revenue
Assets
Banking

Location
Type of business
Tax identifier

General – Step 1 of 11

Next

Location information

It is important that your business information files match exactly with each agency that is keeping a file. There are four (4) that are vital: the state, IRS, your bank, and 411 directory assistance.

For example, if the state has your business listed as "American Business Services, Inc.," and your business checking account is "American Business Services," and 411 directory assistance has a listing for "American Business Consultants," you will need to make sure that all these list your business the same way and at the same address.

| Business exact legal name: | |
|---|---|
| Primary contact name: | |
| 411 Directory assistance phone number: | |
| Business fax number: | |
| E-mail: | |
| Street address: | |
| City: | |
| State: | |
| Zip code: | |

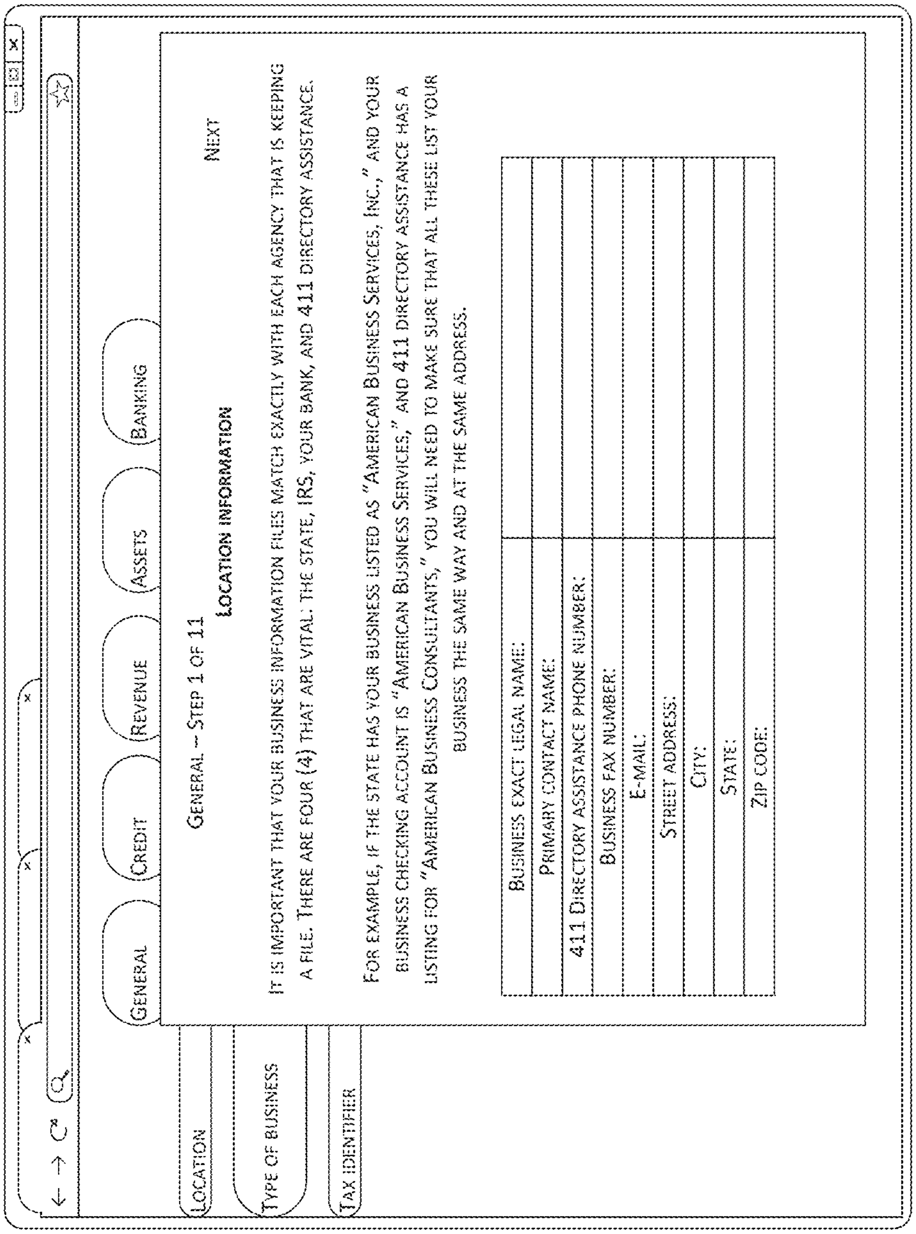

GENERAL CREDIT HOUSING INCOME BANKING

CONTACT INFO.

PERSONAL INFO.

GENERAL – STEP 1 OF 9

NEXT

CONTACT INFORMATION

GUARANTOR IS THE PERSON WHO WILL BE SIGNING A PERSONAL GUARANTEE FOR YOUR BUSINESS LOANS. A PERSONAL GUARANTEE IS REQUIRED UNLESS YOUR BUSINESS HAS BEEN IN BUSINESS 2+ YEARS AND HAS A CREDIT SCORE OF 75+, A 5+ BANK RATING, AND 5 REPORTING COMPARABLE TRADE CREDIT REFERENCES.

THE GUARANTOR CAN BE ANYONE: YOU, A BUSINESS ASSOCIATE, A FRIEND, A RELATIVE, A SPOUSE, ..., ANYONE! TO MAXIMIZE THE FUNDING PROGRAMS AVAILABLE TO YOUR BUSINESS SEEK OUT A GUARANTOR WITH A PERSONAL FICO SCORE OF 680 OR BETTER.

| | |
|---|---|
| LAST NAME: | |
| FIRST NAME: | |
| MIDDLE INITIAL: | |
| E-MAIL: | |
| STREET ADDRESS: | |
| CITY: | |
| COUNTY (NOT COUNTRY): | |
| STATE: | |
| ZIP CODE: | |
| HOME PHONE NUMBER: | |
| DAY PHONE NUMBER: | |
| CELL PHONE NUMBER: | |

IS THE PHONE NUMBER(S) LISTED IN YOUR NAME? YES NO

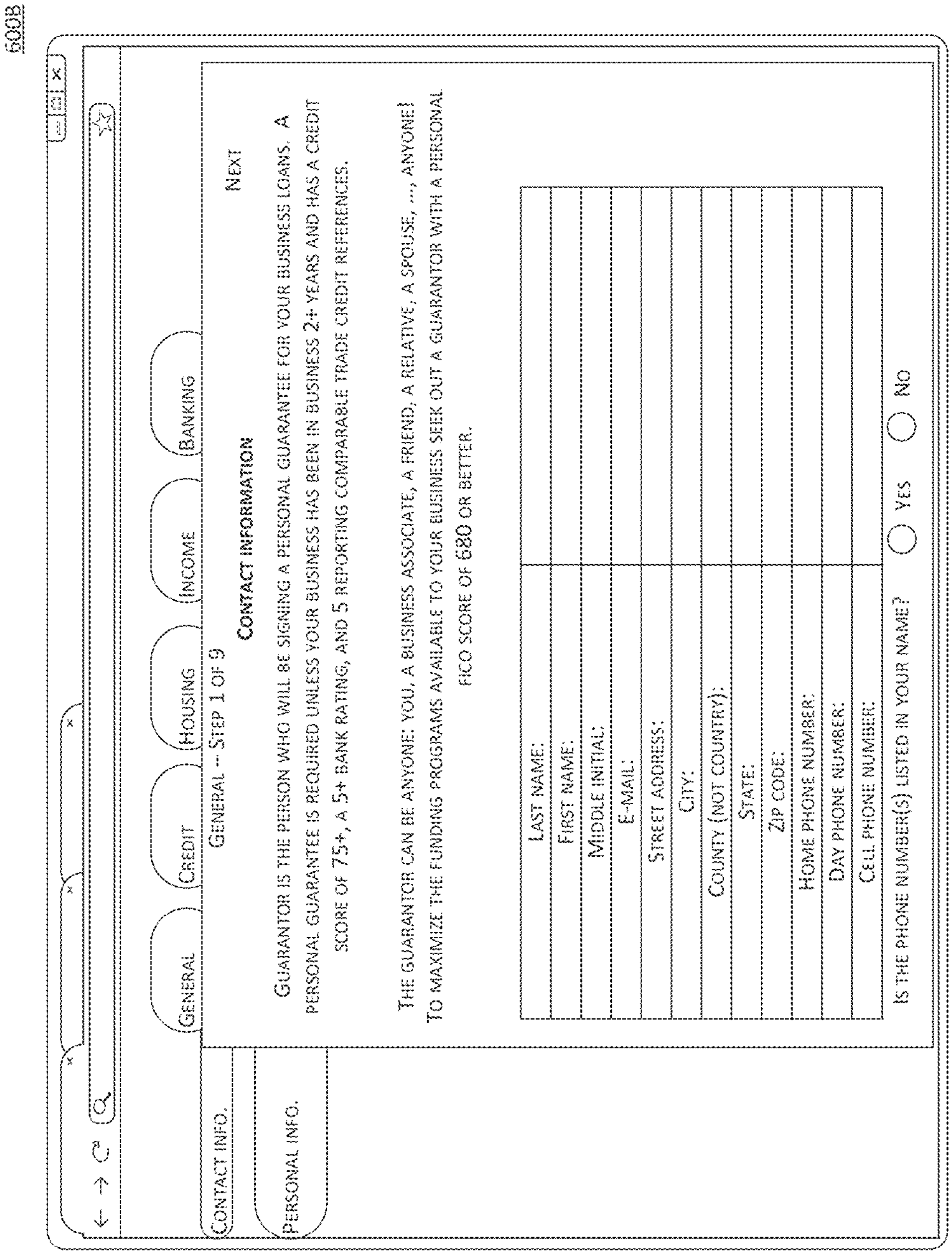

FIG. 6B

AUTOMATED RESOURCE POOL CHARACTERISTIC IMPROVEMENT SYSTEM

RELATED APPLICATIONS

Any and all applications for which a foreign or domestic priority claim is identified in the Application Data Sheet as filed with the present application are incorporated by reference under 37 CFR 1.57 and made a part of this specification. This application claims the benefit of priority of U.S. Provisional Patent Application No. 63/269,381, filed Mar. 15, 2022, entitled AUTOMATED POOL CHARACTERISTIC IMPROVEMENT OF A RESOURCE POOL, which is incorporated herein by reference in its entirety.

SUMMARY

The systems, methods, and devices described herein each have several aspects, no single one of which is solely responsible for its desirable attributes. Without limiting the scope of this disclosure, several non-limiting features will now be described briefly. It should be understood that any of the embodiments described herein can be combined with any other embodiment disclosed herein except where contradictory.

According to various embodiments of the present disclosure, a method, as implemented by a hardware processor of an interactive computing system configured with specific computer-executable instructions, can include identifying a transformation operation for an object pool to improve a pool characteristic of the object pool without modifying private data defining individual objects of the object pool. The method may include receiving object data identifying an object pool. The object pool may include a plurality of objects that are pooled such the plurality of objects are movable between entities. Each object of the plurality of objects may have a discrete impact on a pool characteristic of the object pool based at least in part on the object pool including the plurality of objects. Each object of the plurality of objects may identify an electronic file including an electronic signature. Each object of the plurality of objects may be included in the object pool based at least in part on validation of a corresponding electronic signature. Each electronic file of the plurality of electronic files may identify a first entity, a second entity, and movable physical property. A third party computing system may define components data that identifies a connection between the plurality of movable physical property and the plurality of objects. The plurality of objects may be defined based at least in part on the components data. The hardware processor may not have authorization to modify the components data, the plurality of electronic files, or the plurality of movable physical property. The method may further include identifying the pool characteristic of the object pool based at least in part on the object data. The pool characteristic may include a first dynamic assessment of the plurality of objects at a particular time as compared to another object pool. The pool characteristic may be based at least in part on an evaluation of the components data, the plurality of electronic files, or the plurality of movable physical property. The pool characteristic may vary over time based at least in part on modification of at least one of the components data, the plurality of electronic files, or the plurality of movable physical property. The method may further include determining, for each object of the plurality of objects, a respective object characteristic based at least in part on the object data. The respective object characteristic may include a second dynamic assessment of the object at a particular time as compared to another object. At least a portion of the plurality of object characteristics may be based at least in part on a portion of the components data associated with the object, a respective electronic file identified by the object, or a respective movable physical property of the object. The respective object characteristic may vary over time based at least in part on modification of at least one of the portion of the components data associated with the object, the respective electronic file identified by the object, or the respective movable physical property of the object. The method may further include identifying a particular object of the plurality of objects based at least in part on one or more thresholds associated with the object pool. Identifying the particular object may include, for each object of the plurality of objects, simulating performance of an operation of a plurality of operations. Each operation of the plurality of operations may include an operation to modify a non-object or an object not included in the object pool such that data associated with the first entity or the second entity is modified. Each operation may indirectly cause modification to an attribute of the object without modifying the portion of the components data associated with the object, the respective electronic file identified by the object, or the respective movable physical property of the object. Identifying the particular object may further include, for each object of the plurality of objects, generating a predicted object characteristic of the object based at least in part on the respective object characteristic of the object and the simulated performance of the operation. Identifying the particular object may further include, for each object of the plurality of objects, generating a predicted pool characteristic of the object pool based at least in part on the predicted object characteristic of the object. The method may further include normalizing results of the simulated performance of the operation by generating the predicted object characteristic and the predicted pool characteristic. Identifying the particular object may further include, for each object of the plurality of objects, determining whether the one or more thresholds are satisfied based on one or more of the predicted pool characteristic, the predicted object characteristic, a difference between the predicted object characteristic and the respective object characteristic, a difference between the predicted pool characteristic and the pool characteristic, a rate of change of the respective object characteristic, or a rate of change of the pool characteristic. Identifying the particular object may be based at least in part on determining whether the one or more thresholds are satisfied. The method may further include identifying a particular operation, of the plurality of operations or a second plurality of operations, based at least in part on the normalized results of the simulated performance of the operation and determining whether the one or more thresholds are satisfied. Each operation of the second plurality of operations may include an operation to modify the object pool. The method may further include causing performance of the particular operation without modifying the components data, the plurality of electronic files, or the plurality of movable physical property. The method may further include obtaining an updated pool characteristic of the object pool based at least in part on causing performance of the particular operation.

In various embodiments, the at least a portion of the plurality of object characteristics may be further based at least in part on a plurality of attributes of the plurality of objects. Causing performance of the particular operation may include causing modification of a particular attribute of the particular object. The modification of the particular attribute may cause an adjustment to the pool characteristic.

In various embodiments, identifying the pool characteristic may include obtaining the pool characteristic from a computing device. The method may further include transmitting, to the computing device, a request for the updated pool characteristic based at least in part on causing performance of the particular operation. Obtaining the updated pool characteristic may include obtaining the updated pool characteristic further based at least in part on transmitting, to the computing device, the request for the updated pool characteristic.

In various embodiments, simulating performance of the operation may include performing a monte carlo simulation based on one or more random variables associated with the object.

In various embodiments, simulating performance of the operation may include identifying one or more attributes of the object comprising the attribute of the object. Simulating performance of the operation may further include identifying an environment associated with the object. The object may be located within the environment. Simulating performance of the operation may further include identifying one or more attributes of the environment. The one or more attributes of the environment may indicate how the respective object characteristic is determined. Simulating performance of the operation may further include generating a model of an environment based on the one or more attributes of the object and the one or more attributes of the environment. The model of the environment may include at least the object and at least one secondary object. The one or more attributes of the object may be defined based at least in part on the at least one secondary object Simulating performance of the operation may further include simulating performance of the operation within the model of the environment.

In various embodiments, identifying the particular object may include determining the simulated performance of the operation does not satisfy one or more additional thresholds. Determining the simulated performance of the operation does not satisfy one or more additional thresholds may include at least one of determining indirect modification to the attribute of the object does not satisfy one or more sub-thresholds, determining that the hardware processor is not authorized to perform the operation, determining the simulated performance of the operation results in at least one of a decreased pool characteristic of the object pool as compared to the pool characteristic or a decreased object characteristic of the object as compared to the respective object characteristic, or determining the simulated performance of the operation results in a modification to at least one of the portion of the components data associated with the object, the respective electronic file identified by the object, or the respective movable physical property of the object. Identifying the particular object may further include based at least in part on determining the simulated performance of the operation does not satisfy the one or more additional thresholds, at least one of removing the operation from the plurality of operations, causing display of a graphical user interface via a user computing device, the graphical user interface indicating the operation, adjusting the operation, adjusting a second operation of the plurality of operations, or generating a third operation to add to the plurality of operations.

In various embodiments, the particular object may be a first object. Causing performance of the particular operation may include causing removal of the first object from the plurality of objects. Causing performance of the particular operation may include causing addition of a second object to the plurality of objects. The second object may be identified based at least in part on one or more similarities between the first object and the second object. Causing performance of the particular operation may include causing an adjustment to an attribute of the first object. Causing performance of the particular operation may include causing provision of the object pool from a third entity to a fourth entity.

In various embodiments, identifying the particular object may include, for each object of the plurality of objects, comparing the predicted object characteristic to the one or more thresholds. Identifying the particular object may further include, for each object of the plurality of objects, determining whether the object qualifies for rehabilitation based at least in part on comparing the predicted object characteristic to the one or more thresholds. Causing performance of the particular operation may include causing removal of the particular object from the plurality of objects based at least in part on determining that the particular object does not qualify for rehabilitation.

In various embodiments, identifying the particular object may include, for each object of the plurality of objects, comparing the predicted object characteristic to the one or more thresholds. Identifying the particular object may further include, for each object of the plurality of objects, determining whether the object qualifies for rehabilitation based at least in part on comparing the predicted object characteristic to the one or more thresholds. Causing performance of the particular operation may include causing an adjustment to an attribute of the particular object based at least in part on determining the particular object qualifies for rehabilitation.

In various embodiments, causing performance of the particular operation may include identifying the particular object for removal from the plurality of objects. Causing performance of the particular operation may further include transmitting, to a computing device, a request to remove the particular object from the plurality of objects based at least in part on identifying the particular object for removal from the plurality of objects.

In various embodiments, the method may further include determining a particular predicted pool characteristic of the object pool based at least in part on identifying the object and identifying the operation. The method may further include transmitting, to a computing device, the particular predicted pool characteristic. The method may further include receiving, from the computing device, a request to cause performance of the particular operation based at least in part on transmitting, to the computing device, the particular predicted pool characteristic.

In various embodiments, identifying the particular object may include, for each object of the plurality of objects, identifying one or more computing devices including at least one of a first computing device associated with the first entity or a second computing device associated with the second entity. Identifying the particular object may further include, for each object of the plurality of objects, monitoring network traffic associated with the one or more computing devices. Monitoring the network traffic may include monitoring computer transmissions, posts, or network traffic statistics associated with the one or more computing devices. Identifying the particular object may further include, for each object of the plurality of objects, updating the respective object characteristic based at least in part on the network traffic.

In various embodiments, identifying the particular object may include, for each object of the plurality of objects, providing the object data to a machine learning model. The machine learning model may be trained on training data to identify at least one of the predicted object characteristic, the respective object characteristic, one or more attributes of the object, or a respective operation for the respective object to adjust the one or more attributes. The machine learning model may output the at least one of the predicted object characteristic, the respective object characteristic, the one or more attributes of the object, or the respective operation for the respective object based at least in part on the object data. Identifying the particular object may further include, for each object of the plurality of objects, obtaining an output of the machine learning model. The output may identify the at least one of the predicted object characteristic, the respective object characteristic, the one or more attributes of the object, or the respective operation for the respective object.

In various embodiments, the object may correspond to a business loan. The business loan may be established between the first entity and the second entity. The object characteristic may be based at least in part on one or more of a bank rating associated with at least one of the first entity or the second entity, a number of trade lines associated with the at least one of the first entity or the second entity, a number of loans associated with the at least one of the first entity or the second entity, a standing of a business associated with the at least one of the first entity or the second entity, a status of a business associated with the at least one of the first entity or the second entity, a quantity of assets of a business associated with the at least one of the first entity or the second entity, or an age of a business associated with the at least one of the first entity or the second entity.

In various embodiments, the object may correspond to a business loan. The business loan may be established between the first entity and the second entity. The operation may include an operation to establish or recommend establishment of at least one of an additional business loan for at least one of the first entity or the second entity, a plurality of business loans for the at least one of the first entity or the second entity, a lease for the at least one of the first entity or the second entity, or a trade line for the at least one of the first entity or the second entity.

In various embodiments, the method may further include monitoring, in real time, data associated with the object pool. Monitoring, in real time, the data associated with object pool may include performing a web crawl, monitoring a web domain, monitoring a social media platform, monitoring government filings or reports, monitoring public finance reports, or monitoring ratings agency reports. Identifying the particular operation may include identifying the particular operation based at least in part on monitoring, in real time, the data associated with the object pool.

In various embodiments, each object characteristic of the plurality of object characteristics may identify a value of a corresponding object of the plurality of objects, the pool characteristic may identify a value of the object pool, the updated pool characteristic may identify an updated value of the object pool, and the pool characteristic may be based at least in part on the plurality of object characteristics.

In various embodiments, a respective movable physical property of the particular object may include a business loan amount.

According to various embodiments of the present disclosure, a method, as implemented by a hardware processor of an interactive computing system configured with specific computer-executable instructions, can include identifying a task for a business loan of a pool of business loans to improve a rating of the pool of business loans, enabling a user to cause an update to the rating of the pool of business loans without modifying one or more terms of the business loan. The method may include identifying a set of business loan data. The set of business loan data may be associated with the pool of business loans. The method may further include analyzing the set of business loan data. Analyzing the set of business loan data may include, for each business loan of the pool of business loans, identifying one or more attributes. Analyzing the set of business loan data may further include predicting a value of the business loan based at least in part on adjusting an attribute of the one or more attributes. Analyzing the set of business loan data may further include predicting a value of the pool of business loans based at least in part on the predicted value of the business loan. Analyzing the set of business loan data may further include comparing the predicted value of the pool of business loans to one or more thresholds. The method may further include identifying at least one business loan of the pool of business loans based at least in part on analyzing the set of business loan data. The method may further include determining one or more tasks for an entity associated with the at least one business loan based at least in part on analyzing the set of business loan data. The entity may include a pool holder of the pool of business loans, a loan holder of the at least one business loan, a prospective pool holder of the pool of business loans, or a prospective loan holder of the at least one business loan. The method may further include routing the one or more tasks to a computing device associated with the entity.

A data analysis apparatus may include a memory circuit and a hardware processor. The memory circuit may store computer-executable instructions. The hardware processor may be configured to execute the computer-executable instructions. Execution of the computer-executable instructions may cause the hardware processor to identify a first set of loan data and a second set of loan data. The first set of loan data may be associated with a first pool of loans and the second set of loan data may be associated with a second pool of loans. The first pool of loans may be associated with a first rating and the second pool of loans may be associated with a second rating. Execution of the computer-executable instructions may further cause the hardware processor to identify, for each loan of the first pool of loans, one or more first attributes and, for each loan of the second pool of loans, one or more second attributes. Execution of the computer-executable instructions may further cause the hardware processor to predict, for each loan of the first pool of loans, a first loan characteristic based at least in part on a variance to an attribute of the one or more first attributes to generate a first predicted plurality of loan characteristics. Execution of the computer-executable instructions may further cause the hardware processor to predict a first updated rating for the first pool of loans based at least in part on the first predicted plurality of loan characteristics. Execution of the computer-executable instructions may further cause the hardware processor to predict, for each loan of the second pool of loans, a second loan characteristic based at least in part on a variance to an attribute of the one or more second attributes to generate a second predicted plurality of loan characteristics. Execution of the computer-executable instructions may further cause the hardware processor to predict a second updated rating for the second pool of loans based at least in part on the second predicted plurality of loan characteristics. Execution of the computer-executable instructions may further cause the hardware processor to compare a difference between the first rating and the first updated rating to a difference between the second rating and the second updated rating. Execution of the computer-executable instructions may further cause the hardware processor to generate an alert based at least in part on comparing the difference between the first rating and the first updated rating to the difference between the second rating and the second updated rating. Execution of the computer-executable instructions may further cause the hardware processor to route the alert to a user computing device.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 6A depicts an example interface for obtaining attributes of a resource according to some embodiments.

FIG. 6B depicts an example interface for obtaining attributes of a resource according to some embodiments.

DETAILED DESCRIPTION

General Overview

Figure 1:
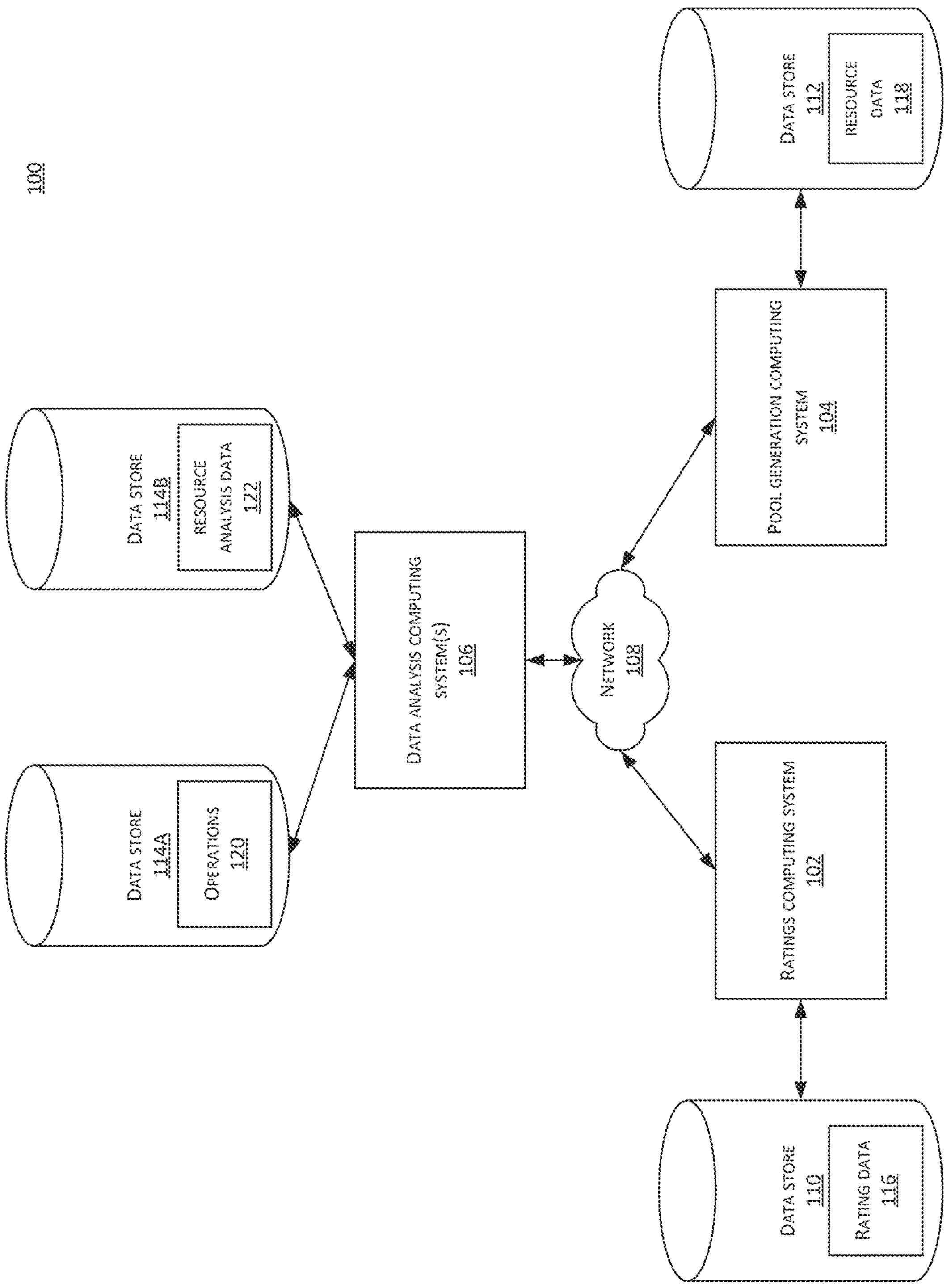
FIG. 1 depicts a schematic diagram of an example data analysis computing system according to some embodiments.

The present disclosure generally relates to identifying operations (e.g., tasks, actions, etc.) for individual resources (e.g., objects) of a pool of resources (e.g., a grouping of resources). For example, the resources may be computing resources. The operations can modify attributes of a resource (e.g., an amount of memory assigned to a particular job, a number of jobs assigned to the resource, an amount of fragmentation within memory, an amount of memory occupied by unused data, a network assigned to the resource, etc.) to indirectly or directly adjust (e.g., cause an improvement to) a characteristic (e.g., metric) of the resource that is measured based on private data (e.g., confidential data, personal data, protected data, classified data, etc.) associated with the resource. For example, the private data may be data that is not accessible and/or modifiable by a particular system.

As the private data that is used to measure a characteristic of a resource may not be accessible and/or modifiable by a particular system, the system may identify attribute(s) of the resource (that the particular system can access and/or modify) that the system predicts to (indirectly) cause an adjustment to the characteristic of the resource. Specifically, the system can identify operations that the system predicts to cause an adjustment to the characteristic (e.g., a processing power, an availability, a memory usage, a computer utilization, a throughput, etc.) of the resource by modifying attributes of the resource instead of the private data associated with the resource. By differentiating operations that modify attributes of the resource from operations that modify the private data associated with the resource, the system can adjust the characteristic of the resource in an efficient and secure manner.

While the characteristic of the resource may be defined based on the private data, the operations that modify the attributes of the resource may indirectly cause an adjustment to the characteristic of the resource without modifying the private data. For example, the private data may identify the components (e.g., hardware components) that the resource includes and/or the capabilities (e.g., computing capabilities) of the resource and the characteristic may be measured based on the components and/or capabilities. However, an adjustment to one or more attributes (e.g., an amount of memory assigned to a particular job) can indirectly cause an adjustment to the characteristic that is measured based on the components and/or capabilities. Therefore, the system can identify an operation that is predicted to result in an adjustment to the characteristic of the resource without adjusting the data by which the characteristic is measured (e.g., while retaining data privacy of the private data and without modifying the components and/or the capabilities identified by the private data).

By causing an adjustment to the characteristic of a resource, the operations can indirectly or directly cause an improvement to a characteristic of the pool of resources (e.g., a pool characteristic). For example, the pool characteristic may be a processing power of the pool of resources, an availability of the pool of resources, a memory usage of the pool of resources, a computer utilization of the pool of resources, a throughput of the pool of resources, etc.

Specifically, a system may evaluate the pool of resources (e.g., periodically) and determine a pool characteristic of the pool of resources based at least in part on performance of the operations. For example, the system may evaluate a pool of computing resources and determine an availability of the pool of computing resources. Based on the availability of the pool of computing resources, the system may identify a pool characteristic (e.g., highly available, available, unavailable, highly unavailable, etc.) for the pool of computing resources.

To determine the pool characteristic of the pool of resources, the system may analyze private data associated with the pool of resources. Specifically, the system may analyze the private data to determine one or more computing capabilities (e.g., processing, storage, communication, etc. capabilities) of the pool of resources and/or one or more components (e.g., hardware components) of the pool of resources. For example, the computing capabilities may include a bandwidth, a network latency, a network speed, a memory constraint (e.g., an amount of available memory (random-access memory, read-only memory, etc.)), a network packet loss, an amount of network packets transmitted between the resources, processing power, etc. associated with the pool of resources. In another example, the components of the pool of resources may include an amount of memory assigned to all or a portion of the pool of resources, an amount of processors assigned to all or a portion of the pool of resources, etc. The system may determine the pool characteristic of the pool of resources based on analyzing the private data.

In some cases, a third-party computing system may identify the pool characteristic of the pool of resources. For example, the third-party computing system may analyze the private data associated with the pool of resources, identify computing capabilities of the pool of resources and/or components of the pool of resources, and identify a pool characteristic (e.g., high processing capabilities, low storage capabilities, etc.) of the pool of resources. The third-party computing system may provide the pool characteristic to the system (e.g., in response to a request by the system).

In some cases, the system (or the third-party computing system) may identify the pool characteristic by comparing private data (e.g., the computing capabilities and/or components) of the pool of resources to private data (e.g., the computing capabilities and/or components) of a different pool of resources (e.g., the pool of resources may have low processing capabilities as compared to the processing capabilities of a different pool of resources). In some cases, the third-party computing system may monitor communications between, from, and/or to the pool of resources to identify the pool characteristic for the pool of resources.

The pool characteristic of the pool of resources may be based at least in part on characteristics (referred to herein as resource characteristics) of individual resources of the pool of resources or on the resource characteristics of a plurality of resources of the pool of resources. The system may identify a resource characteristic of each resource based on analyzing the one or more computing capabilities and/or components of the individual resource. For example, the system may identify a resource characteristic for all or a portion of the resources of the pool of resources and/or a pool characteristic of the pool of resources. In some cases, the third-party computing system may also analyze the resources and identify resource characteristics for the resources.

The individual resource characteristic(s) of a resource may be based on an evaluation of private data associated with the individual resource. Specifically, the system may analyze the private data to determine one or more computing capabilities (e.g., processing, storage, communications, etc. capabilities) and/or one or more components of the individual resource. For example, the computing capabilities may include a bandwidth, a network latency, a network speed, a memory constraint (e.g., an amount of available memory (random-access memory, read-only memory, etc.)), a network packet loss, a number of network packets transmitted between the resources, processing power, etc. associated with the resource. In another example, the components of the resource may include an amount of memory assigned to the resource, an amount of processors assigned to the resource, etc.

The system may analyze the pool of resources to predict variances (e.g., adjustments) of the resource characteristic of a particular resource and/or the pool characteristic of the pool of resources (e.g., over a period of time). For example, it may be advantageous to predict how a characteristic changes over time. However, the characteristics associated with the resources, the private data associated with the resources, the components of the resources identified by the private data, and/or the computing capabilities of the resources identified by the private data may not be directly adjustable by the system. For example, the system may not be able to directly modify a characteristic (e.g., from unavailable to highly available) as the characteristic may be defined and/or adjusted by the third-party computing system. Further, the characteristics may be based on computing capabilities and/or components of the resources and the system may be unable to directly modify the computing capabilities and/or components (e.g., by assigning additional processors to a resource). In some cases, the system may not have authorization (e.g., permissions, certificates, etc.) to directly adjust the characteristics associated with the resources, the private data associated with the resources, the components of the resources identified by the private data, and/or the computing capabilities of the resources identified by the private data.

To predict variances to the characteristics of the resources (and the characteristic of the pool of resources) without directly adjusting the characteristics, the components, and/or the computing capabilities of the resources, the system can identify operations for (e.g., operations to cause to modifications to) attributes of the resources (e.g., data associated with the resources). Specifically, the system may identify operations for which an entity (e.g., the system, a separate system, a user, etc.) has authorization to perform (e.g., operations to adjust attributes) and the system may identify operations for which the entity does not have authorization to perform (e.g., operations to adjust private data). The system can parse a plurality of operations to identify a subset of operations for which the entity has authorization to perform.

The system can identify the operations based on predicting that the particular operations can cause a particular variance to the characteristics of the resources. Further, the system can identify operations to adjust the attributes of individual resources of the pool of resources (e.g., a number of jobs assigned to the resource) that the system predicts to cause a particular adjustment of the characteristic of the pool of resources when the characteristic is re-identified by the system (e.g., illustrating a change in the evaluation by the system). The particular adjustment of the characteristic of the pool of resources may include an adjustment from a first characteristic to a second characteristic (e.g., from unavailable to highly available).

The operations may adjust attributes of individual resources without adjusting the pool of resources as a whole, without adjusting the underlying components (e.g., hardware components of the resources), without directly adjusting the computing capabilities of the resources, without directly adjusting a characteristic of the resource, without directly adjusting the characteristics associated with the resources, and/or without adjusting the private data associated with the resources. Instead, the operations for specific attributes of specific resources are identified based at least in part on a determination that the operations to adjust an attribute of a resource may cause (e.g., are predicted to cause) a particular adjustment to the characteristic of the pool of resources. For example, an operation can include reducing the number of jobs assigned to a resource which can increase the amount of available memory for a computing resource and may cause an adjustment of the characteristic of the pool of resources. In another example, an operation can include removing a computing resource with a high network packet loss (e.g., greater than 5 network packets are lost per 10 network transmissions) from the pool of resources which may cause an adjustment of the characteristic (e.g., the network packet loss) of the pool of resources.

Based on identification of the operations, the system can recommend performance of the operations (e.g., via a user computing device) and/or can automatically cause performance of the operations. In response to the performance of the operation, the system (or the third-party computing system) may reanalyze the pool of resources and identify an updated characteristic for the pool of resources.

In some cases, the system can determine that a particular operation may cause a particular variance to a characteristic of a pool of resources. Based on determining that the particular operation may cause the particular variance, the system may recommend the pool of resources. For example, the system may recommend a user to obtain the pool of resources. In some cases, the system may compare variances of a particular characteristic caused by different operations to determine a particular operation that may cause a greatest variance to the particular characteristic as compared to the other variances. Further, the system may compare a respective variance for all or a portion of multiple pools of resources and may identify a pool of resources associated with a greatest variance to an associated characteristic as compared to respective variances for the other pools of resources. The system may recommend the pool of resources based on determining that the pool of resources is associated with a greatest variance.

Pool of Resources Overview

The resources may include any resources (e.g., computing resources or non-computing resources) that may be pooled together. For example, the resources may include computing devices, computing systems, or any other computing resources. Further, the resources may include physical computing resources.

In another example, each of the resources may correspond to one or more loans, business loans, mortgages, bonds, corporate bonds, notes, etc. For example, the pool of resources may be a pool of business loans. Each of the resources may be, may include, or may otherwise correspond to data associated with one or more loans, business loans, mortgages, bonds, corporate bonds, notes, etc. For example, each of the resources may include an identifier of a loan, an identifier of a business associated with a loan, an identifier of a quantity of loans, an identifier of a loan characteristic, etc.

Generally described, a pool of resources may include any pool of resources or data that may be grouped (e.g., by a pool holder). Each of the resources of the pool of resources may be associated with a particular resource holder (e.g., a loan holder) who manages, owns, etc. or is otherwise associated with an individual resource. For example, the pool of resources may include a pool of business loans that is managed by a pool holder and each loan of the pool of the pool of business loans may be associated with a loan holder (e.g., a lender, a borrower, etc.) to which the loan is associated (e.g., assigned).

The pool of resources may be associated with a pool holder who manages, owns, etc. the pool of resources. The pool holder may group the resources together to form a pool of resources. For example, the pool holder may group business loans to form a pool of business loans. In some implementations, the pool holder may acquire the pool of resources from an original pool holder and/or provide the pool of resources to a different pool holder.

The pool of resources may include any number of resources. For example, the pool of resources may include 1,000 resources, 10,000 resources, etc. Where the pool of resources includes a pool of loans, each pool of loans may have an associated loan amount (e.g., $50,000, $100,000, $150,000, etc.) and the pool of loans may have an associated pool amount (e.g., $150,000,000, $250,000,000, $500,000,000).

Resource Components and Capabilities Overview

At least a portion of the pool of resources and/or at least a portion of individual resources of the pool of resources may include private data (e.g., components and/or capabilities of the resources) that particular resource holders do not desire to share with other entities or to be modified by other entities. For example, the private data may be proprietary data or data that is not otherwise publicly available or modifiable by particular systems. In one example, the pool of resources may be a pool of business loans and the private data may be the terms of the business loans.

The private data of each resource of the pool of resources may be accessible and/or modifiable by particular entities and not accessible and/or modifiable by other entities. Access and/or modification of the private data of a particular resource may be restricted to a particular subset of entities. For example, the pool of resources may include a pool of business loans and a particular business loan (e.g., the terms of the particular business loan) may be modified by the loan holder but may not be modified by another entity (e.g., a ratings computing system, a pool generation computing system, a loan holder of another business loan, a management entity for the pool of business loans, etc.).

Pool Characteristics Overview

The pool of resources may be associated with a pool characteristic. The pool characteristic may include or specify a measurement (e.g., a value, quality, rating, etc.) of the pool of resources. Further, the pool characteristic may be a measurement (e.g., rating, ranking, score, etc.) of the pool of resources on a particular scale. For example, the pool characteristic may be a numerical rating (e.g., a rating on a scale of 1 to 10 with 1 being the lowest rating and 10 being the highest rating), a symbolical rating (e.g., a rating on a scale of – to ++ with – being the lowest rating and ++ being the highest rating, a term (e.g., a rating on scale of failing to excellent with failing being the lowest rating and excellent being the highest rating), or any other rating, ranking, score, quality indicator, etc.

The pool characteristic may identify (e.g., identify a measurement of) one or more of a risk of default, a rate of return, etc. for the pool of resources. For example, the pool characteristic may specify a measurement of a rate of return of a pool of business loans based on respective rates of return for individual business loans of the pool of business loans.

A system (e.g., a third-party computing system) may dynamically identify the pool characteristic based at least in part on an evaluation of the pool of resources For example, the third-party ratings computing system may dynamically identify the pool characteristic and provide the pool characteristic to the system. In some cases, the pool characteristic may be based at least in part on private data that is inaccessible by one or more entities.

Resource Characteristics Overview

The pool of resources may be associated with one or more pool specific characteristics (e.g., pool characteristics) and each resource of the pool of resources may be associated with one or more individual resource specific characteristics (e.g., resource characteristics). The pool specific characteristics may be a measurement of the pool of resources and the resource specific characteristics may be a measurement for a particular resource of the pool of resources. For example, the pool specific characteristics and the resource specific characteristics may each be a value, a rating, a score, a ranking, etc.

The pool characteristic for a pool of resources may be determined or generated based at least in part on the individual resource characteristics for all or a portion of the resources of the pool of resources. Therefore, all or a portion of the resources of the pool of resources may impact the pool characteristic of the pool of resources. For example, a loan with a low risk of default (e.g., a 10% probability of default within the next year) and a loan with a high risk of default (e.g., a 75% probability of default within the next year) may each have an impact on the value of a pool of business loans. However, the loan with the high risk of default may have a disproportionate impact on the value of the pool of business loans.

Each resource characteristic may be calculated (e.g., generated) using private data (e.g., components, capabilities, etc.) of the resource and/or attributes of (e.g., data associated with) the resource. For example, the pool of resources may include a pool of business loans and the resource characteristic of each business loan may be calculated based on private data (e.g., the terms of the particular business loan) and the attributes of the resource (e.g., a bank rating associated with the loan holder, a number of trade lines associated with the loan holder, a number of loans associated with the loan holder, a standing of a business associated with the loan holder, a status of a business associated with the loan holder, a quantity of assets of a business associated with the loan holder, or an age of a business associated with the loan holder).

A system may calculate the resource characteristic by comparing each attribute to one or more associated threshold values or ranges. For example, an attribute (e.g., the number of loans associated with a loan holder) may be compared with a first threshold value or range, a second threshold value or range, and a threshold value or range. If the attribute satisfies the first threshold value or range, the resource may be associated with a first rating or score, if the attribute satisfies the second threshold value or range, the resource may be associated with a second rating or score, and if the attribute satisfies the third threshold value or range, the resource may be associated with a third rating or score.

In some cases, the threshold values or ranges may be predetermined or provided by a user. For example, the threshold values or ranges may be provided by a third-party computing system. In other cases, the threshold values or ranges may be determined (e.g., in real-time) relative to the pool of resources. For example, the system may analyze the resources and determine that 90% of resource holders associated with a resource have 5 or less loans, 95% of resource holders associated with a resource have 8 or less loans, and 98% of resource holders associated with a resource have 10 or less loans. The system may then assign the resources associated with resource holders ranked in the bottom 90% a rating of 0, the resources associated with resource holders ranked between 90% and 95% a rating of n, the resources associated with resource holders ranked between 95% and 98% a rating of m, and the resources associated with resource holders ranked 98% and above a rating of j.

The ratings for each attribute for a given resource may be aggregated to determine a total rating (e.g., the resource characteristic) for the resource. In some cases, in addition to or instead of aggregating the ratings, additional and/or different mathematical operations (e.g., multiplication) may be performed on the ratings for each attribute for a given resource to determine the resource characteristic.

Prior to, subsequent to, or during aggregation of the ratings, all or a portion of the ratings may be weighted with a weight associated with the corresponding attribute. In some cases, the weighted ratings may be aggregated to determine the resource characteristic. Each attribute may be associated with a particular weight. For example, the number of loans may have a first weight (e.g., a weight of 10) and the number of trade credit lines may have a second weight (e.g., a weight of 10). The weights may be predetermined. In some cases, the weights may be provided by a user computing device.

Modifications to Resource Attributes Overview

As noted above, the attributes of a resource may change and therefore, the value, quality, rating, etc. of a pool of resources. However, the measurement of the value, quality, rating, etc., of the pool of resources (e.g., the pool characteristic) may not change (e.g., may not be updated). For example, the third-party computing system may periodically update the pool characteristic (e.g., every week, every ten days, etc.). Therefore, the pool characteristic provided by the third-party computing system may not be accurate (e.g., the pool characteristic may not represent an up to date (e.g., current) measurement of the value, quality, rating, etc. of the pool of resources).

It may be disadvantageous for the system to not provide an updated characteristic to a pool holder after attributes associated with an individual resource are modified and instead, provide the updated characteristic on a predetermined schedule. For example, the attributes associated with a particular resource may be updated during a first time period and the pool characteristic may not be updated until a second time period (e.g., a week later) and it may be disadvantageous for the system to not provide an updated pool characteristic to the pool holder until the second time period.

In certain cases, a pool holder may desire to sell or buy a pool of resources based at least in part on real time attributes of the pool of resources. However, because the pool characteristic provided by the third-party computing may not be updated, the pool holder may be unable to determine whether to sell or buy the pool of resources. Instead, the pool holder may rely on an outdated pool characteristic provided by the third-party computing system.

Determining whether to sell or buy a pool of resources based at least in part on outdated pool characteristics may be disadvantageous as the value, quality, rating, etc. may change over time and the pool characteristic may not be an accurate and/or current measurement of the value, quality, rating, etc. Additionally, in other cases, a pool holder may provide access to each resource of the pool of resources to modify resources of the pool of resources. However, such access to modify resources of the pool of resources may be disadvantageous as each resource of the pool of resources may include private data and providing access to modify the resources may reduce data security.

Additionally, as the number of resources in the pool of resources may be large (e.g., over 1,000 resources), the pool holder may be unable to manually examine each resource of the pool of resources in an efficient manner. Further, it would be inefficient and time consuming for the pool holder to compare each resource of the pool of resources to identify particular resources for modification. When the manual process of comparison is completed, the individual resource characteristics may have changed and the comparison may no longer be valid. Therefore, such traditional systems may lead to inaccuracies as the pool characteristics may not be improved. Further, the use of such traditional systems can increase memory demands and processing usage by computing devices due to the iterative process.

Typically, such traditional systems may be unable to dynamically analyze a pool of resources and determine operations to adjust individual resources of the pool of resources to improve a pool characteristic of the pool of resources. Further, such traditional systems may be unable to identify an operation that has a greater likelihood of resulting in a particular pool characteristic of the pool of resources or a particular change to the pool characteristic as compared to other operations.

Data Analysis Computing System Overview

Some aspects of this disclosure address the problems noted above, among others by identifying an operation for an individual resources of the pool of resources and requesting an updated pool characteristic for the pool of resources based at least in part on the identified operation. A system can dynamically analyze a pool of resources and determine a predicted updated pool characteristic.

In some cases, the system may analyze the attributes of a resource. Based on analyzing the attributes of the resource, the system can determine an updated resource characteristic, determine a rate of change of the resource characteristic, compare a resource characteristic at a first time to a resource characteristic at a second time, etc. and predict the resource characteristic.

The system may monitor, in real time, and/or analyze attributes of the pool of resources over a period of time. Based at least in part on monitoring and/or analyzing the attributes of the pool, the system can identify a resource characteristic for each resource of the pool of resources. For example, the system can predict a resource characteristic, determine a rate of change of the resource characteristic, compare a resource characteristic at a first time to a resource characteristic at a second time, etc.

The system can automatically identify a particular resource of the pool of resources based on the identified resource characteristics. For example, the system can automatically identify a resource with a predicted resource characteristic. For example, the system can identify a resource associated with a difference between a resource characteristic of the resource and the predicted resource characteristic of resource exceeding a threshold value, the difference between the resource characteristic and the predicted resource characteristic greater than one more differences between the resource characteristic and the predicted resource characteristic of other resources, the predicted resource characteristic exceeding the threshold value, etc.

In some cases, the system, based on monitoring and/or analyzing the attributes, can identify a predicted resource characteristic resulting without the system causing performance of an operation. For example, the system may predict, during a first time period, a resource to be associated with a particular resource characteristic during a second time period subsequent to the first time period.

Based on the determined resource characteristics for all or a portion of the resources, the system can predict a pool characteristic for the pool of resources. Further, the system may predict the pool characteristic for the pool of resources by parsing a set of potential pool characteristics. For example, the system can parse a set of potential pool characteristics for the pool of resources and identify a pool characteristic associated with the pool of resources.

In some cases, the system can identify one or more operations that the system predicts to cause the resource to have a particular resource characteristic (and the pool of resources to have a particular pool characteristic). For example, the system can analyze each resource of the pool of resources and identify particular resources for which an associated resource characteristic (e.g. value) can be increased (e.g., by performing operations such as recommending additional trade lines for a loan holder associated with the resource) and particular resources for which an associated resource characteristic may not be likely to (e.g., less than 30% likelihood) increase over a particular threshold value (as determined by the system).

The system may identify the operation from a plurality of operations. For example, the system may store data identifying potential operations for a resource and/or a pool of resources. Based on analyzing all or a portion of the resources of the pool of resources, the system can identify a resource and parse the plurality of operations to identify an operation for the resource.

The plurality of operations may include operations to remove the resource from the pool of resources, add a resource (e.g., a similar resource to the pool of resources), adjust attributes of the resource, etc. Specifically, the plurality of operations may include an operation to cause an adjustment to an attribute of the resource (e.g., a rehabilitation operation), an operation to cause removal of the resource from the pool of resources (e.g., a removal operation), and/or an operation to add the resource to the pool of resources or a different pool of resources (e.g., an addition operation). For example, where the operation is an operation to adjust the attributes of the resource and the pool of resources includes a pool of business loans, the system can identify a plurality of operations that may cause modifications to attributes of the business loans that can include one or more of a bank rating for each business loan, an eligibility to upgrade the bank rating for each business loan, a room for expansion for each business loan, and/or loan holder data (e.g., a number of buildings associated with the loan holder, a number of trade credit lines associated with the loan holder, a seasoning of a business associated with the loan holder, whether the loan holder accepts credit cards as payment, a standing of the loan holder, etc.).

In some cases, the system can provide data associated with the pool of resources to a machine learning model. The machine learning model may be trained to output a particular operation predicted to cause the pool of resources to have a greatest resulting characteristic and/or a greatest difference between a current characteristic and the resulting characteristic.

The system may identify a plurality of operations for a plurality of resources. For example, the system can identify resources for rehabilitation (e.g., resources for which one or more rehabilitation operations are recommended) and/or resources for removal from the pool of resources (e.g., resources for which one or more removal operations are recommended) based on the attributes of the resources. The system can predict a resource characteristic for each resource and a pool characteristic of the pool of resources resulting from the performance of a particular operation.

In some cases, the system can identify an operation predicted to result in an improved pool characteristic of a pool of resources as compared to another pool characteristic (e.g., the current pool characteristic, a pool characteristic predicted to result from performance of another operation, etc.). Therefore, the system can identify a particular operation, from a plurality of operations, for performance.

Based at least in part on identifying the operation, the system can cause and/or recommend performance of the operation. By causing performance of the operation, the system can improve the pool characteristic of the pool of resources without modifying private data associated with the resource.

To recommend performance of the operation, the system may cause display of a prompt that prompts a user (e.g., a resource holder) to adjust a particular attribute of the resource (e.g., add additional trade credit lines associated with the loan holder), remove a resource from the pool of resources, and/or add a resource to the pool of resources. For example, the system can generate an alert. This alert may be transmitted to a user computing device enabling display or output of the alert via a user interface. For example, the alert may include a recommendation or prompt to buy or sell a particular resource of the pool of resources. In some cases, the operations may cause the system to automatically adjust a particular attribute, remove a resource from the pool of resources, and/or add a resource to the pool of resources.

Further, the system can route a request to update the pool characteristic of the pool of resources to a third-party computing system (e.g., based on performance of the operation(s)). Based on the system requesting an updated pool characteristic for the pool of resources, a third-party computing system (e.g., a ratings computing system) may determine the pool characteristic for the pool of resources.

In some cases, the system can recommend buying or selling a particular pool of resources based at least in part on the predicted pool characteristic for the pool of resources. For example, the system can recommend buying a particular pool of resources based on determining the predicted pool characteristic indicates a greater value than a current pool characteristic of the pool of resources.

In some cases, the system can identify predicted pool characteristics for multiple pools of resources. The system can identify an operation for a first pool of resources that the system predicts can cause the first pool of resources to have a greatest pool characteristic as compared to pool characteristics predicted to result from the performance of other operations. Additionally, the system can identify an operation for a second pool of resources that the system predicts can cause the second pool of resources to have a greatest pool characteristic as compared to pool characteristics predicted to result from the performance of other operations.

In some implementations, the system can compare multiple pools of resources (e.g., the predicted pool characteristics of multiple pools of resources). In order to compare the multiple pools of resources, the system can identify the multiple pools of resources and can predict an updated pool characteristic for each of the multiple pools of resources. Further, the system can compare the predicted pool characteristic for each of the multiple pools of resources. In some embodiments, the system can compare resource characteristics for each of the multiple pools of resources. Based at least in part on the comparison, the system can generate an alert. This alert may be transmitted to a user computing device enabling display or output of the alert via a user interface. For example, the alert may include a recommendation to buy or sell a particular pool of resources of the multiple pools of resources.

In light of the description above, it will be understood that the embodiments disclosed herein substantially increase data security. Specifically, the embodiments disclosed herein enable a system to dynamically analyze a pool of resources that includes private data (e.g., loans, terms of the loans, etc.) without providing access to the private data and/or enabling modification of the private data. The ability to dynamically analyze the resources of the pool of resources and identify particular resources enables the individual resource holder to avoid providing direct access to the private attributes of a particular resource. Further, by dynamically monitoring public data (e.g., the attributes) associated with the resources of the pool of resources, the system can avoid accessing and/or modifying the private data of individual resources, thereby ensuring that the private data of individual resources remains private.

With regards to a pool of business loans, such a dynamic monitoring of the pool of business loans and identification of particular business loans enables non-pool holders and/or non-loan holders (e.g., non-loan holders of the particular business loans) to determine whether to buy or sell a particular pool of business loans without accessing private data of the pool of business loans. Thus, the presently disclosed embodiments represent an improvement in the functioning and security of private data, both electronic data and physical data. By improving the functioning and security of private sets of data, Internet/network communications and other communications are improved. Moreover, the presently disclosed embodiments address technical problems inherent within the communication of private data; specifically, how to analyze a pool of resources without providing access to private data of individual resources of the pool of resources. These technical problems are addressed by the various technical solutions described herein, including the inclusion of computer-executable instructions within a data analysis apparatus that identifies individual resources of the pool of resources and requests an updated pool characteristic for the pool of resources based at least in part on the identified individual resources. Thus, the present application represents a substantial improvement on existing data security in general.

Various aspects of the disclosure will now be described with regard to certain examples and embodiments, which are intended to illustrate but not limit the disclosure. As explained above, identifying individual resources of the pool of resources and requesting an updated pool characteristic for the pool of resources based at least in part on the identified individual resources may be applied in different contexts. To simplify discussion and not to limit the present disclosure, the following discussion revolves around identifying individual business loans of a pool of business loans. However, one skilled in the art will appreciate that the techniques disclosed herein may be applied to any number of other contexts and/or with other resources, such as groups of users, organizations, or other entities.

Example Environment Including a Data Analysis Computing System

FIG. 1 illustrates an example environment 100 in which a data analysis computing system 106 is implemented according to some embodiments, enabling the identification of a particular resource from resource data 118 and an operation for the resource. The example environment 100 includes a ratings computing system 102, a pool generation computing system 104, and data analysis computing system(s) 106 that are each connected and/or communicating over a network 108. In some embodiments, more or less systems are included in the example environment 100. For example, the example environment 100 may include multiple pool generation computing systems 104.

One or more of the ratings computing system 102, the pool generation computing system 104, and the data analysis computing system(s) 106 may be the same system. For example, one system may perform multiple functions such as generation of the pool of resources and identification of a resource of the pool of resources. Further, a system may implement one or more of the ratings computing system 102, the pool generation computing system 104, and the data analysis computing system(s) 106.

The ratings computing system 102, the pool generation computing system 104, and the data analysis computing system(s) 106 refer to computing devices or systems that compute, assemble, store, correlate, or otherwise process information. The ratings computing system 102, the pool generation computing system 104, and the data analysis computing system(s) 106 can include, but are not limited to, a personal computer, a server computer, a laptop device, a tablet, a multiprocessor system, a microprocessor-based system, a network PC, a minicomputer, a mainframe computer, or a distributed computing environment that includes any of the above systems or the like.

Each of the ratings computing system 102, the pool generation computing system 104, and the data analysis computing system(s) 106 includes, is connected to, or is in communication with a respective data store 110, 112, 114A, and 114B. Each data store 110, 112, 114A, and 114B may maintain and/or may access attributes of the pool of resources. For example, the data store 110 stores rating data 116 corresponding to a pool characteristic of the pool of resources. Further, the data store 112 stores resource data 118 identifying resources of the pool of resources. The data store 114A stores operations 120 corresponding to operations that can be performed on resources of the pool of resources. The data store 114B stores resource analysis data 122 corresponding to results of analyzing the pool of resources. Each data store 110, 112, 114A, and 114B may store corresponding information, such as the operations 120, as a set of local variables.

As shown in FIG. 1, the ratings computing system 102 maintains and/or may access a data store 110, the pool generation computing system 104 maintains and/or may access a data store 112, and the data analysis computing system 106 maintains and/or may access a data store 114A and a data store 114B. In some embodiments, two or more of the data stores 110, 112, 114A, and 114B may be implemented as a single data store. For example, one data store may store the operations 120 and the resource analysis data 122. Further, the ratings computing system 102, the pool generation computing system 104, and the data analysis computing system(s) 106 may each maintain and/or access one or more data stores (e.g., a data store storing the rating data 116, the resource data 118, the operations 120, and the resource analysis data 122). Each of the ratings computing system 102, the pool generation computing system 104, and the data analysis computing system(s) 106 may be in communication with a respective data store 110, 112, 114A, and 114B. In some embodiments, each of the ratings computing system 102, the pool generation computing system 104, and the data analysis computing system(s) 106 communicates with a respective data store 110, 112, 114A, and 114B through the network 108.

Elements of the example environment 100 including one or more of the ratings computing system 102, the pool generation computing system 104, and the data analysis computing system(s) 106 or the data stores 110, 112, 114A, and 114B can be implemented at a network computing service or cloud provider network (sometimes referred to simply as a "cloud"). The cloud provider network may include a pool of network-accessible computing resources (such as compute, storage, and networking resources, applications, and services), which may be virtualized or bare-metal. The cloud can provide on-demand network access to a shared pool of configurable computing resources that can be programmatically provisioned and released in response to commands. These resources can be dynamically provisioned and reconfigured to adjust to variable load.

The network 108 can include the Internet, an intranet network, a cellular communication network, a wide area network ("WAN"), a local area network ("LAN"), a personal area network ("PAN"), a wireless local area network ("WLAN"), or other networks. In some implementations, each of the ratings computing system 102, the pool generation computing system 104, and the data analysis computing system(s) 106 communicates with a subset of the ratings computing system 102, the pool generation computing system 104, and the data analysis computing system(s) 106. For example, the ratings computing system 102 may communicate with the data analysis computing system 106 and the data analysis computing system 106 may communicate with the pool generation computing system 104.

The pool generation computing system 104 may receive resource data 118 from the data store 112 via network communications. The resource data 118 may identify a plurality of resources. The pool generation computing system 104 may filter the plurality of resources to identify a subset of the plurality of resources. The pool generation computing system 104 may generate a pool of resources that includes the subset of the plurality of resources. In some cases, the pool generation computing system 104 may identify the subset of the plurality of resources to be included in the pool of resources based at least in part on a pool generation request. For example, the pool generation computing system 104 may receive a pool generation request that identifies the subset of the plurality of resources to be included in the pool of resources.

In some cases, the pool generation computing system 104 may group the subset of the plurality of resources to be included in the pool of resources based at least in part on a common ownership and/or management of each resource of the subset of the plurality of resources by a particular pool holder. For example, the pool generation computing system 104 may group the subset of the plurality of resources by generating metadata for each resource identifying the pool of resources. In some cases, the pool generation computing system 104 may write the metadata to each resource.

Further, a pool of resources may be associated with one pool holder and multiple resource holders. A resource holder may be associated with each particular resource and a pool holder may own and/or manage the pool of resources (and each resource of the pool of resources). For example, a resource holder may be a loan holder (e.g., a lender, a borrower, etc.) and the pool holder may be the owner of the loan who maintains the right to service the loan, collect payment on the loan, etc. In some cases, the pool holder may be the original lender (e.g., loaner) of the loan and the resource holder may be the original borrower of the loan. Further, the loan may be executed between the loan holder (the borrower) and the pool holder (the lender). In other cases, the pool holder may not be the original lender, the resource holder may be the original borrower of the loan, and the original lender may be an intermediary resource holder or intermediary pool holder that provides (e.g., sell, transfer, etc.) rights associated with the loan to the pool holder.

In some cases, the resource holder, the pool holder, etc. may provide (e.g., transfer, sell, etc.) the resource (e.g., the loan) to a second entity (e.g., a second pool holder) who inherits particular rights associated with the resource (e.g., the right to service the loan, collect payment on the loan, etc.). In some cases, the resource holder, the pool holder, etc.

may group the resource with a pool of resources and provide (e.g., transfer, sell, etc.) the pool of resources to the second entity (e.g., the second pool holder) who inherits particular rights associated with each of the resource (e.g., the rights to service each loan of the pool of loans, collect payment on each loan of the pool of loans, etc.).

The pool generation computing system 104 may provide the resource data 118 to the ratings computing system 102 via a network communication. The ratings computing system 102 may generate a resource characteristic (e.g., rating) of a resource of the pool of resources and/or a pool characteristic (e.g., a rating) for the pool of resources based at least in part on the resource data 118. The ratings computing system 102 may store the resource characteristic and/or the pool characteristic as rating data 116 in the data store 110.

In some cases, the ratings computing system 102 (or a separate system) may generate individual resource characteristics of each resource of the pool of resources. For example, the individual resource characteristics may be a measurement of a risk, a value, a quality, etc. associated with the resource. The individual resource characteristics may be based at least in part on the attributes of an associated resource. In the example of a pool of loans, the attributes of a resource can include a bank rating associated with the loan holder, a number of trade lines associated with the loan holder, a number of loans associated with the loan holder, a standing of a business associated with the loan holder, a status of a business associated with the loan holder, a quantity of assets of a business associated with the loan holder, or an age of a business associated with the loan holder.

The ratings computing system 102 may generate the pool characteristic based at least in part on resource characteristics of resources of the pool of resources. For example, the ratings computing system 102 may determine a rating of a pool of loans (the pool characteristic) based at least in part on individual values of each loan of the pool of loans (the resource characteristics).

The pool generation computing system 104 may aperiodically or periodically update the resource characteristic of resources of the pool of resources and/or the pool characteristic of the pool of resources. For example, the pool generation computing system 104 may automatically update the pool characteristic every week. The pool generation computing system 104 may provide the rating data 116 to the data analysis computing system 106 and/or the pool generation computing system 104 via a network communication.

The data analysis computing system 106 can obtain the rating data 116 from the ratings computing system 102 and the resource data 118 from the pool generation computing system 104 via a network communication. For example, the data analysis computing system 106 can obtain the rating data 116 and/or the resource data 118 periodically.

The data analysis computing system 106 can obtain the rating data 116 and the resource data 118 and analyze the rating data 116 and/or the resource data 118. The data analysis computing system 106 may analyze the rating data 116 and/or the resource data 118 to determine how changes to attributes of the resource may affect a resource characteristic associated with the resource.

In some cases, the ratings computing system 102 may use a specification (e.g., formula, method, calculation, etc.) to generate rating data 116 (e.g., a resource characteristic and/or a pool characteristic). The ratings computing system 102 may provide the specification to the data analysis computing system 106. In some cases, the data analysis computing system 106 may utilize the specification to predict rating data of the pool of resources.

In some cases, the data analysis computing system 106 can analyze the resource data 118 to determine how the resource data 118 changes over time. For example, the data analysis computing system 106 can monitor the resource data 118 to identify a difference between a first set of resource data 118 corresponding to a first time period and a second set of resource data 118 corresponding to a second time period. Further, the data analysis computing system 106 can monitor the resource data 118 to determine a rate of the change in the resource data 118. For example, the data analysis computing system 106 can monitor the resource data 118 to identify how much the resource data 118 changes over a given period of time (e.g., from a first period of time to a second period of time).

The data analysis computing system 106 may generate a predicted resource characteristic for a particular resource based at least in part on analyzing the resource data 118. For example, the data analysis computing system 106 can predict a resource characteristic based at least in part on a change in a particular attribute of the resource. For example, the data analysis computing system 106 may obtain (e.g., from the ratings computing system 102) data identifying how resource characteristics are determined. Further, the data may identify threshold values, weights, etc. for determining the resource characteristic.

The data analysis computing system 106 may calculate the predicted resource characteristic by comparing each attribute (including one or more modified attributes) to one or more associated threshold values or ranges. For example, an attribute (e.g., the number of loans associated with a loan holder) may be compared with a first threshold value or range, a second threshold value or range, and a third threshold value or range. If the attribute satisfies the first threshold value or range, the resource may be associated with a first rating or score, if the attribute satisfies the second threshold value or range, the resource may be associated with a second rating or score, and if the attribute satisfies the third threshold value or range, the resource may be associated with a third rating or score.

In some cases, the data analysis computing system 106 may iteratively calculate predicted resource characteristics based at least in part on different modifications to the same attribute (e.g., a different number of loans), modifications to different attributes, combinations of various modifications to various attributes (e.g., a modification to a first attribute and a modification to a second attribute), etc. For example, the data analysis computing system 106 may determine how different modifications affect a resource characteristic and/or a pool characteristic.

In some cases, the threshold values or ranges may be predetermined or provided by a user. For example, the threshold values or ranges may be provided by the ratings computing system 102 via a network communication. In other cases, the data analysis computing system 106 may determine, in real-time, the threshold values or ranges relative to the pool of resources. For example, the data analysis computing system 106 may analyze the resources and determine that 90% of resource holders (e.g., resource holders associated with a resource of the pool of resources, resource holders associated with any resource, etc.) have 5 or less loans, 95% of the resource holders have 8 or less loans, and 98% of the resource holders have 10 or less loans. The data analysis computing system 106 may then determine that the resources associated with resource holders ranked in the bottom 90% should have a rating of 0, the resources associated with resource holders ranked between 90% and 95% should have a rating of n, the resources associated with resource holders ranked between 95% and 98% should have a rating of m, and the resources associated with resource holders ranked 98% and above should have a rating of j.

The ratings for each attribute for a given resource may be aggregated to determine a total rating (e.g., the resource characteristic) for the resource. In some cases, in addition to or instead of aggregating the ratings, the data analysis computing system 106 may perform additional and/or different mathematical operations (e.g., averaging or determining a mode or standard deviation) on the ratings for each attribute for a given resource to determine the resource characteristic.

Prior to aggregating the ratings, the data analysis computing system 106 may adjust each of the ratings according to a weight associated with the corresponding attribute. Further, the data analysis computing system 106 may aggregate the weighted ratings to determine the resource characteristic. Each attribute may be associated with a particular weight. For example, the number of loans may have a first weight (e.g., a weight of 10) and the number of trade credit lines may have a second weight (e.g., a weight of 10). In some cases, the data analysis computing system 106 may receive the weights from the ratings computing system 102. Therefore, the data analysis computing system 106 can predict the resource characteristic to be associated with a resource based at least in part on one or more modifications to an attribute of the resource. The data analysis computing system 106 can compare the resource characteristics associated with a resource to the predicted resource characteristics to identify a difference between the resource characteristic and the predicted resource characteristic.

As discussed above with reference to the resource characteristic, based at least in part on monitoring the resource data 118 (and identifying a predicted resource characteristic), the data analysis computing system 106 can predict a pool characteristic for each of the one or more modifications to the attributes of each resource. The data analysis computing system 106 can compare the predicted pool characteristic for each of the one or more modifications to the attributes of each resource to identify a particular resource of the pool of resources and an operation for the resource that results in a particular improvement in the pool characteristic. For example, the data analysis computing system 106 can identify a resource for which the predicted pool characteristic exceeds the pool characteristic by a particular threshold value. In some cases, the data analysis computing system 106 can identify a resource for which the predicted pool characteristic exceeds a particular threshold value, falls below a particular threshold value, and/or falls within a particular range. Further, the data analysis computing system 106 can identify a resource for which the predicted pool characteristic has a change over a period of time and/or a rate of change that exceeds a particular threshold value, falls below a particular threshold value, and/or falls within a particular range.

In some cases, the data analysis computing system 106 can compare multiple pools of resources. For example, the data analysis computing system 106 can analyze resource characteristics for multiple pools of resources. As discussed above with reference to the resource characteristic, the data analysis computing system 106 can determine a predicted pool characteristic for each pool. Further, the data analysis computing system 106 can compare the predicted pool characteristic for each of the pools and determine a pool with a particular predicted pool characteristic. For example, the data analysis computing system 106 can identify a pool with a pool characteristic that exceeds a pool characteristic of one or more different pools.

The data analysis computing system 106 can store data corresponding to the identified resource and the identified operation as resource analysis data 122 in the data store 114B. For example, the data analysis computing system 106 can store the resource analysis data 122 for a subsequent operation.

In some cases, the data analysis computing system 106 can access the data store 114A to determine operations 120 and identify the operation based at least in part on one or more modifications to an attribute. The data analysis computing system 106 can parse and/or filter the operations 120 to determine an operation for the identified resource and one or more modifications to an attribute of the identified resource. The operations 120 may include a plurality of operations for a resource of a pool of resources and/or the pool of resources. For example, the operations 120 may include a recommendation to buy or sell the resource or the pool of resources, a recommendation to not buy or sell the resource or the pool of resources, a recommendation for the resource holder to perform one or more actions. The one or more actions may include an adjustment to one or more attributes of the resource and/or the resource holder. For example, the one or more action may include establishing an additional business loan, establishing a plurality of business loans, establishing a lease, and/or establishing a trade line.

The data analysis computing system 106 can route the operations to a client computing device for performance. For example, the data analysis computing system 106 can cause display of a recommendation via a user interface of a client computing device.

The data analysis computing system 106 may route (e.g., transmit) a request for an updated rating to the ratings computing system 102. The data analysis computing system 106 may determine that the client computing device performed one or more actions identified by the selected operation. The performance of the one or more actions may cause an update to the resource data 118 stored in the data store 112. In response to the performance of the one or more actions, the data analysis computing system 106 can route the request for an updated pool characteristic (e.g., an updated rating) to the ratings computing system 102. The ratings computing system 102 may obtain the updated resource data 118 and can generate an updated pool characteristic. The ratings computing system 102 can store the updated pool characteristic as rating data 116 in the data store 110.

Example Pool Generation System

Figure 2:
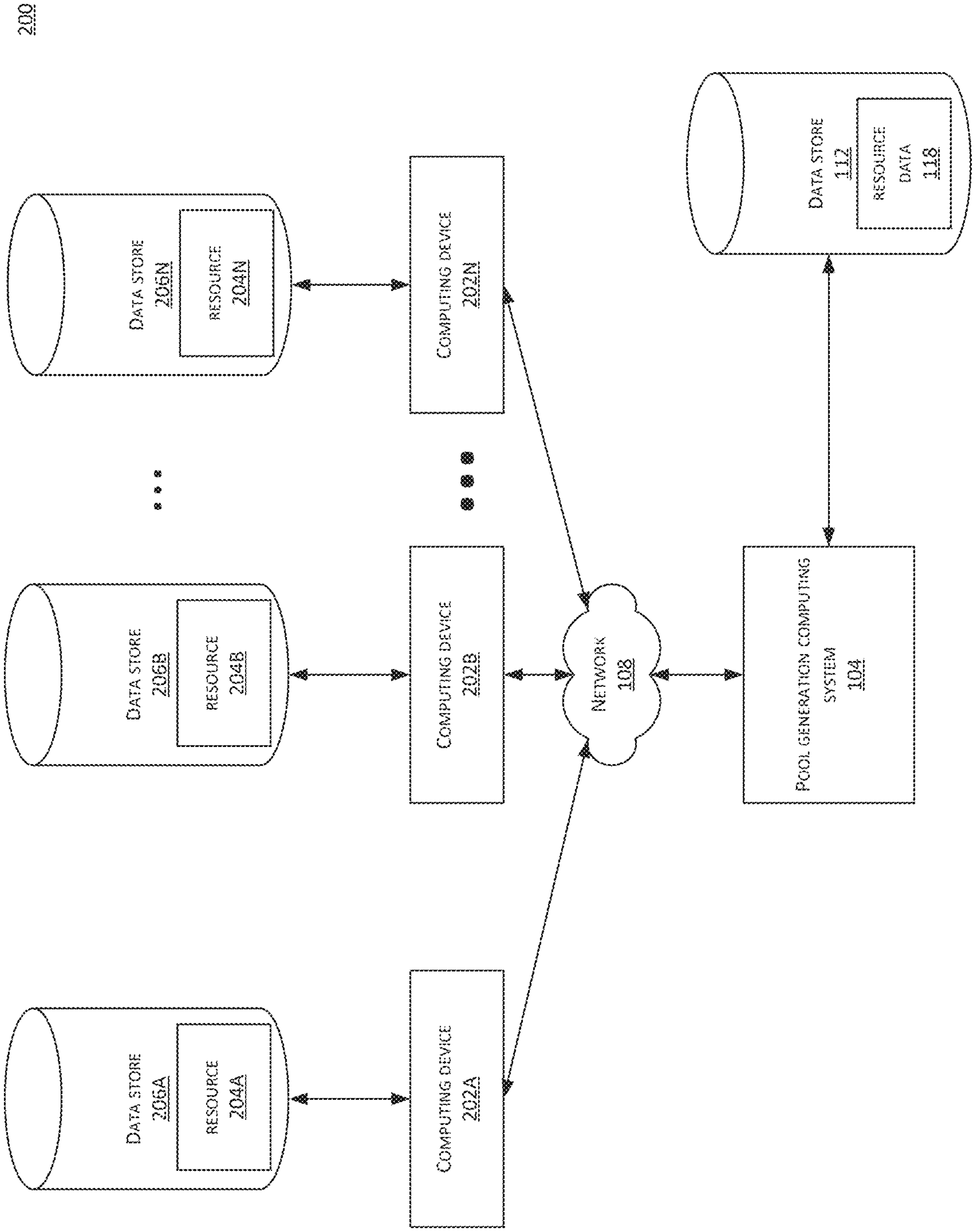
FIG. 2 depicts an example workflow for generating a pool of resources in an example pool generation computing system according to some embodiments.

FIG. 2 depicts a schematic diagram of a pool generation system 200 configured to identify a pool of resources and generate resource data 118 identifying the pool of resources. The pool generation system 200 may include one or more of the embodiments described with respect to the pool generation computing system 104. Specifically, the pool generation system 200 may include a pool generation computing system 104. Further, the pool generation system 200 may include computing devices 202A, 202B, . . . , 202N. It will be understood that the pool generation system 200 may include any number of additional devices.

Each of the computing devices 202A, 202B, . . . , 202N may be a user computing device. For example, each of the computing devices 202A, 202B, . . . , 202N may include, but are not limited to, a personal computer, a server computer, a laptop device, a multiprocessor system, a microprocessor based system, a network PC, a minicomputer, a mainframe computer, or a distributed computing environment that includes any of the above systems or the like. Each of the computing devices 202A, 202B, . . . , 202N may be associated with a particular resource holder of a resource. Further, each of the computing devices 202A, 202B, . . . , 202N includes, is connected to, or is in communication with a respective data store 206A, 206B, . . . , 206N. Each data store 206A, 206B, . . . , 206N may maintain and/or may access attributes of a particular resource.

In one example, each of the computing devices 202A, 202B, . . . , 202N may be associated with an individual loan holder. A loan may be established by the loan holder (using at least one of the computing devices 202A, 202B, . . . , 202N). For example, the loan may be established between a borrower and a lender (e.g., the loan holder being the borrower or the lender). In some cases, the lender may be a bank.

The resource may be established (e.g., defined, formatted, generated, etc.) using a series of network communications between the at least one of the computing devices 202A, 202B, . . . , 202N and an additional computing device. For example, a first network communication may be transmitted from the additional computing device to the at least one of the computing devices 202A, 202B, . . . , 202N that includes a resource request, a second network communication may be transmitted from the at least one of the computing devices 202A, 202B, . . . , 202N to the additional computing device that includes a proposed resource, and a third network communication may be transmitted from the additional computing device to the at least one of the computing devices 202A, 202B, . . . , 202N that includes an acceptance of the resource. In another example, a first network communication may be transmitted from the at least one of the computing devices 202A, 202B, . . . , 202N to the additional computing device that includes a proposed resource and a second network communication may be transmitted from the additional computing device to the at least one of the computing devices 202A, 202B, . . . , 202N that includes an acceptance of the resource. Based at least in part on establishment of the resource, the resource, attributes of the resource, and/or attributes of the resource holder can be stored as resource 204A, 204B, . . . , 204N in a respective data store 206A, 206B, . . . , 206N.

In some cases, the at least one of the computing devices 202A, 202B, . . . , 202N may establish the resource by providing resource identification information (e.g., to a central server). The resource identification information may identify the resource, components (e.g., terms) of the resource, an entity or entities associated with the resource, a resource holder, etc.

Each of the computing devices 202A, 202B, . . . , 202N may provide a respective resource 204A, 204B, . . . , 204N to the pool generation computing system 104 for generation of the pool of resources. For example, a loan holder who is also a pool holder may provide information, to the pool generation computing system 104, indicating that one or more loans to be grouped into a larger pool of loans that are associated with the loan holder.

Each of the computing devices 202, 202B, . . . , 202N may be associated with a resource holder that routes each of the resources 204A, 204B, . . . , 204N to a pool holder for creation of a new pool of resources and/or addition into an existing pool of resources. For example, each of the computing devices 202, 202B, . . . , 202N may route a respective resource to the pool holder based at least in part on a decision to provide (e.g., transfer, sell, etc.) particular rights associated with the resources (e.g., the right to service the resource). For example, each of the computing devices 202, 202B, . . . , 202N may provide a respective loan (e.g., transfer the respective loan) to the pool holder to provide the rights to collect on the loan to the pool holder.

In one example, the computing devices 202A, 202B, . . . , 202N may be computing devices associated with one or borrowers. Further, computing devices associated with one or more lenders and/or pool holders may provide a respective resource 204A, 204B, . . . , 204B to the pool generation computing system 104 for generation of the pool of resources. For example, resources may be established (e.g., between a borrower and a lender), computing device associated with a lender may provide the resource to a computing device associated with a pool holder, and the computing device associated with the pool holder may provide the resource to the pool generation computing system 104 for generation of the pool of resources.

In some cases, the computing devices 202A, 202B, . . . , 202N may be associated with one or more first pool holders (e.g., original pool holders). For example, each of the resources 204A, 204B, . . . , 204N may be grouped into a respective pool of resources. Each of the resources 204A, 204B, . . . , 204N may be flagged for removal from the respective pool of resources and entry into a new pool of resources. For example, the one or more first pool holders may provide (e.g., transfer, sell, etc.) the resources 204A, 204B, . . . , 204N to a second pool holder for creation of a new pool of resources and/or addition into an existing pool of resources. To add the resources 204A, 204B, . . . , 204N to a new or existing pool of resources, the one or more first pool holders can route the resources 204A, 204B, . . . , 204N to the pool generation computing system 104.

Each of the computing devices 202A, 202B, . . . , 202N may communicate with the pool generation computing system 104 via the network 108. As discussed above, the network 108 may facilitate communications with the pool generation computing system 104.

The pool generation computing system 104 may be associated with the pool holder. For example, the pool generation computing system 104 may include a computing device of the pool holder. The pool generation computing system 104 may obtain each of the resources 204A, 204B, . . . , 204N from the computing devices 202A, 202B, . . . , 202N. For example, each of the resource holders associated with the computing devices 202A, 202B, . . . , 202N may provide (e.g., transfer, sell, etc.) each resource (e.g., loan) to the computing device of the pool holder associated with the pool generation computing system 104. To add the resources 204A, 204B, . . . , 204N to a pool of resources, the computing device of the pool holder can route the resources 204A, 204B, . . . , 204N to the pool generation computing system 104.

In response to obtaining each of the resources 204A, 204B, . . . , 204N, the pool generation computing system 104 can generate a pool of resources that includes each of the resources 204A, 204B, . . . , 204N. For example, the pool generation computing system 104 can generate a pool of resources indicating that each of the resources is associated (e.g., to be transferred collectively). In some cases, the pool generation computing system 104 may filter a portion of one or more resources to generate the pool of resources.

The pool generation computing system 104 may group one or more resources into a pool of resources such that the resources have common metadata, format, structure, etc. For example, the pool generation computing system 104, in generating the pool of resources, may standardize (e.g., normalize) each resource of the pool of resources.

In some embodiments, the pool generation computing system 104 may not generate the pool of resources and may generate an identifier that indicates that the resources 204A, 204B, . . . , 204N have been pooled. For example, the pool generation computing system 104 can group each of the resources 204A, 204B, . . . , 204N and/or associate each of the resources 204A, 204B, . . . , 204N and generate an identifier indicating that each of the resources 204A, 204B, . . . , 204N is grouped and/or associated.

In some cases, the pool generation computing system 104 can generate metadata that identifies that each of the resources 204A, 204B, . . . , 204N is included in the pool of resources. The pool generation computing system 104 can add the metadata to each of the resources 204A, 204B, . . . , 204N. For example, the pool generation computing system 104 can write the metadata to each of the resources 204A, 204B, . . . , 204N.

The pool generation computing system 104 may generate resource data 118 based at least in part on generating the pool of resources. The resource data 118 may identify the pool of resources and a pool characteristic of the pool of resources. For example, the resource data 118 may identify each resource 204A, 204B, . . . , 204N included in the pool of resources. In some embodiments, the resource data 118 may include each resource 204A, 204B, . . . , 204N.

The pool generation computing system 104 may store the resource data 118 in the data store 112. In some embodiments, the pool generation computing system 104 may periodically or aperiodically update the resource data 118 stored in the data store 112. The pool generation computing system 104 may update the resource data 118 to remove or add resources to the pool of resources. For example, a loan may be removed from (e.g., sold) or added to (e.g., bought and associated with) a pool of loans. The pool generation computing system 104 may update the resource data 118 to identify the removed and/or added resources.

As noted above, the pool generation computing system 104 may determine the resource data 118 identifying the pool of resources. A ratings computing system may obtain the resource data 118 to identify a rating for the pool of resources.

Example Ratings System

Figure 3:
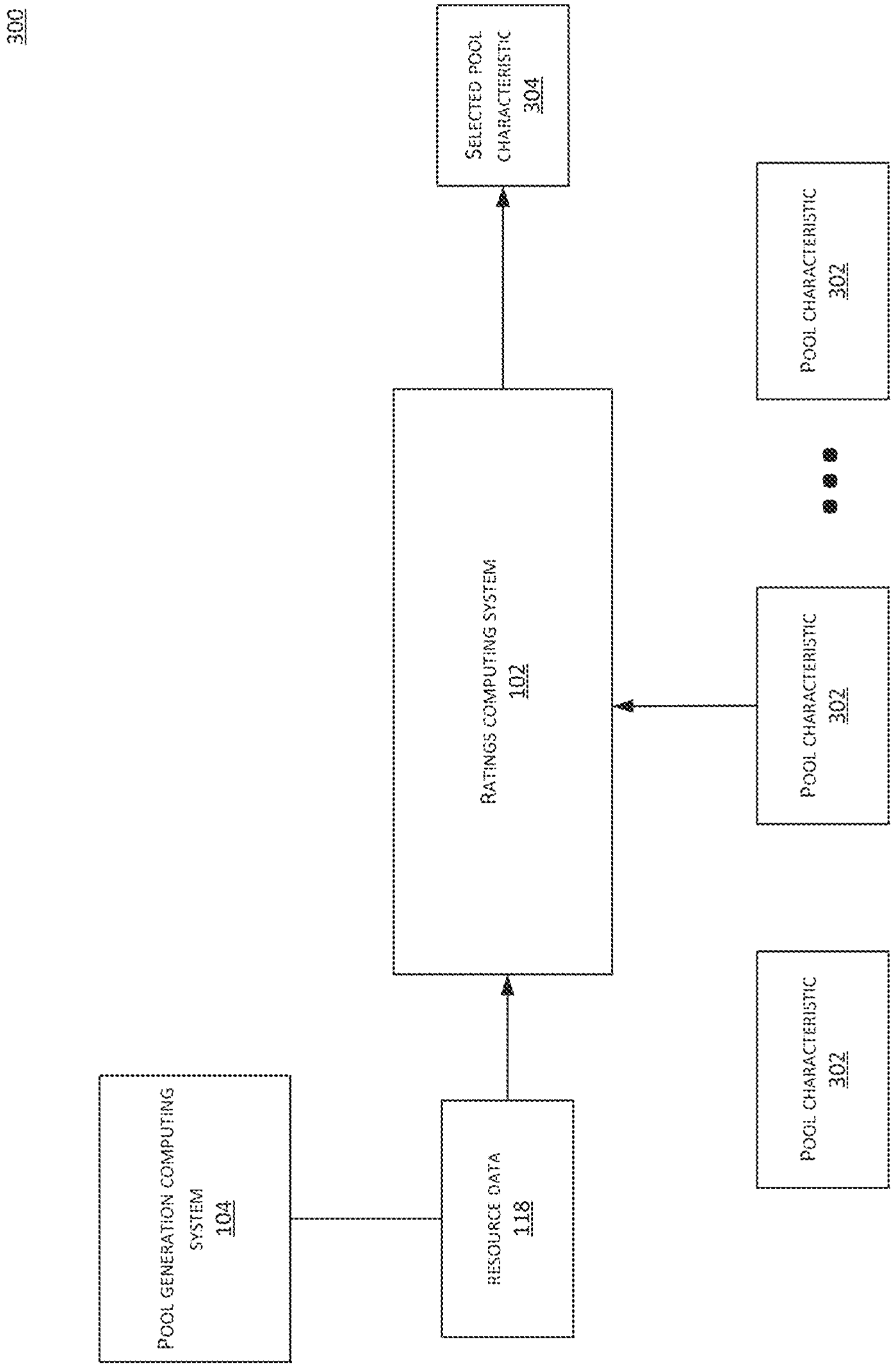
FIG. 3 depicts an example workflow for identifying a pool characteristic of a pool of resources in an example ratings computing system according to some embodiments.

FIG. 3 depicts a schematic diagram of a ratings system 300 configured to identify resource data 118 for a pool of resources and obtain a pool characteristic for the resource data. The ratings system 300 may include one or more of the embodiments described with respect to the ratings computing system 102. Specifically, the ratings system 300 may include a ratings computing system 102. Further, the ratings system 300 may include a pool generation computing system 104. It will be understood that the ratings system 300 may include any number of additional devices. In some cases, the ratings system 300 may be associated with a rating agent (e.g., Moody's®, Fitch Ratings®, S&P®, etc.).

In some cases, the ratings system 300 and/or the ratings computing system 102 may be part of the data analysis computing system 106. For example, the data analysis computing system 106 may cause performance of the one or more operations and may rerate the pool of resources based at least in part on causing performance of the one or more operations. In some embodiments, the ratings system 300 and/or the ratings computing system 102 may be a third-party system (e.g., a third-party system associated with a rating agent).

The pool generation computing system 104 may generate resource data 118 identifying a pool of resources and may provide the resource data 118 to the ratings computing system 102. The ratings computing system 102 may obtain the resource data 118 and identify a pool characteristic (e.g., a rating) for the pool of resources.

To identify the pool characteristic for the pool of resources, the ratings computing system 102 may obtain a set of pool characteristics 302. The ratings computing system 102 may filter and/or parse the set of pool characteristics 302 to identify a selected pool characteristic 304 for the pool of resources. For example, the ratings computing system 102 may filter and/or parse the set of pool characteristics 302 based at least in part on the resource data 118.

In some cases, the ratings computing system 102 may identify the selected pool characteristic 304 based at least in part on a weighted average of resource characteristics the pool of resources. For example, the ratings computing system 102 may determine a resource characteristic for each resource of the pool of resources and generate a weighted average of the resource characteristics. Further, the ratings computing system 102 may utilize attributes of the resource (e.g., a bank rating, a credit score (e.g., a Fair Isaac Corporation ("FICO") credit score), or any other attributes of the resource holder of the resource) to determine the resource characteristics.

The ratings computing system 102 may periodically and/or aperiodically receive updated resource data 118 (e.g., from the pool generation computing system 104 or a separate computing device) via network communications. Further, the ratings computing system 102 may receive a request to identify an updated pool characteristic for the pool of resources. In response to receiving the request to identify an updated pool characteristic for the pool of resources and/or receiving updated resource data, the ratings computing system 102 may further filter and/or parse the set of pool characteristics 302 to identify an updated pool characteristic for the pool of resources.

As noted above, the ratings computing system 102 may determine the selected pool characteristic 304 for the pool of resources. A data analysis computing system 106 may obtain the selected pool characteristic 304 and/or the resource data 118 to identify one or more operations to improve the selected pool characteristic.

Example Data Analysis System

Figure 4:
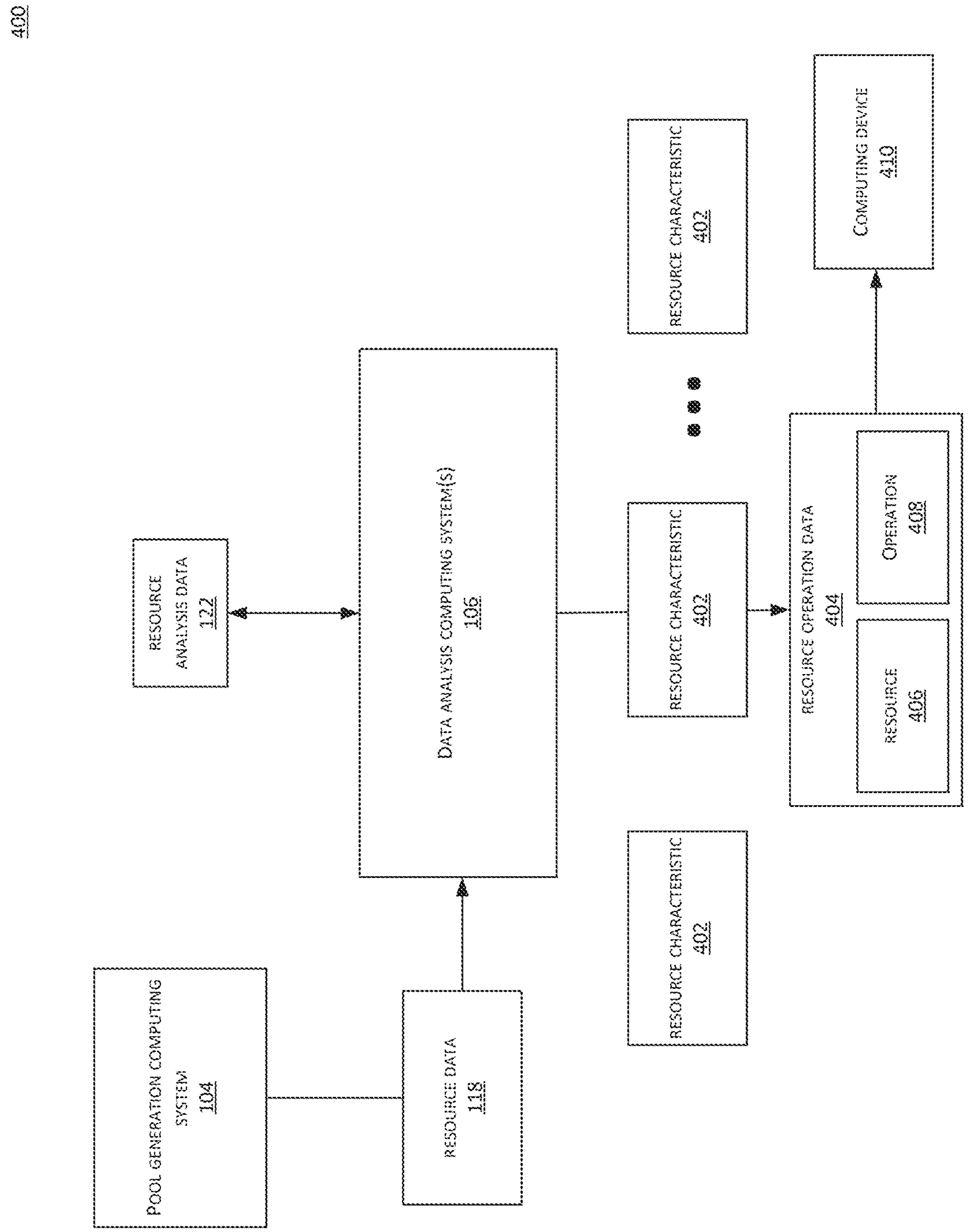
FIG. 4 depicts an example workflow for identifying a resource of a pool of resources and an operation for the resource in an example data analysis computing system according to some embodiments.

FIG. 4 depicts a schematic diagram of a data analysis system 400 configured to identify resource operation data 404 for a resource of a pool of resources. The data analysis system 400 may include one or more of the embodiments described with respect to the data analysis computing system 106. Specifically, the data analysis system 400 may include a data analysis computing system 106. Further, the data analysis system 400 may include a computing device 410, the pool generation computing system 104, and/or the ratings computing system 102 each of which may be in communication with the data analysis computing system 106. It will be understood that the data analysis system 400 may include any number of additional devices.

The computing device 410 may be a user computing device. For example, the computing device 410 may include, but is not limited to, a personal computer, a server computer, a laptop device, a multiprocessor system, a microprocessor based system, a network PC, a minicomputer, a mainframe computer, or a distributed computing environment that includes any of the above systems or the like.

In some cases, the computing device 410 may be in communication with a data store that includes attributes of the respective resource. For example, the computing device 410 may be one or more of the computing devices 202A, 202B, . . . , 202N, as discussed above, that is connected to, or is in communication with a respective data store 206A, 206B, 206N.

The computing device 410 may be associated with a particular resource holder of a resource. For example, the computing device 410 may be associated with a loan holder. Based at least in part on establishment of a loan by the loan holder (e.g., between the loan holder and a lender, between a borrower and the loan holder, etc.), a loan can be generated, stored, and associated with the loan holder and/or a pool holder. The resource (and attributes of the resource and/or attributes of the resource holder) can be stored in a respective data store associated with the resource holder.

Each of the computing device 410, the pool generation computing system 104, and/or the ratings computing system 102 may communicate with the data analysis computing system 106 via the network 108. As discussed above, the network 108 may facilitate communications with the data analysis computing system 106.

The data analysis computing system 106 may receive the resource data 118 identifying the pool of resources from the pool generation computing system 104. The data analysis computing system 106 may receive the resource data 118 and may receive a request to identify operations to improve a pool characteristic of the pool of resources associated with the resource data 118 and/or to generate a recommendation for the pool of resources (e.g., buy or sell the pool of resources). Based at least in part on identification and performance of the operations, the data analysis computing system 106 can request a rerating of the pool of resources and improve the pool characteristic of the pool of resources.

Further, the data analysis computing system 106 may receive a request to predict a pool characteristic of the pool of resources based at least in part on the performance of one or more operations. The data analysis computing system 106 may receive a request to compare the multiple, predicted pool characteristics of multiple pools of resources and to recommend at least one pool of resources to be bought based at least in part on the predicted pool characteristics of the multiple pools of resources. By predicting pool characteristics of multiple pools of resources based at least in part on the performance of one or more operations on individual resources of the pools, the data analysis computing system 106 can identify pools of resources that have an increased predicted pool characteristic as compared to predicted pool characteristics of other pools of resources.

The data analysis computing system 106 can receive the resource data 118 and analyze each resource of the pool of resources. The data analysis computing system 106 may analyze each resource by analyzing individual attributes of each resource. The attributes of each resource may include any data associated with the resource and/or the resource holder. For example, where the pool of resources includes a pool of loans, the data analysis computing system 106 can identify attributes of the loans that can include one or more of an amount of money held in savings, a bank rating for a loan, an eligibility to upgrade the bank rating for a loan, a room for expansion for a loan, and/or loan holder data (e.g., a number of buildings associated with the loan holder, a number of trade credit lines associated with the loan holder, a seasoning of a business associated with the loan holder, whether the loan holder accepts credit cards as payment, a standing of the loan holder, etc.).

Further, the data analysis computing system 106 may modify attributes of particular resources of the pool of resources. The data analysis computing system 106 may predict resource characteristics 402 for the resources based at least in part on the modifications to the attributes. To predict the resource characteristics 402, the data analysis computing system 106 can compare the attributes of each resource to threshold values. For example, a loan may be associated with six trade credit lines and a low bank rating. The data analysis computing system 106 may determine that a loan has a resource characteristic of "5" if it is associated with ten trade lines and a high bank rating and a loan that is not associated with ten trade lines and/or a high bank rating may have a resource characteristic of less than "5." Therefore, the threshold value ten trade lines and a high bank rating may be associated with a resource characteristic of "5." Based at least in part on the threshold values, the data analysis computing system 106 may determine that the resource characteristic of the resource can be improved to a particular level by adjusting the attributes of the resource (e.g., by causing performance of the one or more operations). Therefore, the data analysis computing system 106 can determine a predicted resource characteristic for each resource of the pool of resources.

Further, the data analysis computing system 106 may predict the resource characteristic by comparing each attribute to one or more associated threshold values or ranges. For example, an attribute (e.g., the number of loans associated with a loan holder) may be compared with a first threshold value or range, a second threshold value or range, and a threshold value or range. If the attribute satisfies the first threshold value or range, the resource may be associated with a first rating or score, if the attribute satisfies the second threshold value or range, the resource may be associated with a second rating or score, and if the attribute satisfies the third threshold value or range, the resource may be associated with a third rating or score.

In some cases, the threshold values or ranges may be predetermined or provided by a user. For example, the threshold values or ranges may be provided by a third-party computing system. In other cases, the threshold values or ranges may be determined (e.g., in real-time) relative to the pool of resources. For example, the data analysis computing system 106 may analyze the resources and determine that 90% of resource holders associated with a resource have 5 or less loans, 95% of resource holders associated with a resource have 8 or less loans, and 98% of resource holders associated with a resource have 10 or less loans. The data analysis computing system 106 may determine a rating of 0 for the resources associated with resource holders ranked in the bottom 90%, a rating of n for the resources associated with resource holders ranked between 90% and 95%, a rating of m for the resources associated with resource holders ranked between 95% and 98%, and a rating of j for the resources associated with resource holders ranked 98% and above.

The ratings for each attribute for a given resource may be aggregated to determine a total rating (e.g., the resource characteristic) for the resource. In some cases, in addition to or instead of aggregating the ratings, additional and/or different mathematical operations (e.g., multiplication) may be performed on the ratings for each attribute for a given resource to determine the resource characteristic. Prior to aggregating the ratings, each of the ratings may be weighted with a weight associated with the corresponding attribute and the weighted ratings may be aggregated to determine the resource characteristic. Each attribute may be associated with a particular weight. For example, the number of loans may have a first weight (e.g., a weight of 10) and the number of trade credit lines may have a second weight (e.g., a weight of 10). The weights may be predetermined. In some cases, the weights may be provided by a user computing device.

Therefore, based at least in part on analyzing the resources and attributes of each resource, the data analysis computing system 106 can identify predicted resource characteristics of each resource of the pool of resources. Further, the data analysis computing system 106 may predict a pool characteristic for each predicted resource characteristics. The data analysis computing system 106 may predict the pool characteristic by comparing each predicted resource characteristic to threshold values. The data analysis computing system 106 may determine, for a loan of a pool of 1,000 loans with each loan having a resource characteristic of "5," an adjustment of the resource characteristic of one loan, 100 loans, each of the 1000 loans, etc. from a "5" to a "10," may cause the pool characteristic to change from a "5" to a "5.1," a "5.5," a "10," etc. Therefore, the data analysis computing system 106 can determine a predicted pool characteristic for the pool of resources.

In some cases, the data analysis computing system 106 may compare the predicted resource characteristics for each resource of the pool of resources, a difference between the resource characteristics 402 and the predicted resource characteristics for each resource of the pool of resources, the predicted pool characteristic for each modification of an attribute, and/or a difference between the pool characteristic and the predicted pool characteristic for each modification of an attribute. Further, the data analysis computing system 106 may identify resources of the pool of resources that are associated with a predicted resource characteristic, difference between the resource characteristic and the predicted resource characteristic, and/or a difference between the pool characteristic and the predicted pool characteristic for each modification of an attribute that is greater than a particular threshold value. Further, the data analysis computing system 106 may recommend operations to be performed on each of the identified resources.

In some cases, the data analysis computing system 106 can identify one or more resources of the pool of resources for removal. For example, the data analysis computing system 106 can determine that the predicted resource characteristic for a particular resource and/or a predicted pool characteristic is below a particular threshold value and/or is within a particular range and recommend the resource for removal from the pool of resources. In some cases, the data analysis computing system 106 can determine that the difference between the resource characteristic and the predicted resource characteristic for a particular resource and/or the difference between the pool characteristic and the predicted pool characteristic is below a particular threshold value and/or is within a particular range and recommend the resource for removal from the pool of resources. To recommend the resource for removal from the pool of resources, the data analysis computing system 106 can generate resource operation data 404 that identifies the resource 406 for removal from the pool of resources and the operation 408 (e.g., the operation of removal from the pool of resources).

In some cases, the data analysis computing system 106 can identify one or more resources of the pool of resources for addition to the pool of resources. For example, the data analysis computing system 106 can determine that a predicted resource characteristic for a particular resource and/or a predicted pool characteristic exceeds a particular threshold value and/or is within a particular range and recommend the resource for addition to the pool of resources. In some cases, the data analysis computing system 106 can determine that the difference between the resource characteristic and the predicted resource characteristic for a particular resource and/or the difference between the pool characteristic and the predicted pool characteristic exceeds a particular threshold value and/or is within a particular range and recommend the resource for addition to the pool of resources. To recommend the resource for addition to the pool of resources, the data analysis computing system 106 can generate resource operation data 404 that identifies the resource 406 for addition to the pool of resources and the operation 408 (e.g., the operation of addition to the pool of resources).

Based at least in part on analyzing each resource of the pool of resources, the data analysis computing system 106 can generate resource analysis data 122. The resource analysis data 122 may identify the predicted resource characteristic and/or the predicted pool characteristic. The data analysis computing system 106 may store the resource analysis data 122 in a data store.

The resource operation data 404 may identify one or more resources 406 and one or more operations 408 based at least in part on the analysis of the resource characteristics 402 by the data analysis computing system 106. The one or more resources 406 may include any resources of the pool of resources. In some embodiments, the one or more resources 406 may include resources not in the pool of resources (e.g., resources in a different pool of resources). The one or more operations 408 may include removal of a resource of the one or more resources 406 from the pool of resources, addition of a resource of the one or more resources 406 to the pool of resources, and/or an operation to improve the value of a resource of the one or more resources 406. The operation to improve the value of a resource may include an operation to associate additional buildings with the resource holder, to acquire additional trade lines, to accept credit cards as payment, to register the resource holder, to move money into a particular account, to take out additional loans, etc. The data analysis computing system 106 may facilitate the performance of the operations to improve the value of a resource by offering additional trade lines, loans, etc. For example, the data analysis computing system 106 may cause an additional loan to be offered to the resource holder and may instruct the resource holder to hold the money associated with the additional loan in a particular account.

The data analysis computing system 106 can route (e.g., transmit over a network) the resource operation data 404 to the computing device 410. The resource operation data 404 may include a recommendation for the computing device 410 to perform the operation 408 for the resource 406. In some cases, the data analysis computing system 106 can cause display of the resource operation data 404 and/or the recommendation via a display of the computing device (e.g., via a user interface).

As noted above, the data analysis computing system 106 may generate the resource operation data 404 and may route the resource operation data 404 to the computing device 410. A ratings computing system 102 may obtain updated resource data 118 based at least in part on the performance of the operation 408 and may identify an updated rating for the pool of resources.

Example Ratings System for Updating the Rating

Figure 5:
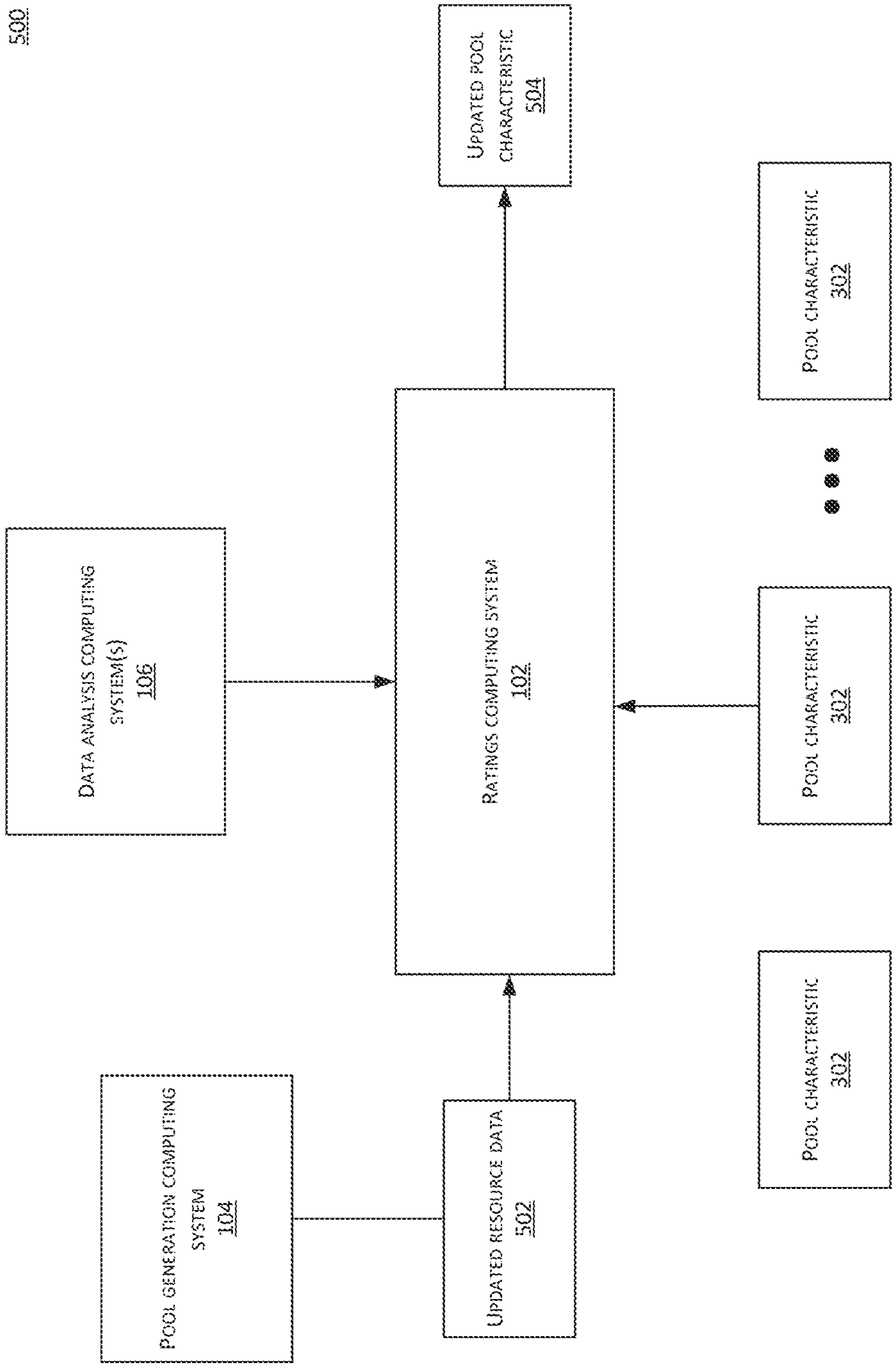
FIG. 5 depicts an example workflow for requesting an updated pool characteristic of a pool of resources in an example ratings computing system according to some embodiments.

FIG. 5 depicts a schematic diagram of a ratings system 500 configured to identify updated resource data 118 for a pool of resources and obtain an updated pool characteristic for the resource data. The ratings system 500 may include one or more of the embodiments described with respect to the ratings system 300. Further, the ratings system 500 may include one or more of the embodiments described with respect to the ratings computing system 102. Specifically, the ratings system 500 may include a ratings computing system 102. Further, the ratings system 500 may include a pool generation computing system 104. It will be understood that the ratings system 500 may include any number of additional devices. As discussed above, in some cases, the ratings system 500 may be associated with a rating agent (e.g., Moody's®, Fitch Ratings®, S&P®, etc.).

The pool generation computing system 104 may generate updated resource data 502 identifying a pool of resources and may provide the updated resource data 502 to the ratings computing system 102. The updated resource data 502 may correspond to an updated version of the resource data 118. For example, the updated resource data 502 may include one or more different resources as compared to the resource data 118. Specifically, the updated resource data 502 may include a resource that is not included in the resource data 118 and/or may not include a resource that is included in the resource data 118. In another example, the updated resource data 502 may include one or more resources with different attributes as compared to the one or more resources as included in the resource data 118. In some embodiments, the pool generation computing system 104 may provide the updated resource data 502 to the ratings computing system 102 based at least in part on the pool generation computing system 104 receiving a request to provide the updated resource data 502 to the ratings computing system 102 from the data analysis computing system 106.

The data analysis computing system 106 may provide a request to generate an updated pool characteristic for the pool of resources to the ratings computing system 102. Based on the request to generate the updated pool characteristic, the ratings computing system 102 may generate an updated pool characteristic (e.g., an updated rating) for the pool of resources. In some embodiments, the ratings computing system 102 may request and/or obtain the updated resource data 502 from the pool generation computing system 104 based at least in part on receiving the request from the data analysis computing system 106. Therefore, the ratings computing system 102 may obtain the updated resource data 502 and identify an updated pool characteristic.

To identify the updated pool characteristic, the ratings computing system 102 may obtain a set of pool characteristics 302. The ratings computing system 102 may filter and/or parse the set of pool characteristics 302 to identify an updated pool characteristic 504 for the pool of resources. For example, the ratings computing system 102 may filter and/or parse the set of pool characteristics 302 based at least in part on the updated resource data 502.

In some cases, to identify the updated pool characteristic, the ratings computing system 102 may identify an updated resource characteristic for all or a portion of the pool of resources. The ratings computing system 102 may identify the updated pool characteristic 504 based on the updated resource characteristics for all or a portion of the pool of resources. As discussed above, the ratings computing system 102 may identify the updated pool characteristic 504 based at least in part on a weighted average of updated resource characteristics for all or a portion of the pool of resources.

Example User Interfaces for Identifying Attributes

FIGS. 6A and 6B depicts example interfaces 600A and 600B for identifying attributes associated with a resource and/or a resource holder. Each of the interfaces 600A and 600B are non-limiting examples of interfaces for providing data for display and obtaining and/or identifying attributes.

The data analysis computing system 106, as discussed above, may identify (e.g., collect, determine, etc.) the attributes associated with a resource and/or a resource holder. To determine the attributes, the data analysis computing system 106 may cause display of the interfaces 600A and 600B and may obtain the attributes based at least in part on input to the interfaces.

The data analysis computing system 106 may cause display of one or more of the interfaces 600A and 600B via a computing device. For example, the data analysis computing system 106 may cause display of one or more of the interfaces 600A and 600B via a computing device of a resource holder, a pool holder, and/or a third-party. Further, the data analysis computing system 106 may, via a network, provide instructions to the computing device that cause display of the one or more of the interfaces 600A and 600B, may prompt a user to provide input via the one or more interfaces 600A and 600B, and/or may receive input from the computing device via the one or more interfaces 600A and 600B.

In the example of FIG. 6A, the interface 600A includes one or more sections to collect information associated with the resource and/or the resource holder. The interface 600A includes a section to collect a name of the business, a contact name, a phone number, a fax number, an email, a street address, a city, a state, and a zip code associated with the resource and/or the resource holder. For example, a user computing device may interact with the interface 600A to provide the information as input (e.g., via one or more network communications). The data analysis computing system 106 may utilize the collected information to identify bank accounts, reports, filings, etc. associated with the resource holder and identify attributes associated with the resource holder and/or the resource.

In the example of FIG. 6B, the interface 600B includes one or more sections to collect additional information associated with the resource and/or the resource holder. The interface 600B includes a section to collect a last name, a first name, a middle initial, an e-mail, a home address, a city, a county, a state, a zip code, a home phone number, a day phone number, a cell phone number, and input identifying whether the home phone number is listed under a particular name. The interface 600B may collect information associated with a guarantor of a resource (e.g., a loan). The data analysis computing system 106 may utilize the collected information to identify the guarantor and identify attributes associated with the resource holder and/or the resource.

It will be understood that FIGS. 6A and 6B are illustrative only, and the data analysis computing system 106 may cause display of any number of user interfaces to identify attributes associated with the resource holder and/or the resource.

For example, the data analysis computing system 106 may cause display of a user interface to collect revenue information. The revenue information may include business information associated with a resource holder (e.g., whether the resource holder is still in business, when the business was established, an industry of the business, a nature of the business, a number of employees, a business entity type, a date of incorporation, gross annual sales, average monthly accounts receivables, the percent of receivables past due, whether the business accepts credit cards, average monthly sales from credit cards, whether the business is profitable, whether the business has past due payroll taxes, and/or an amount of past due payroll taxes).

Further, the data analysis computing system 106 may cause display of a user interface to collect tax information associated with a resource holder (e.g., a federal tax identifier and/or a state tax identifier). In some cases, the data analysis computing system 106 may obtain the tax information and utilize the tax information to obtain additional tax information. For example, the data analysis computing system 106 may obtain a federal tax identifier and provide the federal tax identifier to a separate system storing additional tax information associated with the federal tax identifier. Based on the federal tax identifier, the separate system may provide the additional tax information to the data analysis computing system 106.

Further, the data analysis computing system 106 may cause display of a user interface to collect business credit history information associated with a resource holder (e.g., a Dun and Bradstreet number). For example, the business credit history information may include a business credit report and may identify a financial health of a business. In one example, the data analysis computing system 106 may obtain a business identifier (e.g., a Dun and Bradstreet number) and provide the business identifier to a separate system storing additional business credit history information associated with the business identifier (e.g., a business credit report). Based on the business identifier, the separate system may provide the additional business credit history information to the data analysis computing system 106.

Further, the data analysis computing system 106 may cause display of a user interface to collect credit score information associated with a resource holder (e.g., a business PayDex score). In one example, data analysis computing system 106 may obtain information associated with the resource holder to a separate system that stores and/or generates the credit score information based on the information associated with the resource holder. Based on the information associated with the resource holder, the separate system may provide the credit score information to the data analysis computing system 106.

Further, the data analysis computing system 106 may cause display of a user interface to collect trade credit references information associated with a resource holder (e.g., identification of trade credit references associated with the resource and/or the resource holder). In some cases, the data analysis computing system 106 may automatically contact the trade credit references to determine the attributes of the resource holder. For example, the data analysis computing system 106 may automatically call, message, email, text, mail, etc. one or more of the trade credit references.

Further, the data analysis computing system 106 may cause display of a user interface to collect sales information associated with a resource holder (e.g., financing offered, gross margins, number of suppliers for an order, credit terms, location of suppliers, type of shipment for products, average sale amount, payment terms, and/or consignment sales offered). In some cases, the data analysis computing system 106 may provide one or more prompts to a system (e.g., one or more prompts associated with a prospective buyer) and may identify the sales information based on the one or more prompts. For example, the system may provide the sales information to the data analysis computing system 106 in response to the one or more prompts.

Further, the data analysis computing system 106 may cause display of a user interface to collect asset information associated with a resource holder (e.g., debt amount, collateral amount, inventory amount, commercial property amount, and/or mortgages amount). In some cases, the data analysis computing system 106 may communicate with multiple computing devices to determine the asset information. For example, the data analysis computing system 106 may prompt a plurality of computing devices associated with a plurality of banks to each provide mortgage information associated with the resource holder.

Further, the data analysis computing system 106 may cause display of a user interface to collect equipment information associated with a resource holder (e.g., equipment owned by the resource holder). For example, the user interface may prompt a user to input equipment information identifying equipment with a value over a particular amount (e.g., a value over $1,000). In another example, the user interface may prompt a user to input equipment information identifying particular types of equipment (e.g., vehicles, land, buildings, etc.).

Further, the data analysis computing system 106 may cause display of a user interface to collect banking information associated with a resource holder (e.g., identifiers of bank accounts associated with the resource holder). For example, the user interface may prompt a user to input banking information identifying a bank, a bank account, a bank account balance, etc.

For example, the data analysis computing system 106 may cause display of a user interface to collect additional guarantor information. The additional guarantor information may include information associated with the guarantor (e.g., a date of birth, citizenship, and/or identification). Further, the additional guarantor information may include credit information associated with the guarantor (e.g., a FICO credit score). Further, the additional guarantor information may include credit history information associated with the guarantor (e.g., an amount of unsecured credit, an amount of available credit, and/or number of bankruptcies and/or charge-offs). Further, the additional guarantor information may include housing information associated with the guarantor (e.g., a marital status, a number of dependents, time at residence, and/or payment information associated with the residence). Further, the additional guarantor information may include bank account information associated with the guarantor (e.g., identifiers of bank accounts associated with the guarantor). Further, the additional guarantor information may include employment information associated with the guarantor (e.g., employment status, employer, percent of business owned, and/or length of employment). Further, the additional guarantor information may include income information associated with the guarantor (e.g., annual income, assets, and/or debts).

Example Actions for Identifying Attributes

In some embodiments, the data analysis computing system 106 may identify the attributes based on performing one or more actions (e.g., in addition to or instead of based on input received via the interfaces 600A and 600B). For example, the data analysis computing system 106 may identify the attributes based on one or more monitored electronic communications between one or more computing devices. The one or more actions may include one or more of performing a web crawl, monitoring a web domain, monitoring a web platform, monitoring one or more applications, filings, records, and/or reports, monitoring a software application, monitoring an advertisement, monitoring audio data and/or image data, monitoring a blockchain, monitoring communications between a plurality of computing devices, etc.

In some cases, the data analysis computing system 106 may identify the one or more actions based on information associated with the resource and/or the resource holder. The data analysis computing system 106 may identify information associated with the resource and/or the resource holder.

For example, the data analysis computing system 106 may determine whether the resource holder has an internet presence (e.g., the resource holder is associated with a web domain, a web platform, etc.), a level of internet presence of the resource holder (e.g., a level of internet activity associated with the resource holder), a location (e.g., a country, a state, a county, etc.) associated with the resource and/or the resource holder, media and/or advertisements associated with the resource and/or the resource holder (e.g., audio data, image data, etc.), etc. Therefore, based on the information associated with the resource and/or the resource holder, the data analysis computing system 106 may identify one or more actions to perform to determine the attributes. In some cases, the data analysis computing system 106 may generate one or more customized actions based on the information associated with the resource and/or the resource holder.

In some cases, the data analysis computing system 106 may perform a web crawl and may determine the attributes based on performing the web crawl. For example, the data analysis computing system 106 may perform web crawls (or web crawling) of a network (e.g., the Internet) based at least in part on information associated with a loan and/or a loan holder (e.g., a business name) and identify attributes based at least in part on the web crawls (e.g., a standing of a business, a number of buildings associated with the loan holder, etc.). The web crawls may include performing methodical searches of the network, using the information with loan and/or the loan holder, to identify attributes of the loan and/or a loan holder. In some cases, the web crawls are performed over a particular portion of the network (e.g., over portions of the network associated with business transaction data). For example, the data analysis computing system 106 may identify a particular portion of the network storing, referencing, displaying, or otherwise associated with particular data (e.g., business transaction data) and may perform web crawls (e.g., periodically) of the particular portion of the network.

In some cases, the data analysis computing system 106 may monitor a web domain and may determine the attributes based on monitoring the web domain. For example, the data analysis computing system 106 may monitor a web domain (e.g., a web domain associated with the loan holder) to determine attributes (e.g., whether a business takes credit cards as payment, the date of incorporation of the business, products offered by the business, etc.). Further, the data analysis computing system 106 may conduct a search to identify a particular web domain and may monitor the identified web domain (e.g., periodically). In some embodiments, the data analysis computing system 106 may monitor the same web domain for multiple loans and/or loan holders (e.g., a business association web domain). In other embodiments, the data analysis computing system 106 may monitor a web domain for a single loan (e.g., the web domain is associated with the loan holder of a single loan).

In some cases, the data analysis computing system 106 may monitor a web platform (e.g., a social media platform) and may determine the attributes based on monitoring the web platform. The web platform may include platforms by which content is shared between multiple users, accounts, etc. For example, the web platform may include forums, communities, networks, etc. For example, the data analysis computing system 106 may monitor web platforms associated with the loan holder (e.g., a social media page associated with the loan holder). The data analysis computing system 106 may monitor the web platforms to identify the loan holder and/or information associated with the loan holder and may identify attributes based at least in part on the loan holder and/or the information associated with the loan holder.

In some cases, the data analysis computing system 106 may monitor one or more applications, filings, records, and/or reports (e.g., government filings and/or reports) and may determine the attributes based on monitoring the one or more applications, filings, records, and/or reports. For example, the data analysis computing system 106 may monitor applications, filings, and reports associated with the Security and Exchange Commission, the Small Business Administration, a Secretary of State, the Internal Revenue Service, etc. to identify the attributes. Further, the data analysis computing system 106 may monitor public finance reports. For example, the data analysis computing system 106 may monitor public finance reports associated with the resource holder and/or the resource. Further, the data analysis computing system 106 may monitor rating agency reports. For example, the data analysis computing system 106 may monitor reports by ratings agent to identify attributes.

In some cases, the data analysis computing system 106 may monitor a software application and may determine the attributes based on monitoring the software application. For example, the data analysis computing system 106 may determine whether a computing device associated with a resource holder downloaded a particular software application (e.g., from an application store). Further, the data analysis computing system 106 may identify one or more interactions by the resource holder with a particular software application. For example, the data analysis computing system 106 may determine an input of the resource holder to the software application.

In some cases, the data analysis computing system 106 may monitor an advertisement and may determine the attributes based on monitoring the advertisement. For example, the data analysis computing system 106 may determine that one or more advertisements have been presented to a resource holder and may determine a response of the resource holder to the one or more advertisements. Specifically, the data analysis computing system 106 may determine whether the resource holder engaged, interacted, etc. with the one or more advertisements. In some cases, the data analysis computing system 106 may identify and/or generate directed advertisements based on data associated with a particular resource holder and may cause the directed advertisements to be displayed via a graphical user interface associated with the resource holder.

In some cases, the data analysis computing system 106 may monitor audio data and/or image data and may determine the attributes based on monitoring the audio data and/or the image data. The data analysis computing system 106 may obtain sensor data from one or more sensors (e.g., one or more location sensors, audio sensors, image sensors, etc.). For example, the data analysis computing system 106 may obtain audio data from one or more audio sensors and/or image data from one or more image sensors. The data analysis computing system 106 may analyze the sensor data to identify attributes associated with the resource holder. For example, the data analysis computing system 106 may determine particular audio data and/or image data references, captures, or is otherwise associated with the resource holder and may monitor the particular audio data and/or image data to identify attributes associated with the resource holder.

In some cases, the data analysis computing system 106 may monitor a blockchain and may determine the attributes based on monitoring the blockchain. For example, the attributes associated with a resource holder may be stored on one or more blocks of a blockchain. In some cases, the data analysis computing system 106 may parse one or more blocks of the blockchain to identify information associated with the resource holder. Further, the data analysis computing system 106 may generate the attributes of the resource holder based on the information associated with the resource holder that is identified by parsing the one or more blocks of the blockchain.

In some cases, the data analysis computing system 106 may monitor network communications between computing devices and may determine the attributes based on monitoring the network communications. For example, the data analysis computing system 106 may monitor (e.g., intercept) network communications between a first computing device and a second computing device. The data analysis computing system 106 may parse the network communications to identify the attributes.

Improvement of a Pool Characteristic

Figure 7:
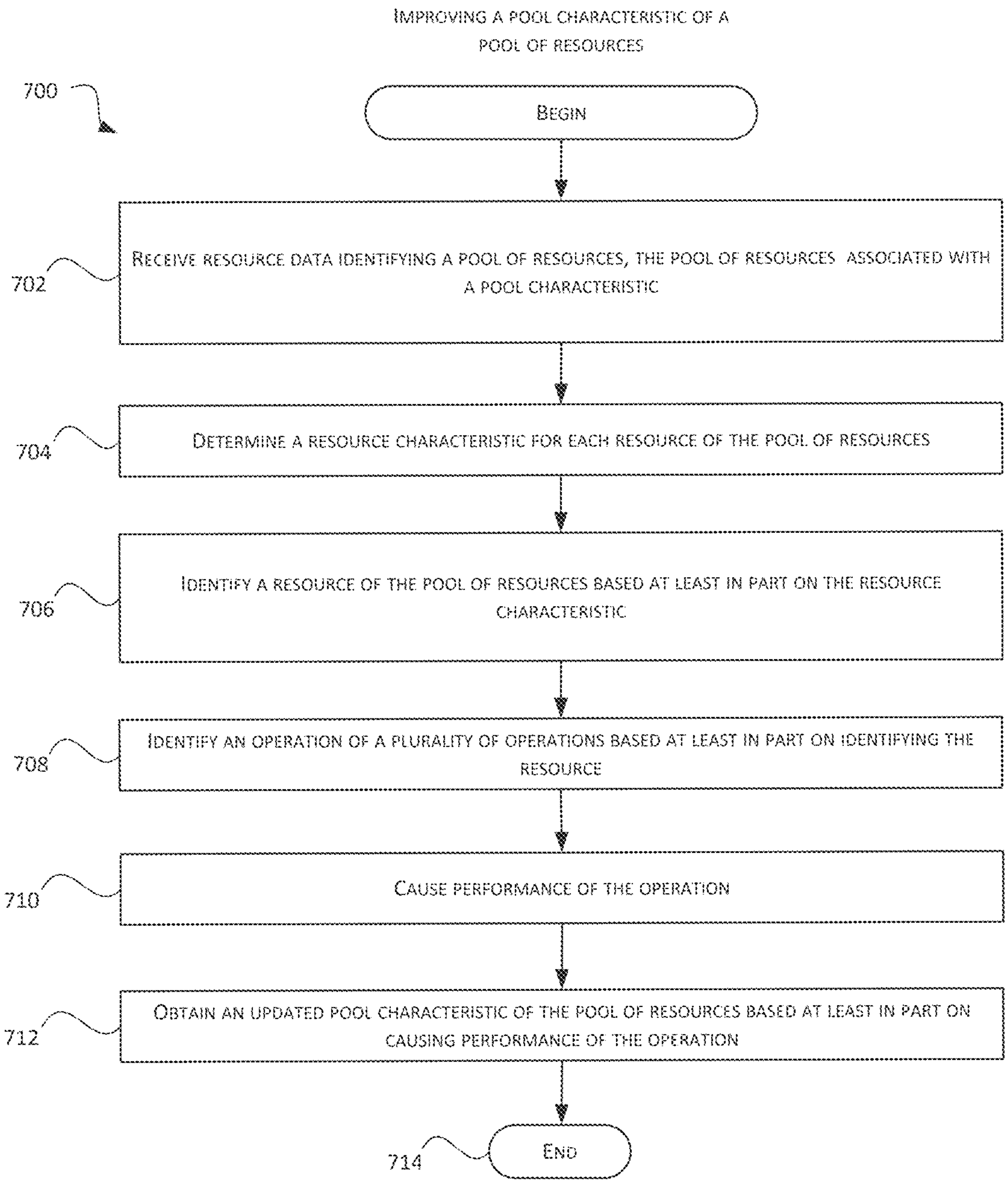
FIG. 7 is a flowchart of an example routine for obtaining an updated pool characteristic of a pool of resources according to some embodiments.

FIG. 7 presents a flowchart of an embodiment of a pool characteristic improvement process 700 in accordance with certain aspects of the present disclosure. The process 700 may include identifying a resource (e.g., object, item, etc.) of a pool of resources (e.g., an object pool, a pool of items, etc.) and causing performance of an operation based at least in part on attributes of the resource. By causing performance of such an operation on an individual resource of the pool of resources, the pool characteristic of the pool of resources can be improved without modifying the private data associated with a particular resource. Further, the improvement of the pool characteristic enables a user to cause an update to the pool characteristic of the pool of resources without modifying a resource of the pool of resources. The process 700 can be implemented by any system that can identify a resource and cause performance of an operation. The process 700, in whole or in part, can be implemented by, for example, a ratings computing system 102, a pool generation computing system 104, a data analysis computing system 106, among others. Although any number of systems, in whole or in part, can implement the process 700, to simply discussion, the process 700 will be described with respect to particular systems.

The process 700 may begin automatically, in response to a user interaction with a user interface, and/or upon receiving resource data. For example, the data analysis computing system 106 may periodically receive resource data (e.g., daily, weekly, monthly, etc.). At block 702, the data analysis computing system 106 receives or obtains resource data (e.g., object data) identifying a pool of resources (e.g., a pool of resources including a plurality of resources). In some embodiments, the data analysis computing system 106 may generate the resource data. The pool of resources may be associated with a pool characteristic. The pool of resources may include any number of resources (e.g., 1,000 resources, 10,000 resources, 20,000 resources, 50,000 resources, etc.). A plurality of resources may be grouped in the pool of resources such the plurality of resources are defined and wholly movable (e.g., transferrable) between physical entities in a holistic manner (e.g., via a singular operation). Further, each resource of the plurality of resources may have at least an individual and/or incremental impact (e.g., a discrete impact) on a pool characteristic of the pool of resources based at least in part on the pool of resources comprising the plurality of resources. Further, the pool of resources may be any grouped items. For example, the pool of resources may be a plurality of loans, a plurality of business loans, etc. In some embodiments, each resource may be associated with an entity (e.g., a business, a loan holder, etc.). For example, the resource may be a business loan associated with (e.g., for) a business (an entity).

In some embodiments, all or a portion of the resource data may be private data. Further, all or a portion of the pool of resources may be based at least in part on the private data or may be private data (e.g., identifiers of the resources that are included in the pool of resources may be private data). In other embodiments, the pool of resources may be public data (e.g., identifiers of the resources that are included in the pool of resources may be public data). In some embodiments, the pool characteristic may be based at least in part on the private data.

All or a portion of the resources may be associated with (e.g., may include, may be, etc.) an electronic file (e.g., an electronic document, an electronic agreement, etc.). For example, the electronic file may be an electronic loan agreement. In some embodiments, all or a portion of the resources may be associated with a physical file (e.g., a physical document, a physical agreement, etc.). For example, the physical file may be a physical loan agreement (e.g., a loan agreement on one or more pieces of paper). The electronic file and/or the physical file may identify a first entity, a second entity, and a component (e.g., a component being transferred between the entities). For example, where the resource is a loan, the loan may be established between the first entity and the second entity.

The electronic file and/or the physical file may include one or more signatures. For example, the electronic file may include one or more electronic signatures. Further, the one or more electronic signatures may include electronic copies of signatures, signatures based on an electronic signing of the electronic file (e.g., via a document signing system), etc. In another example, the electronic file and/or the physical file may include a signature from a first entity (e.g., the borrower) and a second entity (e.g., the lender).

The data analysis computing system 106 may validate at least a portion of the one or more signatures. The data analysis computing system 106 may validate the at least a portion of the one or more signatures by comparing the signatures to previously validated signatures associated with the respective entity, by performing a forgery check, by validating transmission information associated with the one or more signatures, etc. For example, the data analysis computing system 106 may validate that the transmission information associated with the one or more signatures indicates a network address (e.g., an internet protocol address) associated with a location of a respective entity (e.g., a home address of the respective entity). The data analysis computing system 106 (or a separate system (e.g., a pool generation system)) may include the plurality of resources in the pool of resources based on validating the one or more signatures. In some cases, the data analysis computing system 106 may validate the pool of resources based on validating all or a portion of the signatures associated with all or a portion of the plurality of resources.

All or a portion of the resources of the pool of resources may include one or more components (e.g., terms, conditions, obligations, elements, etc.). The components may identify particular computing resources (e.g., software resources or hardware resources). The one or more components may be, may include and/or may identify movable property (e.g., movable physical property) that is movable from one entity to another entity (e.g., based on the terms of a loans). For example, the movable property may be money, equipment, real estate, etc. The one or more components may be physical components. For example, where the pool of resources is a pool of loans, the one or more components may be the terms of the loans (e.g., a loan amount, a repayment period, etc.), a line of credit associated with the loans, collateral associated with the loans (e.g., equipment), bonds, certificates of deposit associated with the loans, a bank account (e.g., a borrower's bank account), a software application (e.g., a bank's software application), a web domain (e.g., a bank's web domain), etc. In another example, where the pool of resources is a pool of loans, a loan may identify a lender, a borrower, and a loan amount to be transferred from a bank account of the lender to a bank account of the borrower. In some cases, the one or more components may be an identifier of a first entity and/or a second entity associated with the resource (e.g., a bank account number, a routing number, etc.).

The one or more components may be based at least in part on components data. Further, the plurality of resources may be defined based at least in part on the components data. In some cases, the components data may identify and/or include the one or more components. Further, the components data may identify a connection (e.g., relationship, correlation, etc.) between a plurality of components and the pool of resources. For example, the components data may define the particular components that all or a portion of the pool of resources include. In one example, the components data may include the terms of a loan of a pool of loans and the data analysis computing system 106 may not be authorized to modify the terms of the loan. Instead, modification of the terms of the loan may require authorization from a borrower, a lender, and/or additional parties.

In some cases, the resource data may include all or a portion of the components data. At least a portion of the pool of resources may be based at least in part on (e.g., derived from) the components data.

A third party computing system (e.g., the loan holder) may define the components data. In some cases, the components data may include or may be private data that the data analysis computing system 106 (e.g., a hardware processor of the data analysis computing system 106) is not authorized to modify or does not have authorization to modify. The components data may not be modifiable and/or accessible by the data analysis computing system 106. Further, the data analysis computing system 106 may not be authorized to modify or may not have authorization to modify the components of all or a portion of the resources. For example, the data analysis computing system 106 may not be authorized to modify the terms of a loan.

Further, the resources of the pool of resources may not be modifiable by the data analysis computing system 106. Specifically, while the data analysis computing system 106 may remove and/or added resources to the pool of resources, the data analysis computing system 106 may not be able to (e.g., may not have authorization to) modify the resource (e.g., to generate a modified resource) within the pool of resources. For example, where the pool of resources is a pool of loans, the data analysis computing system 106 may not have authorization to modify a loan (e.g., the terms of the loan).

In some cases, the components data may include encrypted data that is encrypted using an encryption key. The data analysis computing system 106 may not have access to a decryption key corresponding to the encryption key. Therefore, the data analysis computing system 106 may be unable to and/or may not be authorized to decrypt the components data.

In some cases, the components data may include protected data. Further, the protected data may be stored in a protected format in a data store. For example, the components data may be stored in a data store and may be accessed from the data store based on providing login information (e.g., a username and/or a password). In some cases, the data analysis computing system 106 may not have access to the login information.

The data analysis computing system 106 may identify the pool characteristic of the pool of resources based at least in part on the resource data (e.g., the private data). The pool characteristic may include a dynamic assessment of a value, rating, ranking, quality, etc. associated with a particular pool of resources. For example, the pool characteristic may include a dynamic assessment of the pool of resources as compared to another pool of resources. The pool characteristic may be based at least in part on an evaluation of the components data, the plurality of electronic files, or the plurality of components (e.g., the plurality of movable physical property) of the pool of resources. The pool characteristic may vary over time based at least in part on modification of at least one of the components data, the plurality of electronic files, or the plurality of components.

The data analysis computing system 106 (or a separate system) may parse a plurality of characteristics to identify the pool characteristic of the pool of resources. For example, the data analysis computing system 106 may store a plurality of pool characteristics associated with a plurality of pools of resources and the data analysis computing system 106 may parse the plurality of pool characteristics to identify a pool characteristic for a particular pool of resources. In some embodiments, the data analysis computing system 106 may identify the pool characteristic without parsing the plurality of plurality of characteristics.

In some embodiments, the data analysis computing system 106 may generate the pool characteristic. For example, the data analysis computing system 106 may generate the resource the pool characteristic based on the resource data.

In some cases, the data analysis computing system 106 may obtain the pool characteristic from a computing device and may identify the pool characteristic based at least in part on obtaining the pool characteristic. For example, the data analysis computing system 106 may obtain the pool characteristic from a ratings computing system.

The pool characteristic of the pool of resources may be a dynamic characteristic. For example, the pool characteristic of the pool of resources may change over time. Specifically, the pool characteristic of the pool of resources may be a first characteristic during a first time period and may be a second characteristic during a second time period. To identify the pool characteristic, the data analysis computing system 106 may evaluate the plurality of resources during a particular time period or at a particular time.

At block 704, the data analysis computing system 106 determines a resource characteristic for each resource of the pool of resources (e.g., based on the resource data). The resource characteristic (e.g., an object characteristic) may be a dynamic characteristic that is based at least in part on an evaluation of the resource (e.g., at a particular time). For example, the resource characteristic may be a dynamic assessment of a value, a rating, a ranking, a quality, etc. associated with a particular resource (e.g., as compared to another resource of the same pool or a different pool of resources or not of a pool of resources)). In some cases, the pool characteristic may be based on the plurality of resource characteristics of the pool of resources.

At least a portion of the resource characteristics may be based at least in part on private data of the resource. For example, each of the resource characteristics may be based at least in part on the components data associated with the resource, a respective electronic file identified by the resource, and/or a respective component of the resource. In other embodiments, the resource characteristics may not be based at least in part on the private data. The resource characteristic may vary over time based at least in part on modification of at least one of the portion of the components data associated with the resource, the respective electronic file identified by the resource, or the respective component of the resource. Therefore, the data analysis computing system 106 can determine the resource characteristic for each resource of the pool of resources.

In some cases, the resource characteristic may be (indirectly) based at least in part on attributes of the resource, the first entity, and/or the second entity. For example, the resource characteristic may be based at least in part on attributes of the resource holder (e.g., a plurality of attributes of a plurality of resources). Further, the resource characteristic may include and/or may be based at least in part on a bank rating, a number of trade lines, a number of loans, a business standing, a business status, an asset quantity, a business age, etc. associated with an entity (e.g., the resource holder).

In some cases, the data analysis computing system 106 may obtain the resource characteristics from a computing device and may identify the resource characteristics based at least in part on obtaining the resource characteristics. For example, the data analysis computing system 106 may obtain the resource characteristics from a ratings computing system.

At block 706, the data analysis computing system 106 identifies a resource of the pool of resources based at least in part on the resource data. Further, the data analysis computing system 106 may identify the resource based on one or more thresholds associated with the pool of resources. The data analysis computing system 106 may identify the resource (e.g., automatically) during monitoring of the pool of resources. To identify the resource, the data analysis computing system 106 may identify one or more attributes of each resource of the pool of resources. For example, the one or more attributes may include one or more of a bank rating for a business loan, an eligibility to upgrade the bank rating for a business loan, a room for expansion for a business loan, and/or loan holder data (e.g., a number of buildings associated with a loan holder, a number of trade credit lines associated with the loan holder, a seasoning of a business associated with the loan holder, whether the loan holder accepts credit cards as payment, a standing of the loan holder, etc.).

The data analysis computing system 106 may simulate performance of an operation of a plurality of operations for all or a portion of the resources of the pool of resources. All or a portion of the plurality of operations may include an operation to modify a non-resource (e.g., a non-object) or a resource not included in the pool of resources such that data associated with the first entity or the second entity (as identified by the resource) is modified. For example, the resource may be a business loan and the non-resource may be a trade credit line. In some cases, the resource and the resource not included in the pool of resources may be different types of resources. For example, the resource may be a business loan and the resource not included in the pool of resources may be a lease. Specifically, all or a portion of the plurality of operations may include an operation to modify (e.g., indirectly) an attribute of the corresponding resource without modifying the components data (e.g., the portions of the components data associated with the resource), the respective electronic file identified by the resource, or a component of the resource.

Further, the plurality of operations may include a plurality of transformation operations (operations) to transform the pool of resources (e.g., to transform the pool characteristic) by modifying an attribute of a particular resource. In some cases, the data analysis computing system 106 may simulate performance of all or a portion of the plurality of operations for all or a portion of the resources. For example, the data analysis computing system 106 may simulate performance of a first operation for a first resource, simulate performance of the first operation for a second resource, simulate performance of a second operation for a third resource, etc.

In one example, to simulate the performance of the operation the data analysis computing system 106 may perform a monte carlo simulation. To perform the monte carlo simulation, the data analysis computing system 106 may identify one or more variables (e.g., random variables) and use the one or more variables to perform the simulation. Specifically, the data analysis computing system 106 may identify one or more variables associated with the resource. For example, the one or more variables may include attributes of the resource, attributes of an environment associated with the resource, etc. The data analysis computing system 106 may generate values for the one or more variables and perform the monte carlo simulation using the generated values.

In another example, to simulate the performance of the operation, the data analysis computing system 106 may identify one or more attributes of the resource (e.g., the attribute of the resource). The data analysis computing system 106 may identify an environment associated with the resource (e.g., a real world environment of the resource). For example, the data analysis computing system 106 may identify an environment in which the resource is located. The data analysis computing system 106 can identify one or more attributes of the environment. The one or more attributes of the environment may indicate how the respective resource characteristic is determined (e.g., measured) and/or how the attributes of the resource are indirectly related to the respective resource characteristic. The data analysis computing system 106 may generate a model of the environment based on the one or more attributes of the environment and/or the one or more attributes of the resource. The model of the environment may include at least the resource and a secondary resource (e.g., a resource not located in the plurality of resources). In some cases, the one or more attributes of the resource may be defined based on the secondary resource. For example, the resource and the secondary resource may each be business loans associated with the same entity and establishment of the secondary resource may increase an attribute of the resource. The data analysis computing system 106 can simulate performance of the operation within the model of the environment.

In some cases, the data analysis computing system 106 may review the simulated performance of the operation and determine whether the simulated performance of the operation does or does not satisfy one or more additional thresholds (e.g., threshold values, ranges, etc.). For example, the one or more additional thresholds may indicate whether an operation causes a particular modification.

To determine whether the simulated performance of the operation does or does not satisfy the one or more additional thresholds, the data analysis computing system 106 may determine whether indirect modification to the attribute of the resource does not satisfy one or more sub-thresholds (e.g., a threshold level of modification) of the one or more additional thresholds. If the data analysis computing system 106 determines that indirect modification to the attribute of the resource does not satisfy the one or more sub-thresholds, the data analysis computing system 106 may determine the simulated performance of the operation does not satisfy the one or more additional thresholds.

In some cases, to determine whether the simulated performance of the operation does or does not satisfy the one or more additional thresholds, the data analysis computing system 106 may determine whether the data analysis computing system 106 is authorized to perform the operation. If the data analysis computing system 106 determines that the data analysis computing system 106 is not authorized to perform the operation, the data analysis computing system 106 may determine the simulated performance of the operation does not satisfy the one or more additional thresholds.

In some cases, to determine whether the simulated performance of the operation does or does not satisfy the one or more additional thresholds, the data analysis computing system 106 may determine whether the simulated performance of the operation results in at least one of a decreased pool characteristic of the pool of resources as compared to the pool characteristic or a decreased resource characteristic of the resource as compared to the respective resource characteristic. If the data analysis computing system 106 determines that the simulated performance of the operation results in at least one of a decreased pool characteristic of the pool of resources as compared to the pool characteristic or a decreased resource characteristic of the resource as compared to the respective resource characteristic, the data analysis computing system 106 may determine the simulated performance of the operation does not satisfy the one or more additional thresholds.

In some cases, to determine whether the simulated performance of the operation does or does not satisfy the one or more additional thresholds, the data analysis computing system 106 may determine whether the simulated performance of the operation results in a modification to at least one of the portion of the components data associated with the resource, the respective electronic file identified by the resource, or the respective movable physical property of the resource. If the data analysis computing system 106 determines that the simulated performance of the operation results in a modification to at least one of the portion of the components data associated with the resource, the respective electronic file identified by the resource, or the respective movable physical property of the resource, the data analysis computing system 106 may determine the simulated performance of the operation does not satisfy the one or more additional thresholds.

Based on determining that the simulated performance of the operation does not satisfy the one or more additional thresholds, the data analysis computing system 106 may perform a responsive action. For example, the data analysis computing system 106 may remove the operation from the plurality of operations. In another example, the data analysis computing system 106 may cause display of a graphical user interface via a user computing device. The graphical user interface may identify the operation and that the simulated performance of the operation does not satisfy the one or more additional thresholds. In another example, the data analysis computing system 106 may adjust the operation (e.g., and add the adjusted operation to the plurality of operations), adjust an additional operation of the plurality of operations (e.g., and add the adjusted operation to the plurality of operations), and/or generate an additional operation (e.g., and add the additional operation to the plurality of operations).

Based on the simulation of the performance of the operation, the data analysis computing system 106 may generate (e.g., predict), for each of the resources of the pool of resources, a predicted resource characteristic for the resource based at least in part on a particular modification of an attribute of the resource (e.g., the modification resulting from the simulated performance of the operation). The data analysis computing system 106 may generate the predicted resource characteristic using the corresponding resource characteristic. For example, the data analysis computing system 106 may generate the predicted resource characteristic based at least in part on a modification to an attribute of the resource and/or one or more previous values of the resource characteristic. Further, the data analysis computing system 106 may identify a trend of the resource characteristic based at least in part on the one or more previous values of the resource characteristic. The data analysis computing system 106 may identify how the modification of the attribute causes an adjustment to the trend of the resource characteristic.

In some cases, the data analysis computing system 106 may predict, for all or a portion of the pool of resources, a resource characteristic for the resource based at least in part of a plurality of modifications of the attribute and/or a plurality of modifications to a plurality of attributes of resources of the pool of resources. The predicted resource characteristic may be a predicted future value, rating, ranking, quality, etc. associated with a particular resource. The data analysis computing system 106 may identify a predicted resource characteristic for each modification of a plurality of modifications of an attribute. In another example, the data analysis computing system 106 may identify a predicted resource characteristic based at least in part on a first modification of a first attribute of the resource, a second modification of a second attribute of the resource, etc. The data analysis computing system 106 may normalize results of the simulated performance of the operation by generating the predicted resource characteristic and the predicted pool characteristic.

To identify the resource, the data analysis computing system 106 may identify the resource based at least in part on one or more of the predicted resource characteristic, a comparison of the resource characteristic and a corresponding predicted resource characteristic, or a rate of change of the resource characteristic for all or a portion of the plurality of resources. At least one of the resource characteristic or the predicted resource characteristic may be based at least in part on at least a portion of the private data.

In some cases, the data analysis computing system 106 may compare one or more of the predicted resource characteristic, a comparison of the resource characteristic and a corresponding predicted resource characteristic, or a rate of change of the resource characteristic for all or a portion of the plurality of resources to the one or more thresholds (e.g., threshold values or threshold ranges). Based at least in part on comparing the one or more of the predicted resource characteristic, a comparison of the resource characteristic and a corresponding predicted resource characteristic, or a rate of change of the resource characteristic for all or a portion of the plurality of resources to the one or more thresholds, the data analysis computing system 106 may determine whether the thresholds are satisfied. The data analysis computing system 106 may identify the resource based on determining whether the thresholds are satisfied. For example, the data analysis computing system 106 may identify whether the resource qualifies for rehabilitation based on determining whether the thresholds are satisfied. If the data analysis computing system 106 determines that the resource does not qualify for rehabilitation, the data analysis computing system 106 may cause removal of the resource from the plurality of resources. If the data analysis computing system 106 determines that the resource qualifies for rehabilitation, the data analysis computing system 106 may cause an adjustment to an attribute of the resource to rehabilitate the resource.

Further, the data analysis computing system 106 may generate (e.g., predict), for each particular modification of an attribute and each particular combination of modifications of attributes, a predicted pool characteristic of the pool of resources. The data analysis computing system 106 may generate the predicted pool characteristic based on one or more predicted resource characteristics as discussed above. For example, the data analysis computing system 106 may predict a first pool characteristic based at least in part on a modification to a first attribute of the resource, a second pool characteristic based at least in part on a modification to a second attribute of the resource, etc. The predicted pool characteristic may be a predicted future value, rating, ranking, quality, etc. associated with a particular pool of resources. The data analysis computing system 106 may predict the pool characteristic based at least in part on the resource characteristics of the plurality of resources (e.g., including at least one predicted resource characteristic). The data analysis computing system 106 may predict the pool characteristic by aggregating, normalizing, determining a maximum or minimum, or otherwise analyzing the resource characteristics of the plurality of resources.

In some cases, to identify the resource, the data analysis computing system 106 may identify the resource based at least in part on one or more of the predicted pool characteristic, a comparison of the pool characteristic and a corresponding predicted pool characteristic, or a rate of change of the pool characteristic. The data analysis computing system 106 may compare one or more of the predicted pool characteristic, a comparison of the pool characteristic and a corresponding predicted pool characteristic, or a rate of change of the pool characteristic to the one or more thresholds. Based at least in part on comparing the one or more of the predicted pool characteristic, a comparison of the pool characteristic and a corresponding predicted pool characteristic, or a rate of change of the pool characteristic to the one or more thresholds, the data analysis computing system 106 may determine whether the thresholds are satisfied. The data analysis computing system 106 may identify the resource based on determining whether the thresholds are satisfied. For example, the data analysis computing system 106 may identify whether the resource and/or pool of resources qualifies for rehabilitation based on determining whether the thresholds are satisfied. If the data analysis computing system 106 determines that the resource and/or pool of resources does not qualify for rehabilitation, the data analysis computing system 106 may cause removal of the resource from the plurality of resources and/or may cause provision of the pool of resources from an entity to another entity. If the data analysis computing system 106 determines that the resource and/or pool of resources qualifies for rehabilitation, the data analysis computing system 106 may cause an adjustment to an attribute of the resource to rehabilitate the resource and/or pool of resources.

The data analysis computing system 106 may compare each of the predicted pool characteristics to determine a pool characteristic (e.g., a predicted pool characteristic with a value greater than each other predicted pool characteristic). Therefore, the data analysis computing system 106 may identify a particular modification to an attribute of a particular resource (or a particular combination of modifications to a plurality of attributes of a plurality of resources). Based at least in part on the identified modification(s), the data analysis computing system 106 may identify one or more resource(s) associated with the identified modification (s).

In some embodiments, a system separate and/or distinct from the data analysis computing system 106 may identify the resource. For example, a computing system that is distinct from and/or remotely located from the data analysis computing system 106 may identify the resource and transmit data identifying the resource to the data analysis computing system 106 via a network connection.

The data analysis computing system 106 may monitor the attributes of the pool of resources by monitoring electronic communications associated with a resource and/or a resource holder. The data analysis computing system 106 may identify computing devices associated with the resource data. Further, the data analysis computing system 106 may monitor network traffic (e.g., network communications) associated with (e.g., to, from, between, etc.) the computing devices. For example, the data analysis computing system 106 may monitor network traffic by monitoring computer transmissions, posts, or network traffic statistics associated with the one or more computing devices. The data analysis computing system 106 may update the resource characteristic for a resource based at least in part on the network traffic. In another example, the data analysis computing system 106 may perform a web crawl (e.g., by searching one or more web domains for a particular search term). The data analysis computing system 106 may monitor a web domain (e.g., by monitoring updates to a web domain). Further, the data analysis computing system 106 may monitor a social media platform (e.g., social media platforms associated with a resource holder). Further, the data analysis computing system 106 may monitor reports or filings (e.g., reports or filings by government entities, public finance entities, ratings agencies, etc.).

In some embodiments, to automatically identify the resource, the data analysis computing system 106 may provide the resource data to a machine learning model that is trained using training data. The machine learning model may output a particular operation, a particular attribute for modification, a particular resource characteristic, a particular pool characteristic, a particular resource, and/or a particular pool of resources.

In some cases, the machine learning model may be trained to output a particular resource and/or an operation associated with the particular resource. For example, the output of the machine learning model may identify a particular resource to be added to or removed from a particular pool of resources based at least in part on a resulting modification to a resource characteristic and/or a pool characteristic.

In some cases, the machine learning model may be trained to output a particular attribute and/or an operation associated with the particular attribute. For example, the output of the machine learning model may identify a particular attribute and an operation associated with the attribute.

In some cases, the machine learning model may be trained to output a particular pool of resources and/or an operation associated with the particular pool of resources. For example, the output of the machine learning model may identify a particular pool of resources to be obtained and/or provided to another user based at least in part on a pool characteristic (e.g., a predicted pool characteristic) of the particular pool of resources.

In some cases, the machine learning model may be trained to predict a resource characteristic of a resource and/or a pool characteristic of the pool of resources based at least in part on a modification to an attribute associated with a particular resource of the pool of resources. For example, the machine learning model may be trained to identify a likelihood of default for a loan (a resource characteristic) based at least in part on the modification to an attribute of the loan. The machine learning model may output an indication of the predicted resource characteristic of the resource and/or the predicted pool characteristic. The data analysis computing system 106 may identify the resource based at least in part on the output of the machine learning model.

In some cases, the machine learning model may be trained to output a modification to a particular attribute that causes a particular modification in resource characteristics or a pool characteristic. For example, the output of the machine learning model may identify a particular modification to a particular attribute that is predicted to cause an increase in a pool characteristic that has a greater value as compared to modifications to the pool characteristic caused by a plurality of modifications to a plurality of attributes of the pool of resources.

At block 708, the data analysis computing system 106 identifies an operation for performance. The data analysis computing system 106 may identify the operation based on simulation of the operation causing the one or more thresholds to be satisfied. The data analysis computing system 106 may automatically identify the operation to cause the particular modification of the attribute of the identified resource. In some cases, the data analysis computing system 106 may filter a plurality of operations to identify the operation. The operation may include any type of operation that can modify an attribute of the resource. For example, the operation may include establishing, recommending establishment, and/or causing establishment of at least one of a business loan for an entity associated with the resource, a lease for the entity, and/or a trade credit line for the entity.

In some embodiments, the data analysis computing system 106 may identify the operation based at least in part on monitoring the attributes of the pool of resources (e.g., by determining that the resource characteristic of the resource can be improved by a particular operation to modify an attribute, by determining that the resource characteristic of the resource may not exceed a particular value based at least in part on the modification of an attribute of the resource and the resource is to be removed from the pool, etc.). In some cases, the data analysis computing system 106 may identify the operation based at least in part on monitoring data associated with the pool of resources (e.g., in real time). For example, the data analysis computing system 106 may identify the operation based at least in part on performing a web crawl, monitoring a web domain, monitoring a social media platform, monitoring filings or reports (e.g., governmental filings, governmental reports, public finance reports, ratings agency reports, etc.).

The data analysis computing system 106 may identify the operation from the plurality of operations and/or a second plurality of operations based on the normalized results of the simulated performance of the operation and determining whether the one or more thresholds are satisfied. The plurality of operations may include resource operations and the second plurality of operations may include pool operations. For example, the plurality of operations may include an operation to another resource that causes a modification to an attribute of a particular resource (e.g., causing establishment of an additional business loan) and the second plurality of operations may include an operation to the pool of resources that causes removal of a resource from the pool of resources and/or addition of a resource to the pool of resources. Therefore, the data analysis computing system 106 can identify an operation for performance.

At block 710, the data analysis computing system 106 causes performance of the operation based at least in part on attributes of the resource. The data analysis computing system 106 may cause performance of the operation without modifying the private data (e.g., the components data, the plurality of components, the plurality of electronic files, etc.). For example, the data analysis computing system 106 may cause performance of the operation without modifying the private data on which the resource, the resource characteristic, and/or the pool characteristic is based.

Causing performance of the operation may include identifying a resource for removal and causing removal of a resource from the plurality of resources. For example, the data analysis computing system 106 may route instructions to and/or a request to a computing device maintaining the plurality of resources to remove the resource from the plurality of resources.

In some cases, causing performance of the operation may include causing addition of a resource to the plurality of resources. For example, the data analysis computing system 106 may identify a resource that has one or more similarities with a resource of the plurality of resources (e.g., one or more attributes, a resource characteristic, etc. is the same or within a particular range of similarity).

In some cases, causing performance of the operation may include causing adjustment to (e.g., modification of) an attribute (e.g., data of the attribute) of a resource of the plurality of resources. For example, the data analysis computing system 106 may cause an adjustment to an attribute that, in turn, cause an adjustment to a resource characteristic (e.g., indirectly). The attribute may include data and the resource characteristic may be based at least in part on the data of the attribute.

In some cases, causing performance of the operation may include causing provision of the pool of resources from a third entity (e.g., a first pool holder) to a fourth entity (e.g., a second pool holder). For example, the data analysis computing system 106 may recommend that the third entity sell the pool of resources.

Alternatively, or in addition, the data analysis computing system 106 may output an identification of the operation for display to a user enabling the user to initiate performance of the operation or to select an alternative operation. In some cases, the data analysis computing system 106 may transmit the identification of the recommended operation to a user computing device enabling the user computing device to display the identification of the recommended operation to the user. Further, the data analysis computing system 106 may transmit the recommendation for the operation for display via a customized user interface of the user computing device. The customized user interface may identify the operation from a list of operations and the resource from a list of resources. For example, the customized user interface may include a specific marking or coloring scheme to identify the operation and/or the resource (e.g., the operation and the resource may be highlighted). In some embodiments, the customized user interface may hide other resources and/or other operations. For example, the customized user interface may not display resources, may display resources but the resources may be grayed out, may display the resources but the resources may be non-interactive, etc. Further, the customized user interface may identify particular operations as harmful and/or not-helpful to improving the pool characteristic. Therefore, the data analysis computing system 106 may transmit the recommendation for the operation for display via an improved user interface that offers advantages over user interfaces that may only display potential operations.

In some embodiments, the data analysis computing system 106 can cause performance of the operation by routing machine instructions (e.g., a portion of code) for a computing device to perform the operation (e.g., offer an additional loan to the resource holder). The machine instructions may identify the resource, the resource holder, a computing device associated with the resource holder, and/or the operation. For example, the machine instructions may identify that a computing device receiving the instructions is to offer an additional loan to a particular computing device associated with the resource.

To cause performance of the operation, the data analysis computing system 106 may route machine instructions to a computing device. For example, the machine instructions may recommend and/or command the computing device to offer a loan, a trade credit line, and/or a lease to the resource holder. The machine instructions may cause the computing device to automatically perform the operation (e.g., in response to receive the machine instructions).

In response to receiving the machine instructions, the computing device may identify the resource and the operation and perform the operation to adjust the attributes of the resource. For example, the computing device may identify a computing resource and an operation to increase the memory capacity of the computing resource. Based at least in part on identifying the computing resource and the operation, the computing device may assign additional memory to increase the memory capacity of the computing resource.

In some embodiments, the data analysis computing system 106 may identify a particular computing device to route the machine instructions. For example, the data analysis computing system 106 may analyze the operation and/or the resource and identify a computing device that is capable of performing the operation to modify the attributes of the resource. For example, the data analysis computing system 106 may identify a computing device associated with a lender (e.g., a bank) that offers loans. Based at least in part on identifying the computing device, the data analysis computing system 106 can route the machine instructions to the computing device (e.g., via a network connection).

In some cases, the computing device may not perform the operation without receiving the machine instructions and/or may be less likely to perform the operation without receiving the machine instructions as compared to when the computing device receives the machine instructions. For example, the computing device may not offer a loan, a trade credit line, or a lease to the resource holder without receiving the machine instructions. In some embodiments, the data analysis computing system 106 may provide additional data to the computing device (e.g., an authorization, an approval, a recommendation, etc.). Further, in some cases, an entity, via the data analysis computing system 106, may act as a co-signer for the resource holder and the additional data may include co-signing data.

By causing performance of the operation, the data analysis computing system 106 may improve the pool characteristic of the pool of resources without modifying the resource. Further, to cause performance of the operation, the data analysis computing system 106 may cause modification of an attribute of the resource. The modification of the attributes of the resource may improve (implicitly) the pool characteristic of the pool of resources. For example, the performance of the operation may improve the pool characteristic of the pool of resources by causing removal of a resource from the pool of resources (and the pool of resources) and/or by causing improvement of the resource characteristic of the resource. In some cases, the data analysis computing system 106 may cause a system (e.g., a system separate from the data analysis computing system 106) to perform the operation. Further, the data analysis computing system 106 may cause the system to perform the operation by transmitting a resource identifier of the resource (e.g., a loan identifier) and an operation command (e.g., identifying the particular operation) to the system.

In some embodiments, the data analysis computing system 106 may determine that a particular resource characteristic may not be improved (e.g., less than 75% likelihood of being improved) or that improvements of the particular resource characteristic do not or are unlikely (e.g., less than a 20% improvement to the particular resource characteristic) to satisfy a threshold level of improvement. In some such cases, the data analysis computing system 106 may determine that the associated resource is ineligible (e.g., does not qualify) for rehabilitation. In response to determining the associated resource is ineligible for rehabilitation, the data analysis computing system 106 may cause removal of the resource from the pool of resources. Further, the data analysis computing system 106 may transmit a request to remove the resource from the pool of resources to a computing device (e.g., a computing device of pool generation computing system).

In some cases, based at least in part on the identification of the operation and/or the performance of the operation, the data analysis computing system 106 may predict a pool characteristic of the pool of resources. The predicted pool characteristic may be an estimation (e.g., prediction) of an updated pool characteristic. The data analysis computing system 106 may transmit the predicted pool characteristic to a computing device (e.g., a customer computing device). Further, the data analysis computing system 106 may cause display of the predicted pool characteristic via a display of the computing device (e.g., via a user interface). In response to transmitting, to the computing device, the predicted pool characteristic, the data analysis computing system 106 may receive, from the computing device, a request to cause to performance of the operation. The data analysis computing system 106 may cause performance of the operation based at least in part on receiving the request. Therefore, the data analysis computing system 106 can cause performance of the operation.

At block 712, the data analysis computing system 106 obtains an updated pool characteristic of the pool of resources based at least in part on causing performance of the operation. The data analysis computing system 106 may route (e.g., transmit) a request for an updated pool characteristic to a ratings computing system based at least in part on causing performance of the operation. Further, the data analysis computing system 106 may receive the updated pool characteristic from the ratings computing system based at least in part on routing the request for the updated pool characteristic. Therefore, the data analysis computing system 106 can obtain the updated pool characteristic of the pool of resources. The process 700 may end at block 714. Alternatively, the process 700 may be repeated on an ongoing basis or in accordance with a particular schedule. In some cases, the process 700 may be repeated in response to a command and/or a change in the resources included in the pool of resources.

Improvement of a Value of a Pool of Business Loans

Figure 8:
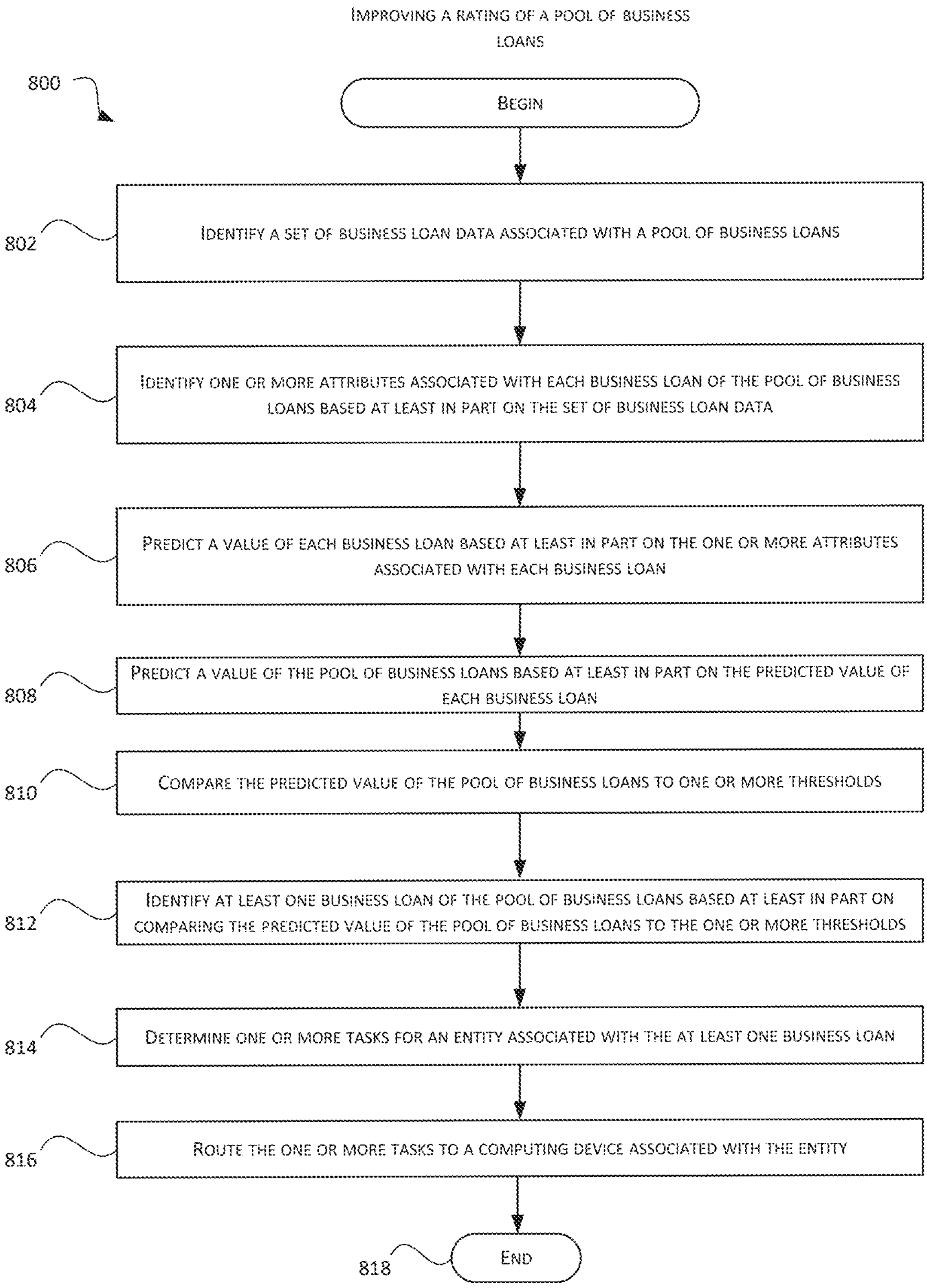
FIG. 8 is a flowchart of an example routine for causing performance of a task associated with a loan according to some embodiments.

FIG. 8 presents a flowchart of an embodiment of a value improvement process 800 in accordance with certain aspects of the present disclosure. The process 800 may include identifying a business loan of a pool of business loans and causing performance of a task for a loan holder associated with the business loan. By causing performance of such an operation on an individual business loan of the pool of business loans, the value of the pool of business loans can be improved without modifying the private data associated with the business loan. Further, the improvement of the value of the business loans can enable a user to cause an update to a value of a pool of business loans without modifying a business loan of the pool of business loans. The process 800 can be implemented by any system that can identify a business loan and cause performance of a task. The process 800, in whole or in part, can be implemented by, for example, a ratings computing system 102, a pool generation computing system 104, a data analysis computing system 106, among others. Although any number of systems, in whole or in part, can implement the process 800, to simply discussion, the process 800 will be described with respect to particular systems.

The process 800 may begin automatically, in response to a user interaction with a user interface, and/or upon identifying business loan data. For example, the data analysis computing system 106 may periodically receive business loan data (e.g., daily, weekly, monthly, etc.). At block 802, the data analysis computing system 106 identifies (e.g., receives, obtains, generates, etc.) a set of business loan data associated with a pool of business loans. The data analysis computing system 106 may obtain the set of business loan data from a pool generation computing system. The pool of business loans may be associated with a value. Further, the set of business loan data may include data associated with a business loan and/or data associated with a loan holder. Therefore, the data analysis computing system 106 can identify the set of business loan data.

At block 804, the data analysis computing system 106 identifies (e.g., receives, obtain, generates, etc.) one or more attributes associated with each business loan of the pool of business loans based at least in part on the set of business loan data. The attributes may include can include one or more of a bank rating for each business loan, an eligibility to upgrade the bank rating for each business loan, a room for expansion for each business loan, and/or loan holder data (e.g., a number of buildings associated with the loan holder, a number of trade credit lines associated with the loan holder, a seasoning of a business associated with the loan holder, whether the loan holder accepts credit cards as payment, a standing of the loan holder, etc.). Therefore, the data analysis computing system 106 can identify the one or more attributes associated with each business loan.

At block 806, the data analysis computing system 106 predicts a value (loan characteristic) of each business loan of the pool of business loans based at least in part on the one or more attributes associated with each business loan. The data analysis computing system 106 may predict the value of each business loan based at least in part on one or more modifications (e.g., adjustments) to one or more attributes of at least one particular business loan. For example, the data analysis computing system 106 can predict a value of each business loan based at least in part on the predicted performance of a task to modify a particular attribute. At block 806, the data analysis computing system 106 may not perform the task and, instead, may predict how performance of the task may cause a modification to the attributes of each business loan, and, in turn, the value of each business loan. In some cases, the data analysis computing system 106 may identify a value of each business loan. For example, the data analysis computing system 106 can obtain, from a separate computing device, the value of each business loan. The data analysis computing system 106 may predict the value of each business loan based at least in part on the value (e.g., the current value) of each business loan and the performance of the task. Therefore, the data analysis computing system 106 can predict the value of each business loan.

In some cases, the data analysis computing system 106 may not predict the value of all or a portion of the business loans of the pool of business loans. Instead, the data analysis computing system 106 may route the one or more attributes associated with a particular business loan and/or the business loan data to a separate computing system and the separate computing system may route the predicted value of all or a portion of the business loans of the pool of business loans to the data analysis computing system 106.

At block 808, the data analysis computing system 106 predicts a value (pool characteristic) of the pool of business loans based at least in part on the predicted value of each business loan. The data analysis computing system 106 may predict the value of the pool of business loans by analyzing all or a portion of the business loans of the pool of business loans. For example, the data analysis computing system 106 may perform one or more operations (e.g., to aggregate, normalize, determine a minimum, determine a maximum, etc.) using the predicted value of each business loan. Therefore, the data analysis computing system 106 can predict the value of the pool of business loans.

In some cases, the data analysis computing system 106 may not predict the value of the pool of business loans. Instead, the data analysis computing system 106 may route the predicted values of all or a portion of the business loans to a separate computing system and the separate computing system may route the predicted value of the pool of business loans to the data analysis computing system 106. In some cases, the data analysis computing system 106 may not route the predicted values of all or a portion of the business loans to a separate computing system and instead may route the one or more attributes, the pool of business loans, the set of business loan data, a set of adjusted business loan data, etc. to the separate computing system and may obtain the predicted value of the pool of business loans.

At block 810, the data analysis computing system 106 compares the predicted value of the pool of business loans to one or more thresholds (e.g., threshold values, threshold ranges, etc.). In some cases, the one or more thresholds may be entity-specific, loan-specific, pool-specific, system-specific, etc. For example, a pool holder, a loan holder, etc. may provide threshold information to the data analysis computing system 106 identifying the one or more thresholds. The data analysis computing system 106 may receive a request to improve a value of the pool of business loans from a particular entity (e.g., a pool holder) and may identify one or more thresholds associated with the particular entity to compare with the predicted value of the pool of business loans based at least in part on receiving the request from the particular entity. Therefore, the data analysis computing system 106 can compare the predicted value of the pool of business loans to one or more thresholds.

In some cases, the data analysis computing system 106 can compare the predicted value of all or a portion of the business loans of the pool of business loans to one or more corresponding thresholds. For example, the data analysis computing system 106 can compare the predicted value of all or a portion of the business loans to one or more corresponding thresholds based at least in part on performance of one or more tasks to identify at least one business loan and at least one task that is predicted to cause a greatest increase in a predicted value of a business loan as compared to other tasks.

In some cases, the data analysis computing system 106 may analyze the set of business loan data. Analyzing the set of business loan data may include, for each business loan of the pool of business loans, one or more of identifying the one or more attributes, predicting the value of the business loan based at least in part on adjusting an attribute of the one or more attributes, predicting a value of the pool of business loans based at least in part on the predicted value of the business loan, and comparing the predicted value of the pool of business loans to one or more thresholds.

At block 812, the data analysis computing system 106 identifies at least one business loan of the pool of business loans based at least in part on comparing the predicted value of the pool of business loans to the one or more thresholds. In some cases, the data analysis computing system 106 can identify the at least one business loan based at least in part on analyzing the set of business loan data.

In some cases, the data analysis computing system 106 can identify a task that when performed for a particular business loan causes the predicted value of the pool of business loans to match or exceed a particular threshold (e.g., a threshold value). In some cases, the data analysis computing system 106 can identify a task that when performed for a particular business loan causes the predicted value of the pool of business loans to be the greatest value as compared to other predicted values of the pool of business loans based at least in part on performance of tasks for the same or different business loans. Therefore, the data analysis computing system 106 can identify the at least one business loan.

In some cases, to identify the at least one business loan, the data analysis computing system 106 can compare an updated attribute (e.g., based at least in part on performance of the task) associated with the at least one business loan to a threshold. Further, the data analysis computing system 106 can compare a difference between the attribute and the updated attribute to a threshold. In some cases, the data analysis computing system 106 can compare a rate of change of the attribute (e.g., based at least in part on the attribute and the updated attribute) over a period of time to a threshold. The threshold may be any value. Therefore, the data analysis computing system 106 can compare the updated attribute and a threshold. based at least in part on comparing the updated attribute and a threshold, the data analysis computing system 106 may determine that a particular updated attribute is predicted to match or exceed a particular threshold. In response to determining that the particular updated attribute is predicted to match or exceed the particular threshold, the data analysis computing system 106 can identify the corresponding business loan for performance of a corresponding task.

At block 814, the data analysis computing system 106 determines one or more tasks for an entity (e.g., a loan holder, a pool holder, a prospective pool holder, a prospective loan holder, etc.) associated with the at least one business loan (e.g., based at least in part on analyzing the set of business loan data). For example, the data analysis computing system 106 may determine one or more tasks for a lender, a borrower, a business associated with the borrower or lender, a pool holder, a prospective pool holder, a prospective lender, etc. As discussed above, the one or more tasks may include one or more operations to improve the value of the pool of business loans based at least in part on analyzing the set of loan data. Therefore, the data analysis computing system 106 can determine the one or more tasks.

At block 816, the data analysis computing system 106 routes the one or more tasks to a computing device associated with the entity. For example, the data analysis computing system 106 may route the one or more tasks to a computing device and cause performance of the one or more tasks. In some cases, the data analysis computing system 106 may route the one or more tasks to the computing device and recommend performance of the one or more tasks (e.g., recommend that the entity implement the one or more tasks). For example, the data analysis computing system 106 may cause display of a user interface that includes a recommendation to perform the one or more tasks. Further, the data analysis computing system 106 may cause the computing device (or a separate computing device) to perform the one or more tasks. For example, the data analysis computing system 106 may route a command to a separate computing device to offer one or more additional loans to the loan holder. Therefore, the data analysis computing system 106 can cause performance of the one or more tasks. The process may end at block 818. Alternatively, the process 800 may be repeated on an ongoing basis or in accordance with a particular schedule. In some cases, the process 800 may be repeated in response to a command and/or a change in the business loans included in the pool of business loans.

Improvement of a Rating of a Pool of Loans

Figure 9:
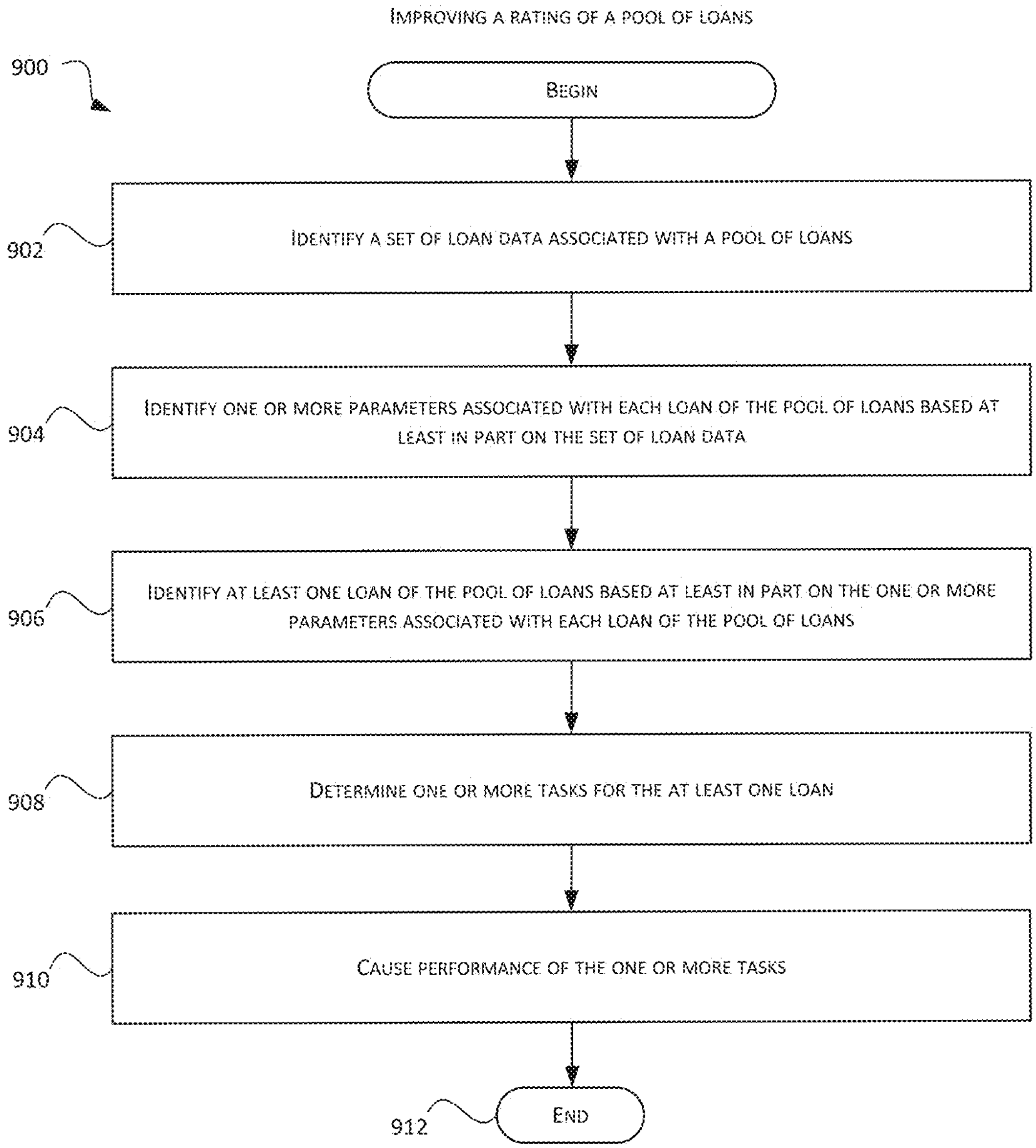
FIG. 9 is a flowchart of an example routine for causing performance of a task associated with a loan according to some embodiments.

FIG. 9 presents a flowchart of an embodiment of rating improvement process 900 in accordance with certain aspects of the present disclosure. The process 900 may include identifying a loan (e.g., a business loan) of a pool of loans and causing performance of a task for a loan holder associated with the loan. By causing performance of such an operation on an individual loan of the pool of loans, the rating of the pool of loans can be improved without modifying the private data associated with the loan. The process 900 can be implemented by any system that can identify a loan and cause performance of a task. The process 900, in whole or in part, can be implemented by, for example, a ratings computing system 102, a pool generation computing system 104, a data analysis computing system 106, among others. Although any number of systems, in whole or in part, can implement the process 900, to simply discussion, the process 900 will be described with respect to particular systems.

The process 900 may begin automatically, in response to a user interaction with a user interface, and/or upon identifying loan data. For example, the data analysis computing system 106 may periodically receive loan data (e.g., daily, weekly, monthly, etc.). At block 902, the data analysis computing system 106 identifies (e.g., receives, obtains, generates, etc.) a set of loan data associated with a pool of loans. The pool of loans may be associated with a rating. The data analysis computing system 106 may obtain the set of loan data from a pool generation computing system and/or a ratings computing system. In some embodiments, the data analysis computing system 106 may identify the set of loan data by monitoring a loan holder, a loan, etc. Therefore, the data analysis computing system 106 can identify the set of loan data.

At block 904, the data analysis computing system 106 identifies (e.g., receives, obtain, generates, etc.) one or more parameters (loan characteristics) associated with each loan of the pool of loans based at least in part on the set of loan data. The data analysis computing system 106 may identify the one or more parameters from the set of loan data. The one or more parameters may include a measurement of the rating, value, etc. associated with a particular loan (the resource characteristic). To identify the one or more parameters, the data analysis computing system 106 may identify attributes associated with the loan. The data analysis computing system 106 may identify the one or more parameters based on identified attributes of a loan. As discussed above, the parameters may include a bank rating associated with the loan holder, a number of trade lines associated with the loan holder, a number of loans associated with the loan holder, a standing of a business associated with the loan holder, a status of a business associated with the loan holder, a quantity of assets of a business associated with the loan holder, or an age of a business associated with the loan holder.

The data analysis computing system 106 may modify an attribute and determine (predict) an updated parameter (e.g., rating) of the loan based at least in part on the modified attribute, as noted above. Further, the data analysis computing system 106 can determine an updated parameter (e.g., rating) for the pool of loans based at least in part on the updated parameter of the loan. The data analysis computing system 106 may determine an updated parameter of the pool of loans based at least in part on any number of updated parameters of loans (and any number of modified attributes). Therefore, the data analysis computing system 106 can identify the one or more parameters.

At block 906, the data analysis computing system 106 identifies at least one loan of the pool of loans based at least in part on the one or more parameters associated with each loan of the pool of loans. For example, the data analysis computing system 106 can identify at least one loan to modify an attribute of the at least one loan and/or remove the at least one loan from the pool of loans. In some cases, instead of or in addition to, identifying at least one loan of the pool of loans, the data analysis computing system 106 can identify at least one loan not located in the pool of loans (e.g., of a different pool of loans or of no pool of loans). For example, the data analysis computing system 106 can identify at least one loan to add to the pool of loans.

As discussed above, the data analysis computing system 106 can identify a loan from the pool of loans based at least in part on comparing updated parameters for the pool of loans that are determined based at least in part on modified attributes. In some cases, the data analysis computing system 106 may compare one or more updated parameters of the pool of loans to determine one or more modifications to one or more attributes that are predicted to result in particular updated parameter of a particular loan and a particular updated parameter of the pool of loans. For example, the data analysis computing system 106 may compare the predicted updated parameters of the pool of loans associated with different modifications to the attributes to identify a greatest predicted updated parameter as compared to other predicted updated parameters based on the modifications to the attributes. Further, the data analysis computing system 106 may identify a first modification to an attribute of a loan that results in a larger difference between the parameter of the pool of loans and the updated parameter of the pool of loans than a second modification to an attribute of a loan (e.g., a same or different modification to the same or different attribute of the same or different loan). In some cases, the data analysis computing system 106 can identify a modification to an attribute of a loan that is associated with a particular difference between the parameter of the pool of loans and the updated parameter of the pool of loans. Therefore, the data analysis computing system 106 can identify the at least one loan.

At block 908, the data analysis computing system 106 determines one or more tasks for the at least one loan. For example, based at least in part on this comparison, the data analysis computing system 106 can identify one or more tasks to modify the attribute of the at least one loan, remove a loan from the pool of loans, add a loan to the pool of loans, etc. Further, the data analysis computing system 106 may determine the one or more tasks for a loan holder associated with the at least one loan. As discussed above, the one or more tasks may include one or more operations to improve the parameter of the pool of loans by modifying an attribute of a loan, removing a loan from the pool of loans, adding a loan to the pool of loans, etc. In some cases, the data analysis computing system 106 may determine the one or more tasks based at least in part on analyzing the set of loan data. Therefore, the data analysis computing system 106 can determine the one or more tasks.

At block 910, the data analysis computing system 106 causes performance of the one or more tasks for the loan holder associated with the at least one loan. The data analysis computing system 106 may cause performance of the one or more tasks by recommending that the loan holder implement the one or more tasks. In some cases, as discussed above, the data analysis computing system 106 may facilitate the performance of the one or more tasks. For example, the data analysis computing system 106 can route corresponding instructions to one or more computing systems. Therefore, the data analysis computing system 106 can cause performance of the one or more tasks. The process may end at block 912. Alternatively, the process 900 may be repeated on an ongoing basis or in accordance with a particular schedule. In some cases, the process 900 may be repeated in response to a command and/or a change in the loans included in the pool of loans.

Comparing Pools of Loans

Figure 10:
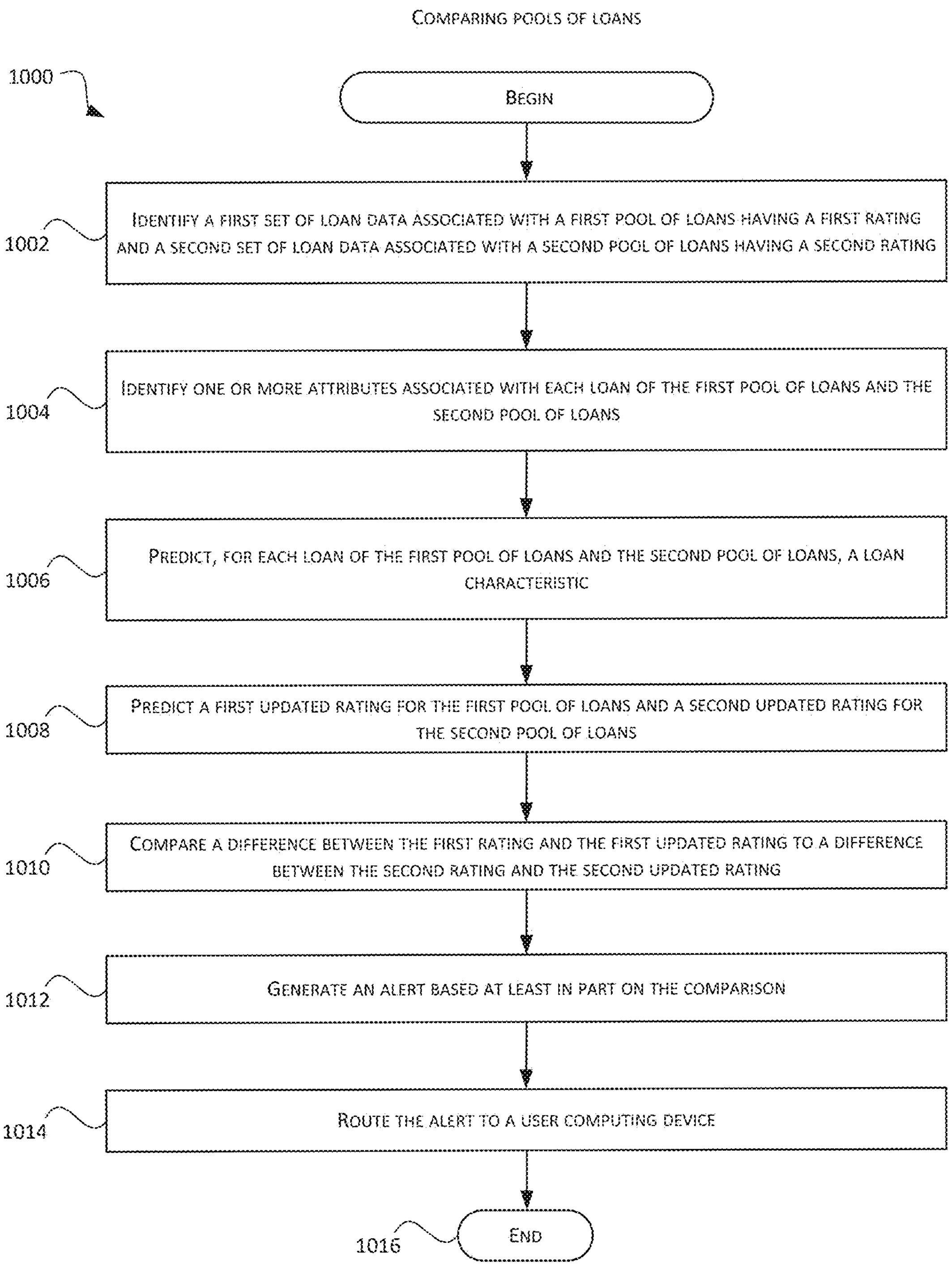
FIG. 10 is a flowchart of an example routine for comparing multiple pools of loans according to some embodiments.

FIG. 10 presents a flowchart of an embodiment of pool recommendation process 1000 in accordance with certain aspects of the present disclosure. The process 1000 may include comparison of pools of loans based at least in part on potential operations for individual loans of the pools of loans. By comparing the pools of loans based at least in part on the potential operations for individual loans, the pools of loans can be compared based at least in part on a potential rating of the pools of loans. While a first pool of loans and a second pool of loans are discussed with reference to FIG. 10, it will be understood that any number of pools of loans can be compared using the process 1000. The process 1000 can be implemented by any system that can compare pools of loans. The process 1000, in whole or in part, can be implemented by, for example, a ratings computing system 102, a pool generation computing system 104, a data analysis computing system 106, among others. Although any number of systems, in whole or in part, can implement the process 1000, to simply discussion, the process 1000 will be described with respect to particular systems.

The process 1000 may begin automatically, in response to a user interaction with a user interface, and/or upon identifying loan data. For example, the data analysis computing system 106 may periodically receive loan data (e.g., daily, weekly, monthly, etc.). At block 1002, the data analysis computing system 106 identifies (e.g., receives, obtains, generates, etc.) a first set of loan data associated with a first pool of loans having a first rating (a first pool characteristic) and a second set of loan data associated with a second pool of loans having a second rating (a second pool characteristic). Therefore, the data analysis computing system 106 can identify a first set of loan data and a second set of loan data.

At block 1004, the data analysis computing system 106 identifies (e.g., receives, obtain, generates, etc.) one or more attributes associated with each loan of each pool of loans based at least in part on the first set of loan data and the second set of loan data. As discussed above, the one or more attributes may identify the one or more attributes associated with a particular loan by parsing one or more of the first set of loan data or the second set of loan data.

At block 1006, the data analysis computing system 106 predicts, for each loan of the first pool of loans and the second pool of loans, a loan characteristic. The data analysis computing system 106 may generate a first predicted plurality of loan characteristics for the first pool of loans and a second predicted plurality of loan characteristics for the second pool of loans. In some cases, the data analysis computing system 106 may predict the loan characteristics for a portion of the loans of the pool of loans. The data analysis computing system 106 may predict the loan characteristic for each loan based on the performance of one or more operations. The one or more operations may include operations to adjust the one or more attributes of a particular loan. For example, the one or more operations may include an operation to establish a trade credit line, establish a lease, establish a loan, etc. The data analysis computing system 106 may predict the loan characteristics for the loans of the pool of loans based on a variance to an attribute of a particular loan (e.g., caused by performance of the one or more operations). In some cases, the data analysis computing system 106 may predict the loan characteristic for all or a portion of the loans based on the current or historical loan characteristic for the loan. Therefore, the data analysis computing system 106 can predict the loan characteristic for each loan.

At block 1008, the data analysis computing system 106 may predict a first updated rating for the first pool of loans and a second updated rating for the second pool of loans. For example, the data analysis computing system 106 may predict the first updated rating for the first pool of loans based on the first predicted plurality of loan characteristics and may predict the second updated rating for the second pool of loans based on the second predicted plurality of loan characteristics. Further, the data analysis computing system 106 may predict the updated ratings based on one or more modifications to an attribute of a loan of the corresponding pool of loans. Based at least in part on the predicted updated ratings for each pool of loans, the data analysis computing system 106 can determine a difference (e.g., a variance) between the rating of each pool of loans and the corresponding updated rating of the corresponding pool of loans.

At block 1010, the data analysis computing system 106 compares a difference between the first rating and the first updated rating to a difference between the second rating and the second updated rating. The data analysis computing system 106 may compare the differences and determine which of the differences has a greater variance or range. For example, the data analysis computing system 106 may determine that the difference between the first rating and the first updated rating is greater than the difference between the second rating and the second updated rating. Further, based on this determination, the data analysis computing system 106 may determine that the first pool of loans has greater growth potential as compared to the second pool of loans and may recommend the first pool of loans. Therefore, the data analysis computing system 106 can compare the difference between the first rating and the first updated rating to the difference between the second rating and the second updated rating.

In some cases, the data analysis computing system 106 may not compare the difference between the first rating and the first updated rating to the difference between the second rating and the second updated rating. Instead or in addition, the data analysis computing system 106 may compare the first updated rating to the second updated rating. The data analysis computing system 106 can compare the updated rating of each pool of loans to identify a pool of loans with an updated rating that exceeds the updated rating of one or more other pools of loans.

At block 1012, the data analysis computing system 106 generates an alert based at least in part on the comparison. The alert may identify the results of the comparison of the first parameter and the second parameter. For example, the alert may identify that the first pool of loans has a higher potential rating. In some cases, the alert may specify an operation to be performed (e.g., by a user computing device). For example, the operation may include obtaining (e.g., buying), providing (e.g., selling), etc. a particular pool of loans from/to another user. Therefore, the data analysis computing system 106 can generate the alert.

At block 1014, the data analysis computing system 106 routes the alert to a user computing device. The data analysis computing system 106 may route the alert and cause display of the alert via a user interface of a user computing device. The alert may identify a particular pool of loans from the first pool of loans and the second pool of loans. For example, the alert may recommend a particular pool of loans for purchase based at least in part on comparing the first parameter and the second parameter. In some cases, the data analysis computing system 106 may route the alert to a user computing device and cause the user computing device to perform one or more operations (e.g., automatically selling or buying a particular pool of loans). Therefore, the data analysis computing system 106 can route the alert to the user computing device. The process may end at block 1016. Alternatively, the process 1000 may be repeated on an ongoing basis or in accordance with a particular schedule. In some cases, the process 1000 may be repeated in response to a command and/or a change in the loans included in the pool of loans.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors (e.g., hardware processors). The code modules may be stored in any type of non-transitory computerreadable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware resources, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog resources. A computing environment can include any type of computer system, including, but not limited to, a computer system based at least in part on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method of identifying a transformation operation for an object pool to improve a pool characteristic of the object pool without modifying private data defining individual objects of the object pool, the method comprising:

as implemented by a hardware processor of a data analysis computing system in communication via one or more networks with a pool generation computing system and a ratings computing system, wherein the hardware processor is configured to execute computer-executable instructions:

receiving, by the data analysis computing system, from the pool generation computing system, via the one or more networks, object data identifying an object pool, the object pool comprising a plurality of objects that are pooled such the plurality of objects are movable between entities, each object of the plurality of objects having a discrete impact on a pool characteristic of the object pool based at least in part on the object pool comprising the plurality of objects, wherein each object of the plurality of objects identifies an electronic file comprising an electronic signature, wherein each object of the plurality of objects is included in the object pool based at least in part on validation of a corresponding electronic signature, wherein each electronic file of the plurality of electronic files identifies a first entity, a second entity, and movable physical property, wherein a third party computing system defines components data that identifies a connection between the plurality of movable physical properties and the plurality of objects, wherein the plurality of objects are defined based at least in part on the components data, and wherein the data analysis computing system does not have authorization to modify the components data, the plurality of electronic files, or the plurality of movable physical properties;

monitoring, in real time, first data associated with the object pool, wherein monitoring, in real time, the first data associated with the object pool comprises performing a web crawl;

identifying, by the data analysis computing system, using one or more first network communications received from the ratings computing system via the one or more networks, the pool characteristic of the object pool based at least in part on the object data, wherein the pool characteristic comprises a first dynamic assessment of the plurality of objects at a particular time as compared to another object pool, wherein the pool characteristic is based at least in part on an evaluation of the components data, the plurality of electronic files, or the plurality of movable physical properties, wherein the pool characteristic varies over time based at least in part on modification of at least one of the components data, the plurality of electronic files, or the plurality of movable physical properties;

determining, by the data analysis computing system, for each object of the plurality of objects, a respective object characteristic based at least in part on the object data, wherein the respective object characteristic comprises a second dynamic assessment of the object at a particular time as compared to another object, wherein at least a portion of the plurality of object characteristics are based at least in part on a portion of the components data associated with the object, a respective electronic file identified by the object, or a respective movable physical property of the object, wherein the respective object characteristic varies over time based at least in part on modification of at least one of the portion of the components data associated with the object, the respective electronic file identified by the object, or the respective movable physical property of the object;

identifying, by the data analysis computing system, a particular object of the plurality of objects based at least in part on one or more thresholds associated with the object pool, wherein identifying the particular object comprises, for each object of the plurality of objects:

modelling, by the data analysis computing system, an environment of the object;

simulating, by the data analysis computing system, performance of an operation of a plurality of operations within the modeled environment, wherein the data analysis computing system is programmed to differentiate between operations that result in a modification of data that the data analysis computing system is not authorized to modify or access and operations that result in a modification of data that the data analysis computing system is authorized to modify or access, wherein each operation of the plurality of operations comprises an operation to modify a non-object or an object not included in the object pool such that data associated with the first entity or the second entity is modified, wherein each operation indirectly causes modification to an attribute of the object without modifying the portion of the components data associated with the object, the respective electronic file identified by the object, or the respective movable physical property of the object, generating, by the data analysis computing system, a predicted object characteristic of the object based at least in part on the respective object characteristic of the object and the simulated performance of the operation, generating, by the data analysis computing system, a predicted pool characteristic of the object pool based at least in part on the predicted object characteristic of the object, wherein the method further comprises normalizing results of the simulated performance of the operation by generating the predicted object characteristic and the predicted pool characteristic, and determining, by the data analysis computing system, whether the one or more thresholds are satisfied based on one or more of:

the predicted pool characteristic, the predicted object characteristic, a difference between the predicted object characteristic and the respective object characteristic, a difference between the predicted pool characteristic and the pool characteristic, a rate of change of the respective object characteristic, or a rate of change of the pool characteristic, wherein identifying the particular object is based at least in part on determining whether the one or more thresholds are satisfied;

identifying, by the data analysis computing system, a particular operation, of the plurality of operations or a second plurality of operations, based at least in part on the normalized results of the simulated performance of the operation, determining whether the one or more thresholds are satisfied, and monitoring, in real time, the first data associated with the object pool, wherein each operation of the second plurality of operations comprises an operation to modify the object pool;

causing, by the data analysis computing system, automatic performance of the particular operation by a first computing device without modifying the components data, the plurality of electronic files, or the plurality of movable physical properties, wherein data security of the components data, the plurality of electronic files, and the plurality of movable physical properties are improved based on causing automatic performance of the particular operation without modifying the components data, the plurality of electronic files, or the plurality of movable physical properties;

causing, by the data analysis computing system, using one or more second network communications received from the ratings computing system via the one or more networks, generation of an updated pool characteristic of the object pool based at least in part on causing automatic performance of the particular operation; and causing, by the data analysis computing system, modification of second data associated with the object pool based on the updated pool characteristic, wherein the pool characteristic and the updated pool characteristic result in different modifications of the second data associated with the object pool.

2. The computer-implemented method of claim 1, wherein the at least a portion of the plurality of object characteristics are further based at least in part on a plurality of attributes of the plurality of objects, wherein causing automatic performance of the particular operation comprises:

causing modification of a particular attribute of the particular object, wherein the modification of the particular attribute causes an adjustment to the pool characteristic.

3. The computer-implemented method of claim 1, wherein causing generation of the updated pool characteristic comprises:

transmitting, to the ratings computing system via the one or more networks, a request for the updated pool characteristic based at least in part on causing automatic performance of the particular operation; and obtaining, from the ratings computing system via the one or more networks, the updated pool characteristic based at least in part on transmitting, to the ratings computing system via the one or more networks, the request for the updated pool characteristic.

4. The computer-implemented method of claim 1, wherein simulating performance of the operation comprises performing a monte carlo simulation based on one or more random variables associated with the object.

5. The computer-implemented method of claim 1, wherein simulating performance of the operation comprises:

identifying one or more attributes of the object comprising the attribute of the object; and identifying one or more attributes of the environment, wherein the one or more attributes of the environment indicate how the respective object characteristic is determined, wherein modelling the environment comprises:

modelling the environment based on the one or more attributes of the object and the one or more attributes of the environment, wherein the modeled environment comprises at least the object and at least one secondary object, and wherein the one or more attributes of the object are defined based at least in part on the at least one secondary object.

6. The computer-implemented method of claim 1, wherein identifying the particular object further comprises:

determining the simulated performance of the operation does not satisfy one or more additional thresholds, wherein determining the simulated performance of the operation does not satisfy one or more additional thresholds comprises at least one of:

determining indirect modification to the attribute of the object does not satisfy one or more sub-thresholds, determining that the data analysis computing system is not authorized to perform the operation, determining the simulated performance of the operation results in at least one of a decreased pool characteristic of the object pool as compared to the pool characteristic or a decreased object characteristic of the object as compared to the respective object characteristic, or determining the simulated performance of the operation results in a modification to at least one of the portion of the components data associated with the object, the respective electronic file identified by the object, or the respective movable physical property of the object; and based at least in part on determining the simulated performance of the operation does not satisfy the one or more additional thresholds, at least one of:

removing the operation from the plurality of operations, causing display of a graphical user interface via a user computing device, the graphical user interface indicating the operation, adjusting the operation, adjusting a second operation of the plurality of operations, or generating a third operation to add to the plurality of operations.

7. The computer-implemented method of claim 1, wherein the particular object is a first object, further comprising:

causing removal of the first object from the plurality of objects;

causing addition of a second object to the plurality of objects, wherein the second object is identified based at least in part on one or more similarities between the first object and the second object;

causing an adjustment to an attribute of the first object; or causing provision of the object pool from a third entity to a fourth entity.

8. The computer-implemented method of claim 1, wherein identifying the particular object further comprises, for each object of the plurality of objects:

comparing the predicted object characteristic to the one or more thresholds; and determining whether the object qualifies for rehabilitation based at least in part on comparing the predicted object characteristic to the one or more thresholds, the method further comprising:

causing removal of the particular object from the plurality of objects based at least in part on determining that the particular object does not qualify for rehabilitation.

9. The computer-implemented method of claim 1, wherein identifying the particular object further comprises, for each object of the plurality of objects:

comparing the predicted object characteristic to the one or more thresholds; and determining whether the object qualifies for rehabilitation based at least in part on comparing the predicted object characteristic to the one or more thresholds, the method further comprising:

causing an adjustment to an attribute of the particular object based at least in part on determining the particular object qualifies for rehabilitation.

10. The computer-implemented method of claim 1, further comprising:

identifying the particular object for removal from the plurality of objects; and transmitting, to the pool generation computing system via the one or more networks, a request to remove the particular object from the plurality of objects based at least in part on identifying the particular object for removal from the plurality of objects.

11. The computer-implemented method of claim 1, further comprising:

determining a particular predicted pool characteristic of the object pool based at least in part on identifying the particular object and identifying the particular operation;

transmitting, to a second computing device, the particular predicted pool characteristic; and receiving, from the second computing device, a request to cause performance of the particular operation based at least in part on transmitting, to the second computing device, the particular predicted pool characteristic.

12. The computer-implemented method of claim 1, wherein identifying the particular object comprises, for each object of the plurality of objects:

identifying one or more computing devices comprising at least one of a first computing device associated with the first entity or a second computing device associated with the second entity;

monitoring network traffic associated with the one or more computing devices, wherein monitoring the network traffic comprises monitoring computer transmissions, posts, or network traffic statistics associated with the one or more computing devices; and updating the respective object characteristic based at least in part on the network traffic.

13. The computer-implemented method of claim 1, wherein identifying the particular object comprises, for each object of the plurality of objects:

providing the object data to a machine learning model, wherein the machine learning model is trained on training data to identify at least one of the predicted object characteristic, the respective object characteristic, one or more attributes of the object, or a respective operation for the respective object to adjust the one or more attributes, wherein the machine learning model is configured to output the at least one of the predicted object characteristic, the respective object characteristic, the one or more attributes of the object, or the respective operation for the respective object based at least in part on the object data; and obtaining an output of the machine learning model, wherein the output identifies the at least one of the predicted object characteristic, the respective object characteristic, the one or more attributes of the object, or the respective operation for the respective object.

14. The computer-implemented method of claim 1, wherein the particular object corresponds to a business loan, wherein the business loan is established between the first entity and the second entity, wherein an object characteristic of the particular object is based at least in part on one or more of:

a bank rating associated with at least one of the first entity or the second entity;

a number of trade lines associated with the at least one of the first entity or the second entity;

a number of loans associated with the at least one of the first entity or the second entity;

a standing of a business associated with the at least one of the first entity or the second entity;

a status of a business associated with the at least one of the first entity or the second entity;

a quantity of assets of a business associated with the at least one of the first entity or the second entity; or an age of a business associated with the at least one of the first entity or the second entity.

15. The computer-implemented method of claim 1, wherein the particular object corresponds to a business loan, wherein the business loan is established between the first entity and the second entity, wherein the particular operation comprises an operation to establish or recommend establishment of at least one of:

an additional business loan for at least one of the first entity or the second entity;

a plurality of business loans for the at least one of the first entity or the second entity;

a lease for the at least one of the first entity or the second entity; or a trade line for the at least one of the first entity or the second entity.

16. The computer-implemented method of claim 1, wherein each object characteristic of the plurality of object characteristics identifies a value of a corresponding object of the plurality of objects, wherein the pool characteristic identifies a value of the object pool, wherein the updated pool characteristic identifies an updated value of the object pool, and wherein the pool characteristic is based at least in part on the plurality of object characteristics.

17. The computer-implemented method of claim 1, wherein a respective movable physical property of the particular object corresponds to a business loan amount.

18. A computer-implemented method of identifying a task for a business loan of a pool of business loans to improve a rating of the pool of business loans, enabling a user to cause an update to the rating of the pool of business loans without modifying private data associated with the business loan, the method comprising:

as implemented by a hardware processor of a data analysis computing system in communication via one or more networks with a pool generation computing system and a ratings computing system, wherein the hardware processor is configured to execute computer-executable instructions:

identifying, by the data analysis computing system, using one or more first network communications received from the pool generation computing system via the one or more networks, a set of business loan data, wherein the set of business loan data is associated with the pool of business loans;

monitoring, in real time, data associated with the pool of business loans, wherein monitoring, in real time, the data associated with the pool of business loans comprises performing a web crawl;

analyzing, by the data analysis computing system, the set of business loan data, wherein analyzing the set of business loan data comprises, for each business loan of the pool of business loans, without modifying private data associated with the business loan:

identifying, by the data analysis computing system, one or more attributes associated with the business loan, predicting, by the data analysis computing system, an adjustment of a value of the business loan based at least in part on an adjustment of an attribute of the one or more attributes, predicting, by the data analysis computing system, an adjustment of a value of the pool of business loans based at least in part on the adjustment of the value of the business loan, wherein the value of the pool of business loans is based on the private data associated with the business loan, wherein the value of the pool of business loans is based on one or more second network communications received by the data analysis computing system from the ratings computing system, and comparing, by the data analysis computing system, the predicted adjusted value of the pool of business loans to one or more thresholds;

determining, by the data analysis computing system, that an adjusted value of at least one business loan of the pool of business loans is associated with an adjusted value of the pool of business loans that satisfies the one or more thresholds based at least in part on analyzing the set of business loan data, wherein the adjusted value of the at least one business loan is based at least in part on the adjustment of the attribute;

determining, by the data analysis computing system, one or more tasks for an entity associated with the at least one business loan based at least in part on monitoring, in real time, the data associated with the pool of business loans and in response to determining that the adjusted value of the at least one business loan is associated with the adjusted value of the pool of business loans, wherein the entity comprises a pool holder of the pool of business loans, a loan holder of the at least one business loan, a prospective pool holder of the pool of business loans, or a prospective loan holder of the at least one business loan;

routing, by the data analysis computing system, the one or more tasks to a computing device; and causing, by the data analysis computing system, the computing device to automatically perform the one or more tasks without modifying private data associated with the pool of business loans, wherein performance of the one or more tasks results in a corresponding adjusted value of the pool of business loans, and wherein data security of the private data associated with the pool of business loans is improved based on causing the computing device to automatically perform the one or more tasks without modifying the private data associated with the pool of business loans.

19. A data analysis apparatus comprising:

a memory circuit storing computer-executable instructions; and a hardware processor of a data analysis computing system in communication via one or more networks with a pool generation computing system and a ratings computing system, wherein the hardware processor is configured to execute the computer-executable instructions, wherein execution of the computer-executable instructions causes the hardware processor to:

identify, by the data analysis computing system, using one or more first network communications received from the pool generation computing system via the one or more networks, a first set of loan data and a second set of loan data, wherein the first set of loan data is associated with a first pool of loans and the second set of loan data is associated with a second pool of loans, wherein the first pool of loans is associated with a first rating and the second pool of loans is associated with a second rating, and wherein the first rating is based on private data associated with the first pool of loans and the second rating is based on private data associated with the second pool of loans, wherein the first rating and the second rating are based on one or more second network communications received by the data analysis computing system from the ratings computing system;

monitor, in real time, data associated with at least one of the first pool of loans or the second pool of loans, wherein to monitor, in real time, the data associated with the at least one of the first pool of loans or the second pool of loans the execution of the computer-executable instructions causes the hardware processor to perform a web crawl;

identify, by the data analysis computing system, for each loan of the first pool of loans, one or more first attributes and, for each loan of the second pool of loans, one or more second attributes;

predict, by the data analysis computing system, for each loan of the first pool of loans, without modifying the private data associated with the first pool of loans, an adjustment of a first loan characteristic based at least in part on an adjustment of an attribute of the one or more first attributes to generate a first predicted plurality of loan characteristics;

predict, by the data analysis computing system, an adjustment of the first rating for the first pool of loans based at least in part on the first predicted plurality of loan characteristics;

predict, by the data analysis computing system, for each loan of the second pool of loans, without modifying the private data associated with the second pool of loans, an adjustment of a second loan characteristic based at least in part on an adjustment of an attribute of the one or more second attributes to generate a second predicted plurality of loan characteristics;

predict, by the data analysis computing system, an adjustment of the second rating for the second pool of loans based at least in part on the second predicted plurality of loan characteristics;

compare, by the data analysis computing system, adjustment of the first rating to the adjustment of the second rating;

generate, by the data analysis computing system, an alert based at least in part on comparing the adjustment of the first rating to the adjustment of the second rating;

route, by the data analysis computing system, the alert to a user computing device; and cause, by the data analysis computing system, a computing device to automatically perform one or more tasks without modifying the private data associated with the first pool of loans or the private data associated with the second pool of loans, wherein the one or more tasks are identified based at least in part on monitoring, in real time, the data associated with the at least one of the first pool of loans or the second pool of loans, wherein performance of the one or more tasks results in a corresponding adjusted value of the first pool of loans or the second pool of loans, and wherein data security of the private data associated with the first pool of loans and the private data associated with the second pool of loans are improved based on causing the computing device to automatically perform the one or more tasks without modifying the private data associated with the first pool of loans or the private data associated with the second pool of loans.

20. A computer-implemented method of identifying a transformation operation for an object pool to improve a pool characteristic of the object pool without modifying private data defining individual objects of the object pool, the method comprising:

as implemented by a hardware processor of a data analysis computing system in communication via one or more networks with a pool generation computing system and a ratings computing system, wherein the hardware processor is configured to execute computer-executable instructions:

receiving, by the data analysis computing system, from the pool generation computing system, via the one or more networks, object data identifying an object pool, the object pool comprising a plurality of objects that are pooled such the plurality of objects are movable between entities, each object of the plurality of objects having a discrete impact on a pool characteristic of the object pool based at least in part on the object pool comprising the plurality of objects, wherein each object of the plurality of objects identifies an electronic file comprising an electronic signature, wherein each object of the plurality of objects is included in the object pool based at least in part on validation of a corresponding electronic signature, wherein each electronic file of the plurality of electronic files identifies a first entity, a second entity, and movable physical property, wherein a third party computing system defines components data that identifies a connection between the plurality of movable physical properties and the plurality of objects, wherein the plurality of objects are defined based at least in part on the components data, and wherein the data analysis computing system does not have authorization to modify the components data, the plurality of electronic files, or the plurality of movable physical properties;

identifying, by the data analysis computing system, using one or more first network communications received from the ratings computing system via the one or more networks, the pool characteristic of the object pool based at least in part on the object data, wherein the pool characteristic comprises a first dynamic assessment of the plurality of objects at a particular time as compared to another object pool, wherein the pool characteristic is based at least in part on an evaluation of the components data, the plurality of electronic files, or the plurality of movable physical properties, wherein the pool characteristic varies over time based at least in part on modification of at least one of the components data, the plurality of electronic files, or the plurality of movable physical properties;

determining, by the data analysis computing system, for each object of the plurality of objects, a respective object characteristic based at least in part on the object data, wherein the respective object characteristic comprises a second dynamic assessment of the object at a particular time as compared to another object, wherein at least a portion of the plurality of object characteristics are based at least in part on a portion of the components data associated with the object, a respective electronic file identified by the object, or a respective movable physical property of the object, wherein the respective object characteristic varies over time based at least in part on modification of at least one of the portion of the components data associated with the object, the respective electronic file identified by the object, or the respective movable physical property of the object;

identifying, by the data analysis computing system, a particular object of the plurality of objects based at least in part on one or more thresholds associated with the object pool, wherein identifying the particular object comprises, for each object of the plurality of objects:

modelling, by the data analysis computing system, an environment of the object;

simulating, by the data analysis computing system, performance of an operation of a plurality of operations within the modeled environment, wherein the data analysis computing system is programmed to differentiate between operations that result in a modification of data that the data analysis computing system is not authorized to modify or access and operations that result in a modification of data that the data analysis computing system is authorized to modify or access, wherein each operation of the plurality of operations comprises an operation to modify a non-object or an object not included in the object pool such that data associated with the first entity or the second entity is modified, wherein each operation indirectly causes modification to an attribute of the object without modifying the portion of the components data associated with the object, the respective electronic file identified by the object, or the respective movable physical property of the object, generating, by the data analysis computing system, a predicted object characteristic of the object based at least in part on the respective object characteristic of the object and the simulated performance of the operation, generating, by the data analysis computing system, a predicted pool characteristic of the object pool based at least in part on the predicted object characteristic of the object, wherein the method further comprises normalizing results of the simulated performance of the operation by generating the predicted object characteristic and the predicted pool characteristic, and determining, by the data analysis computing system, whether the one or more thresholds are satisfied based on one or more of:

the predicted pool characteristic, the predicted object characteristic, a difference between the predicted object characteristic and the respective object characteristic, a difference between the predicted pool characteristic and the pool characteristic, a rate of change of the respective object characteristic, or a rate of change of the pool characteristic, wherein identifying the particular object is based at least in part on determining whether the one or more thresholds are satisfied;

identifying, by the data analysis computing system, a particular operation, of the plurality of operations or a second plurality of operations, based at least in part on the normalized results of the simulated performance of the operation and determining whether the one or more thresholds are satisfied, wherein each operation of the second plurality of operations comprises an operation to modify the object pool;

causing, by the data analysis computing system, automatic performance of the particular operation by a first computing device without modifying the components data, the plurality of electronic files, or the plurality of movable physical properties, wherein data security of the components data, the plurality of electronic files, and the plurality of movable physical properties are improved based on causing automatic performance of the particular operation without modifying the components data, the plurality of electronic files, or the plurality of movable physical properties, wherein causing automatic performance of the particular operation comprises:

routing machine instructions, via a network connection, to the first computing device, wherein in response to receiving the machine instructions, the first computing device automatically performs the particular operation, wherein the particular operation comprises an operation to automatically call, text, message, email, or mail a reference associated with a particular entity, and wherein the first computing device awaits receipt of the machine instructions to perform the particular operation;

causing, by the data analysis computing system, using one or more second network communications received from the ratings computing system via the one or more networks, generation of an updated pool characteristic of the object pool based at least in part on causing automatic performance of the particular operation; and causing, by the data analysis computing system, modification of data associated with the object pool based on the updated pool characteristic, wherein the pool characteristic and the updated pool characteristic result in different modifications of the data associated with the object pool.

21. The computer-implemented method of claim 20, wherein the object data and the pool characteristic vary over time such that the object pool at a first time is different from the object pool at a second time.

22. A computer-implemented method of identifying a task for a business loan of a pool of business loans to improve a rating of the pool of business loans, enabling a user to cause an update to the rating of the pool of business loans without modifying private data associated with the business loan, the method comprising:

as implemented by a hardware processor of a data analysis computing system in communication via one or more networks with a pool generation computing system and a ratings computing system, wherein the hardware processor is configured to execute computer-executable instructions:

identifying, by the data analysis computing system, using one or more first network communications received from the pool generation computing system via the one or more networks, a set of business loan data, wherein the set of business loan data is associated with the pool of business loans;

analyzing, by the data analysis computing system, the set of business loan data, wherein analyzing the set of business loan data comprises, for each business loan of the pool of business loans, without modifying private data associated with the business loan:

identifying, by the data analysis computing system, one or more attributes associated with the business loan, predicting, by the data analysis computing system, an adjustment of a value of the business loan based at least in part on an adjustment of an attribute of the one or more attributes, predicting, by the data analysis computing system, an adjustment of a value of the pool of business loans based at least in part on the adjustment of the value of the business loan, wherein the value of the pool of business loans is based on the private data associated with the business loan, wherein the value of the pool of business loans is based on one or more second network communications received by the data analysis computing system from the ratings computing system, and comparing, by the data analysis computing system, the predicted adjusted value of the pool of business loans to one or more thresholds;

determining, by the data analysis computing system, that an adjusted value of at least one business loan of the pool of business loans is associated with an adjusted value of the pool of business loans that satisfies the one or more thresholds based at least in part on analyzing the set of business loan data, wherein the adjusted value of the at least one business loan is based at least in part on the adjustment of the attribute;

determining, by the data analysis computing system, one or more tasks for an entity associated with the at least one business loan in response to determining that the adjusted value of the at least one business loan is associated with the adjusted value of the pool of business loans, wherein the entity comprises a pool holder of the pool of business loans, a loan holder of the at least one business loan, a prospective pool holder of the pool of business loans, or a prospective loan holder of the at least one business loan;

routing, by the data analysis computing system, the one or more tasks to a computing device; and causing, by the data analysis computing system, the computing device to automatically perform the one or more tasks without modifying private data associated with the pool of business loans, wherein performance of the one or more tasks results in a corresponding adjusted value of the pool of business loans, and wherein data security of the private data associated with the pool of business loans is improved based on causing the computing device to automatically perform the one or more tasks without modifying the private data associated with the pool of business loans, wherein causing the computing device to automatically perform the one or more tasks without modifying the private data associated with the pool of business loans comprises:

routing machine instructions, via a network connection, to the computing device, wherein in response to receiving the machine instructions, the computing device automatically performs the one or more tasks, wherein the one or more tasks comprises a task to automatically call, text, message, email, or mail a reference associated with a particular entity, and wherein the computing device awaits receipt of the machine instructions to perform the one or more tasks.

23. A data analysis apparatus comprising:

a memory circuit storing computer-executable instructions; and a hardware processor of a data analysis computing system in communication via one or more networks with a pool generation computing system and a ratings computing system, wherein the hardware processor is configured to execute the computer-executable instructions, wherein execution of the computer-executable instructions causes the hardware processor to:

identify, by the data analysis computing system, using one or more first network communications received from the pool generation computing system via the one or more networks, a first set of loan data and a second set of loan data, wherein the first set of loan data is associated with a first pool of loans and the second set of loan data is associated with a second pool of loans, wherein the first pool of loans is associated with a first rating and the second pool of loans is associated with a second rating, and wherein the first rating is based on private data associated with the first pool of loans and the second rating is based on private data associated with the second pool of loans, wherein the first rating and the second rating are based on one or more second network communications received by the data analysis computing system from the ratings computing system;

identify, by the data analysis computing system, for each loan of the first pool of loans, one or more first attributes and, for each loan of the second pool of loans, one or more second attributes;

predict, by the data analysis computing system, for each loan of the first pool of loans, without modifying the private data associated with the first pool of loans, an adjustment of a first loan characteristic based at least in part on an adjustment of an attribute of the one or more first attributes to generate a first predicted plurality of loan characteristics;

predict, by the data analysis computing system, an adjustment of the first rating for the first pool of loans based at least in part on the first predicted plurality of loan characteristics;

predict, by the data analysis computing system, for each loan of the second pool of loans, without modifying the private data associated with the second pool of loans, an adjustment of a second loan characteristic based at least in part on an adjustment of an attribute of the one or more second attributes to generate a second predicted plurality of loan characteristics;

predict, by the data analysis computing system, an adjustment of the second rating for the second pool of loans based at least in part on the second predicted plurality of loan characteristics;

compare, by the data analysis computing system, adjustment of the first rating to the adjustment of the second rating;

generate, by the data analysis computing system, an alert based at least in part on comparing the adjustment of the first rating to the adjustment of the second rating;

route, by the data analysis computing system, the alert to a user computing device; and cause, by the data analysis computing system, a computing device to automatically perform one or more tasks without modifying the private data associated with the first pool of loans or the private data associated with the second pool of loans, wherein performance of the one or more tasks results in a corresponding adjusted value of the first pool of loans or the second pool of loans, and wherein data security of the private data associated with the first pool of loans and the private data associated with the second pool of loans are improved based on causing the computing device to automatically perform the one or more tasks without modifying the private data associated with the first pool of loans or the private data associated with the second pool of loans, wherein to cause the computing device to automatically perform the one or more tasks without modifying the private data associated with the first pool of loans or the private data associated with the second pool of loans, the execution of the computer-executable instructions causes the hardware processor to:

route machine instructions, via a network connection, to the computing device, wherein in response to receiving the machine instructions, the computing device automatically performs the one or more tasks, wherein the one or more tasks comprises a task to automatically call, text, message, email, or mail a reference associated with a particular entity, and wherein the computing device awaits receipt of the machine instructions to perform the one or more tasks.

* * * * *